United States Patent
Beddoes et al.

(10) Patent No.: US 10,513,786 B2
(45) Date of Patent: Dec. 24, 2019

(54) REDUCED VOLUME ELECTROCHLORINATION CELLS AND METHODS OF MANUFACTURING SAME

(71) Applicant: Evoqua Water Technologies LLC, Lowell, MA (US)

(72) Inventors: Paul Beddoes, Bristol (GB); Li-Shiang Liang, Harvard, MA (US); Andrew Green, Leeds (GB); Jacob Telepciak, Littleton, MA (US); Joshua W. Griffis, Ashburnham, MA (US); Simon P. Dukes, Chelmsford, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 155 days.

(21) Appl. No.: 15/551,117

(22) PCT Filed: Feb. 17, 2016

(86) PCT No.: PCT/US2016/018210
§ 371 (c)(1),
(2) Date: Aug. 15, 2017

(87) PCT Pub. No.: WO2016/133983
PCT Pub. Date: Aug. 25, 2016

(65) Prior Publication Data
US 2018/0030603 A1 Feb. 1, 2018

Related U.S. Application Data

(60) Provisional application No. 62/116,979, filed on Feb. 17, 2015, provisional application No. 62/157,504, filed on May 6, 2015.

(51) Int. Cl.
| | | |
|---|---|---|
| C25B 1/26 | (2006.01) |
| C25B 9/00 | (2006.01) |
| C25B 9/06 | (2006.01) |
| C25B 9/08 | (2006.01) |
| C02F 1/461 | (2006.01) |

(Continued)

(52) U.S. Cl.
CPC .............. *C25B 1/26* (2013.01); *C02F 1/4618* (2013.01); *C02F 1/4674* (2013.01); *C02F 1/46109* (2013.01); *C25B 9/00* (2013.01); *C25B 9/066* (2013.01); *C25B 9/08* (2013.01); *C25B 11/035* (2013.01); *C25B 11/0484* (2013.01);
(Continued)

(58) Field of Classification Search
USPC .................................................. 204/272, 268
See application file for complete search history.

(56) References Cited

U.S. PATENT DOCUMENTS 820,113 A * 5/1906 Hinkson .............. C02F 1/46109
204/268
3,775,182 A 11/1973 Patton et al.
(Continued)

*Primary Examiner* — Harry D Wilkins, III

(57) ABSTRACT

An electrochemical cell includes a housing having an inlet, an outlet, and a central axis and an anode-cathode pair disposed concentrically within the housing about the central axis and defining an active area between an anode and a cathode of the anode-cathode pair. An active surface area of at least one of the anode and the cathode has a surface area greater than a surface area of an internal surface of the housing. The anode-cathode pair is configured and arranged to direct all fluid passing through the electrochemical cell axially through the active area.

33 Claims, 83 Drawing Sheets

(51) Int. Cl.
   *C02F 1/467* (2006.01)
   *C25B 11/03* (2006.01)
   *C25B 11/04* (2006.01)
   *H01M 8/18* (2006.01)
   *C02F 103/08* (2006.01)

(52) U.S. Cl.
   CPC ......... *C02F 2103/08* (2013.01); *H01M 8/188* (2013.01); *Y02E 60/528* (2013.01); *Y02P 70/56* (2015.11)

(56) References Cited

U.S. PATENT DOCUMENTS

| | | | | |
|---|---|---|---|---|
| 3,873,438 | A * | 3/1975 | Anderson | C02F 1/46104 |
| | | | | 204/268 |
| 3,923,629 | A * | 12/1975 | Shaffer | C02F 1/46109 |
| | | | | 204/260 |
| 4,040,938 | A * | 8/1977 | Robertson | C25B 3/02 |
| | | | | 204/260 |
| 4,105,528 | A * | 8/1978 | Hasebe | C25B 1/04 |
| | | | | 204/237 |
| 4,175,026 | A * | 11/1979 | Houseman | C25C 7/00 |
| | | | | 204/272 |
| 4,379,043 | A * | 4/1983 | Chappelle | C25B 15/02 |
| | | | | 204/228.5 |
| 4,587,001 | A | 5/1986 | Cairns et al. | |
| 4,983,471 | A | 1/1991 | Reichner et al. | |
| 5,082,544 | A * | 1/1992 | Willey | C25B 15/00 |
| | | | | 204/270 |
| 5,426,570 | A | 6/1995 | Davis | |
| 5,753,098 | A * | 5/1998 | Bess, Jr. | C02F 1/46104 |
| | | | | 204/269 |
| 2001/0042682 | A1 | 11/2001 | Weres et al. | |
| 2004/0115511 | A1 | 6/2004 | Holler et al. | |
| 2005/0048364 | A1 | 3/2005 | Coffey et al. | |
| 2005/0224258 | A1 | 10/2005 | Fincher et al. | |
| 2008/0245662 | A1 | 10/2008 | Forster et al. | |
| 2010/0065422 | A1 * | 3/2010 | Adams | C02F 1/46109 |
| | | | | 204/275.1 |
| 2010/0219077 | A1 | 9/2010 | Sohn | |
| 2010/0236921 | A1 * | 9/2010 | Yang | C25B 1/04 |
| | | | | 204/264 |
| 2013/0236763 | A1 | 9/2013 | Sun et al. | |
| 2014/0115877 | A1 | 5/2014 | Liang et al. | |
| 2015/0144499 | A1 * | 5/2015 | Benedetto | C25B 1/26 |
| | | | | 205/413 |
| 2016/0032465 | A1 * | 2/2016 | Kerstiens | F02M 21/0206 |
| | | | | 204/260 |
| 2016/0251763 | A1 * | 9/2016 | Benedetto | C02F 1/4674 |
| | | | | 205/342 |

* cited by examiner

- Anode (titanium with platinum or MMO coating)
- Cathode (titanium)
- Fluid flow
- Current

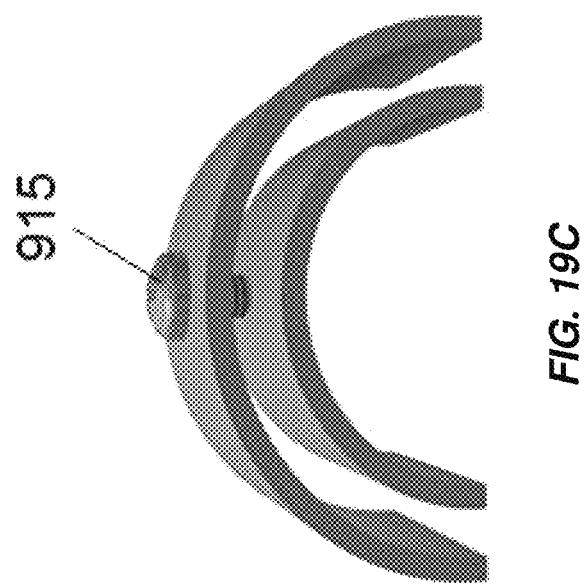

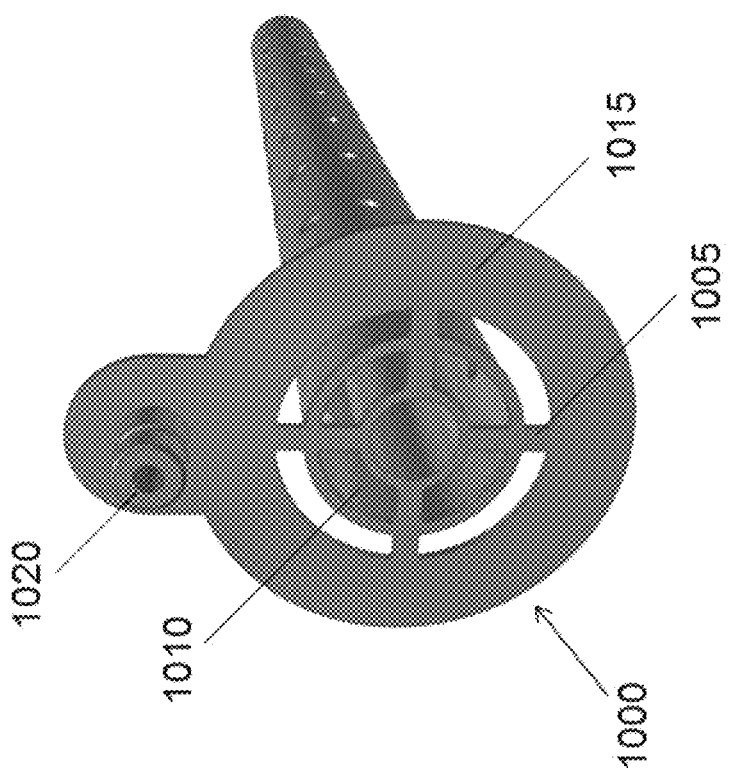

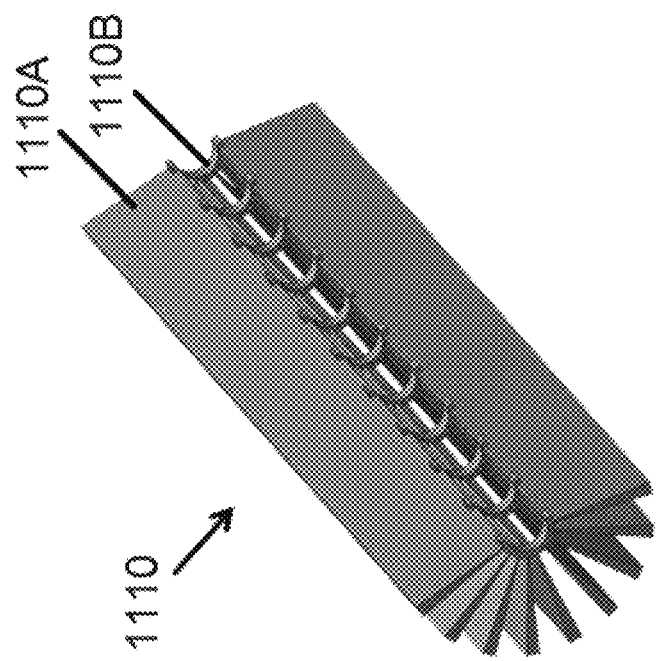

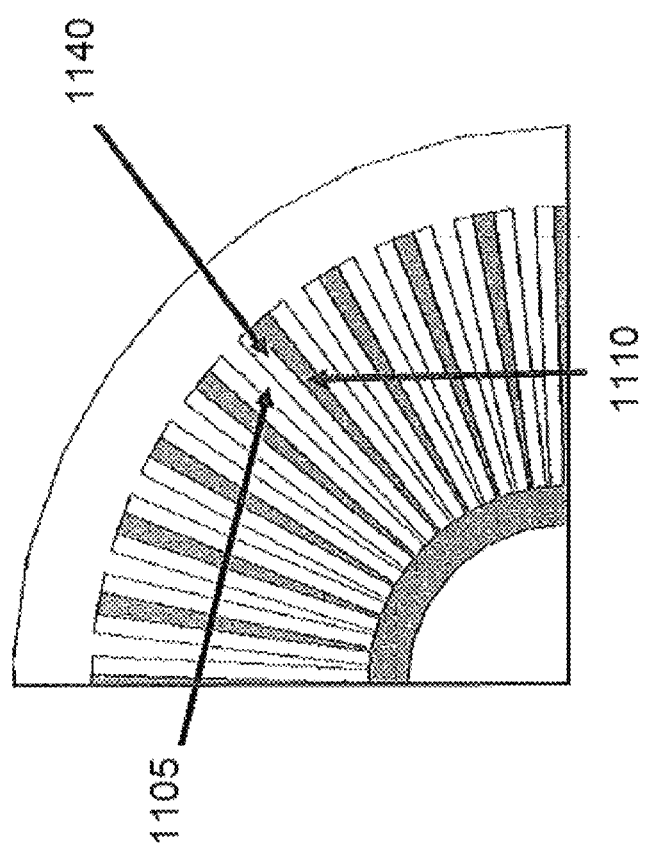

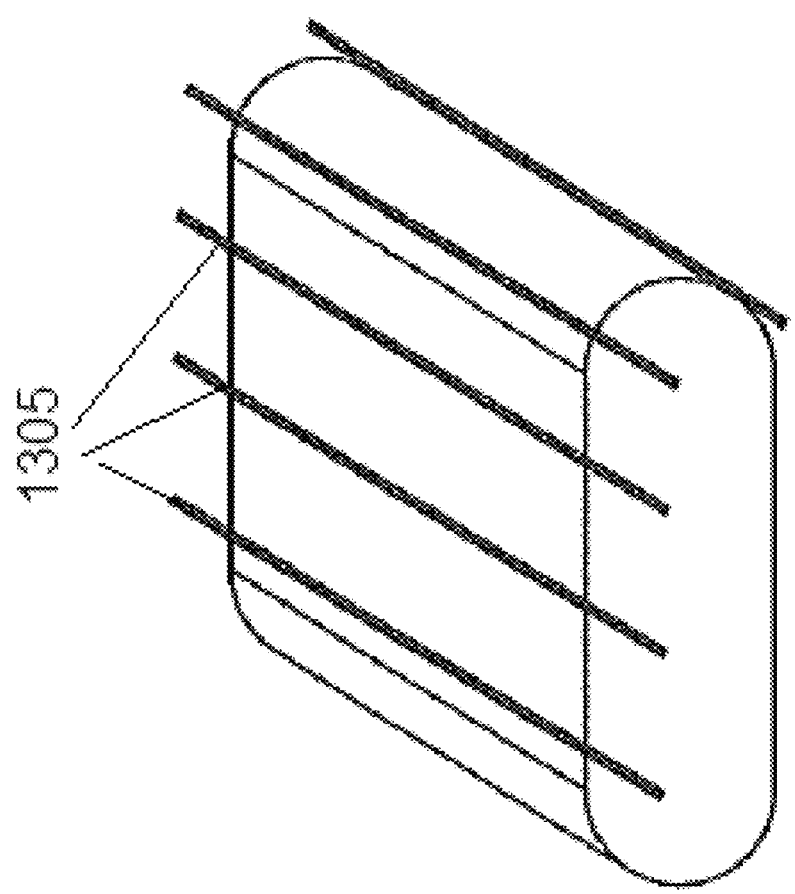

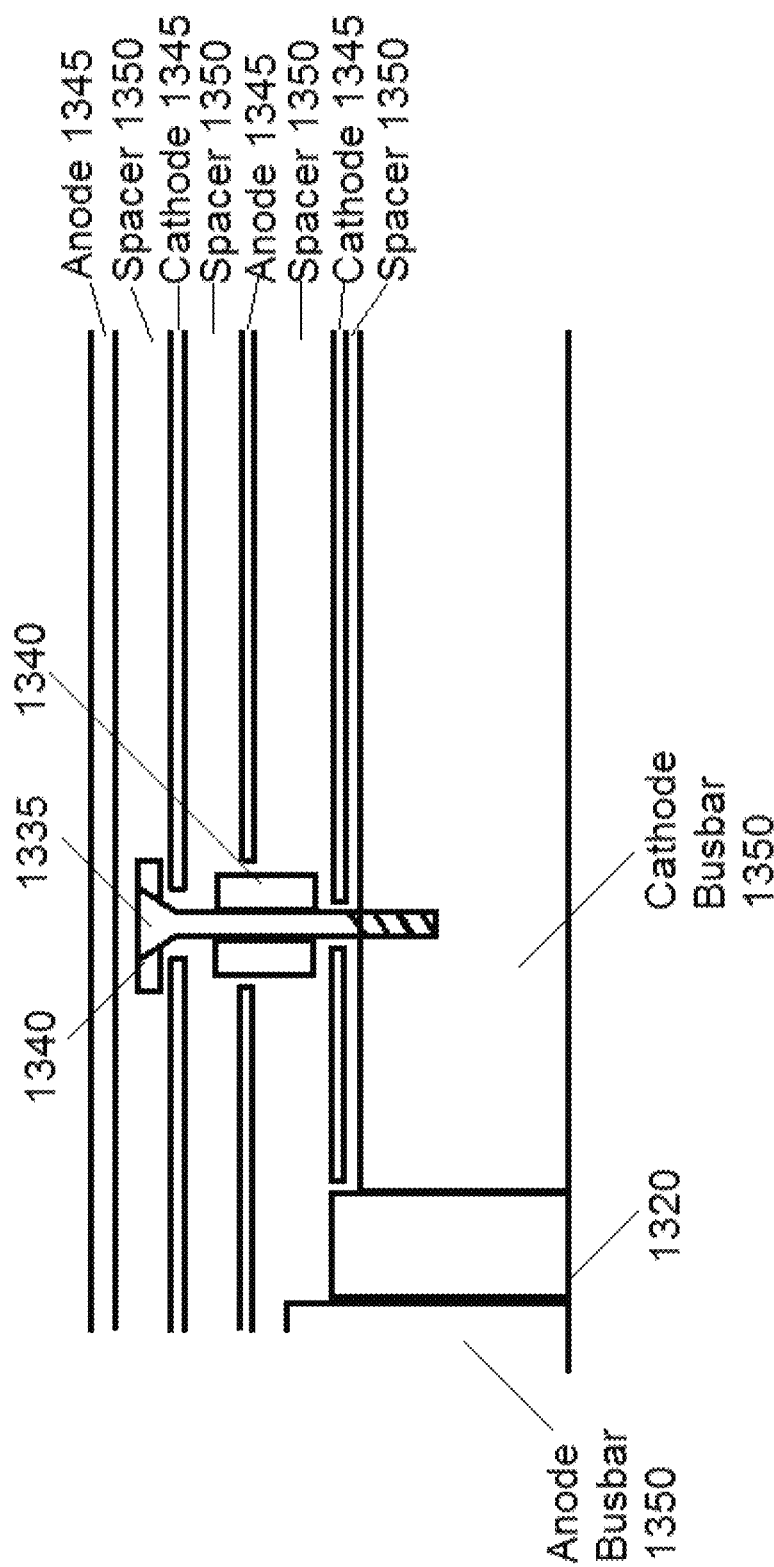

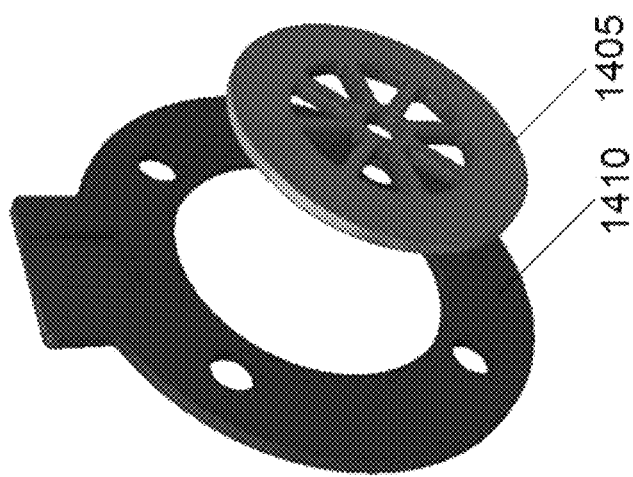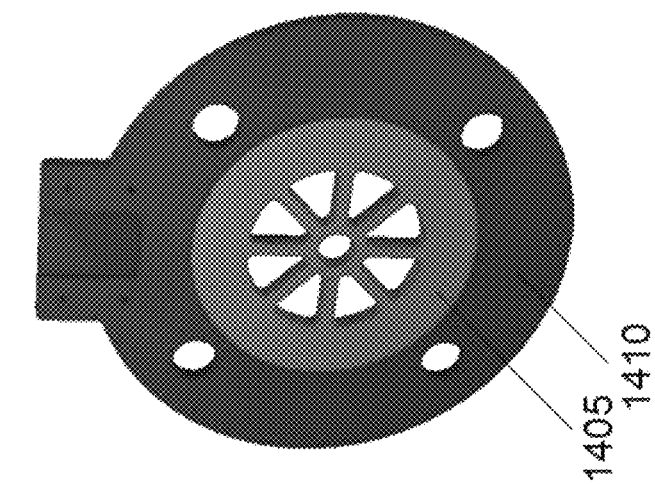
FIG. 33B

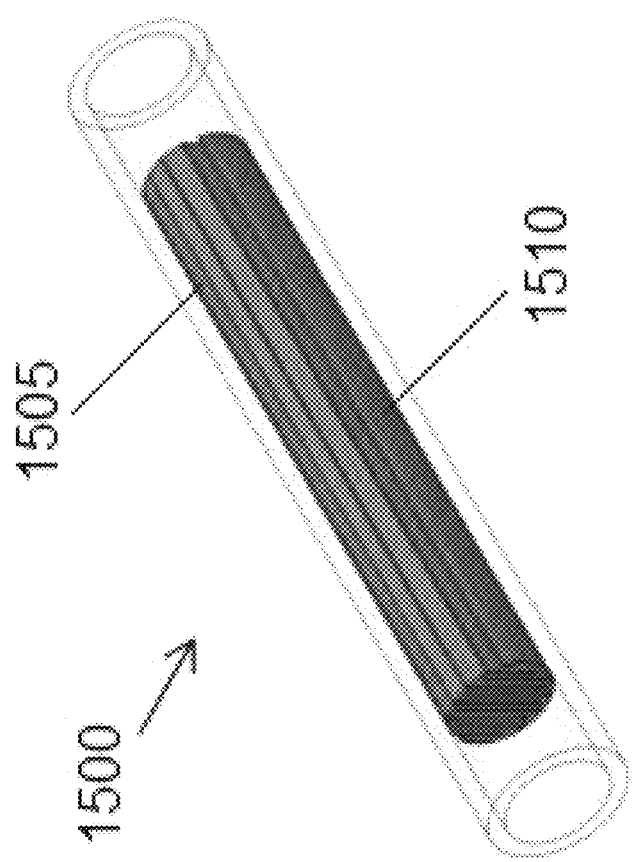

| Design | Type | Tube ID in. | Total Area mm^2 | Core Area mm^2 | Cathode Area mm^2 | Anode Area mm^2 | Flow Area mm^2 | Available Flow % | Cathode Length mm | Anode Length mm | Electrode Ratio mm^-1 |
|---|---|---|---|---|---|---|---|---|---|---|---|
| MK2M | Concentric | 2.30 | 2687.5 | 2026.8 | 0.0 | 0.0 | 660.6 | 24.6% | 181.6 | 159.6 | 0.127 |
| 3-TUBE-S | Concentric | 1.54 | 1201.7 | 0.0 | 143.73 | 91.11 | 966.9 | 80.5% | 191.6 | 191.6 | 0.319 |
| 3-TUBE-L | Concentric | 2.72 | 3748.8 | 0.0 | 380.1 | 317.3 | 3051.4 | 81.4% | 380.1 | 380.1 | 0.203 |
| 5-TUBE | Concentric | 2.72 | 3748.8 | 0.0 | 475.95 | 381.7 | 2891.2 | 77.1% | 634.6 | 634.6 | 0.339 |
| 7-TUBE | Concentric | 2.72 | 3748.8 | 0.0 | 572.6 | 431.2 | 2745.1 | 73.2% | 763.4 | 763.4 | 0.407 |
| 2" ID | Axial | 1.91 | 1854.3 | 506.7 | 195.0 | 195.0 | 957.6 | 51.6% | 927.5 | 927.5 | 1.000 |
| 4" ID | Axial | 3.79 | 7263.0 | 506.7 | 588.3 | 588.3 | 5579.7 | 76.8% | 2995.3 | 2995.3 | 0.825 |
| 8" ID | Axial | 7.57 | 28998.5 | 506.7 | 1892.0 | 1892.0 | 24707.8 | 85.2% | 10405.2 | 10405.2 | 0.718 |
| 12" ID | Axial | 11.29 | 64632.8 | 506.7 | 4080.2 | 4080.2 | 55965.6 | 86.6% | 21834.6 | 21834.6 | 0.676 |
| 1" ID | Spiral | 0.96 | 464.1 | 111.2 | 37.5 | 37.5 | 277.9 | 59.9% | 301.1 | 301.1 | 1.298 |
| 2" ID | Spiral | 1.91 | 1854.3 | 506.7 | 146.6 | 146.6 | 1054.4 | 56.9% | 586.0 | 586.0 | 0.632 |
| 4" ID | Spiral | 3.79 | 7263.0 | 506.7 | 699.9 | 699.9 | 5356.5 | 73.7% | 2739.3 | 2739.3 | 0.754 |
| 8" ID | Spiral | 7.57 | 28998.5 | 506.7 | 2836.0 | 2836.0 | 22819.7 | 78.7% | 11155.8 | 11155.8 | 0.769 |
| 12" ID | Spiral | 11.29 | 64632.8 | 506.7 | 6364.7 | 6364.7 | 51396.7 | 79.5% | 25196.5 | 25196.5 | 0.780 |
| .5" ID | Corrugated | 0.53 | 140.2 | 0.0 | 18.4 | 14.4 | 107.4 | 76.6% | 119.4 | 93.3 | 1.517 |
| 1" | Corrugated | 0.94 | 443.9 | 0.0 | 74.9 | 60.1 | 308.9 | 69.6% | 388.3 | 361.8 | 1.690 |
| 1.25" ID | Corrugated | 1.26 | 798.1 | 0.0 | 110.0 | 96.6 | 591.5 | 74.1% | 575.9 | 508.5 | 1.359 |
| 2" ID | Corrugated | 1.91 | 1854.3 | 0.0 | 213.28 | 218.1 | 1423.0 | 76.7% | 1119.9 | 1091.3 | 1.192 |
| 4" ID | Corrugated | 3.79 | 7263.0 | 0.0 | 2047.79 | 1798.67 | 3416.6 | 47.0% | 3438.4 | 3419.2 | 0.944 |
| 12" | Corrugated | 11.29 | 64632.8 | 0.0 | 16401.7 | 16229.2 | 32002.0 | 49.5% | 32044.9 | 31765.4 | 0.987 |

*FIG. 38*

REDUCED VOLUME ELECTROCHLORINATION CELLS AND METHODS OF MANUFACTURING SAME

CROSS-REFERENCE TO RELATED APPLICATION

This application is a U.S. national stage application and claims the benefit under 35 U.S.C. § 371 of PCT/US2016/018210, filed Feb. 2, 2016, titled "REDUCED VOLUME ELECTROCHLORINATION CELLS AND METHODS OF MANUFACTURING SAME," which claims priority to U.S. Provisional Application Ser. No. 62/116,979, titled "ELECTROCHLORINATION CELLS WITH SPIRAL ELECTRODES AND METHODS OF MANUFACTURING SAME," filed Feb. 17, 2015 and U.S. Provisional Application Ser. No. 62/157,504, titled "ELECTROCHLORINATION CELLS WITH MULTI-TUBE ELECTRODES AND METHODS OF MANUFACTURING SAME," filed May 6, 2015. Each of these applications is incorporated herein by reference in its entirety for all purposes.

BACKGROUND

1. Field of Invention

Aspects and embodiments disclosed herein are generally directed to electrochemical devices, and more specifically, to electrochlorination cells and devices, methods of fabricating same, and systems utilizing same.

2. Discussion of Related Art

Electrochemical devices based on chemical reactions at electrodes are widely used in industrial and municipal implementations. Examples of reactions include:

A. Electrochlorination with generation of sodium hypochlorite from sodium chloride and water.

Reaction at anode: $2Cl^- \rightarrow Cl_2 + 2e^-$
Reaction at cathode: $2Na^+ + 2H_2O + 2e^- \rightarrow 2NaOH + H_2$
In solution: $Cl_2 + 2OH^- \rightarrow ClO^- + Cl^- + H_2O$
Overall reaction: $NaCl + H_2O \rightarrow NaOCl + H_2$ B. Generation of sodium hydroxide and chlorine from sodium chloride and water, with a cation exchange membrane separating the anode and the cathode:

Reaction at anode: $2Cl^- \rightarrow Cl_2 + 2e^-$
Reaction at cathode: $2H_2O + 2e^- \rightarrow 2OH^- + H_2$
Overall reaction: $2NaCl + 2H_2O \rightarrow 2NaOH + Cl_2 + H_2$ C. Vanadium redox battery for energy storage, with a proton permeable membrane separating the electrodes:

During Charging:
Reaction at 1st electrode: $V^{3+} + e^- \rightarrow V^{2+}$
Reaction at 2nd electrode: $V^{4+} \rightarrow V^{5+} + e^-$ During Discharging:
Reaction at 1st electrode: $V^{2+} \rightarrow V^{3+} + e^-$
Reaction at 2nd electrode: $V^{5+} + e^- \rightarrow V^{4+}$ This disclosure describes various embodiments of electrochlorination cells and electrochlorination devices, however, this disclosure is not limited to electrochlorination cells or devices and the aspects and embodiments disclosed herein are applicable to electrolytic and electrochemical cells used for any one of multiple purposes.

Current commercially electrochlorination cells are typically based on one of two electrode arrangements, concentric tubes (CTE) and parallel plates (PPE).

FIGS. 1A and 1B show an example of an electrochlorination cell 100 with concentric tubes 102, 104 manufactured by Electrocatalytic Ltd. The inner surface of the outer tubes 102 and the outer surface of the inner tube 104 are the active electrode areas. The gap between the electrodes is approximately 3.5 mm. For marine and offshore applications with seawater as feed, the liquid velocity in the gap in the axial direction can be on the order of 2.1 m/s, resulting in highly turbulent flow which reduces the potential for fouling and scaling on the electrode surfaces.

FIGS. 2A-2C show some possible arrangement of electrodes in a CTE electrochemical cell. FIG. 2A illustrates an arrangement in which current flows in one pass from the anode to the cathode. Both electrodes are typically fabricated from titanium, with the anode coated with platinum or a mixed metal oxide (MMO). The electrodes are called "mono-polar."

FIG. 2B illustrates an arrangement in which current flows in two passes through the device with two outer electrodes and one inner electrode. One of the outer electrodes is coated on the inside surface to serve as an anode; the other is uncoated. A portion of the outer surface of the inner electrode is coated, also to serve as an anode, and the remaining portion is uncoated. Current flows through the electrolyte from the coated outer electrode to the uncoated portion of the inner electrode, along the inner electrode to the coated portion, then finally back across the electrolyte to the uncoated outer electrode. The inner electrode is also called a "bipolar" electrode.

FIG. 2C illustrates an arrangement in which current flows in multiple passes through the device with multiple outer electrodes and one inner electrode. By alternating coated and uncoated outer electrodes and coating the inner electrodes at matching intervals, current can flow back and forth through the electrolyte in multiple passes.

The rationale behind multiple passes is that the overall electrode area available for electrochemical reaction at the surface, and therefore the overall production rate of disinfectant (e.g., sodium hypochlorite), can be increased without a proportional increase in applied current. Increasing the electrical current would require larger wires or bus bars from the DC power supply to the electrochlorination cell, larger electrical connectors on the cell (lugs on the outside surface of the outer electrode in the example in FIG. 1A) and thicker titanium for the electrodes.

For the same current, a multiple pass device will have higher production rate than a single pass cell but the overall voltage drop will be higher (approximately proportional to the number of passes). For the same production rate, a multiple pass cell will require lower current (approximately inversely proportional to the number of passes). For the same power output (kW), power supply costs may be more sensitive to output current than output voltage, thereby favoring the multi-pass cells.

In actuality there are inefficiencies associated with a multiple pass cell. For example, a portion of the current, referred to as "bypass current," can flow directly from an anode to a cathode without crossing the electrolyte in the gap between the outer and inner electrodes (see FIGS. 2B and 2C). The bypass current consumes power but does not result in production of the disinfectant. Multiple pass cells are also more complex to fabricate and assemble. Portions of the outer surface of the inner electrode, for example, must be masked before the remaining portions are coated.

FIG. 3 shows a parallel plate electrochlorination (PPE) cell and FIG. 4 is a schematic of a multiple-pass unit with sets of flat electrodes arranged in parallel. The sets of electrodes at each end are electrically connected in parallel, with one set connected to a positive output from a DC power supply and other set connected to the negative output. The electrodes in between are bipolar. One advantage of the multiple pass parallel plate design vs. the concentric tubular design is the higher packing density of active electrode area per unit volume of the device, since both sides of each electrode are exposed to the electrolyte solution and therefore participate in electrode reactions. The tighter packing and multiple passes result in higher pressure drop in the PPE cell than in the CTE cell. The mean flow velocity between the plates can be reduced to lower the pressure drop and increase hydraulic residence time; the downside is increase in risk of fouling and scaling and therefore more frequent cleaning with acid, for example.

A frame structure is required in a PPE cell to mechanically support the multiple plates and maintain a specified spacing between adjacent electrodes. Electrical connection to multiple plates at each end may also be challenging.

In both CTE and PPE cells, removal of $H_2$ gas generated at the cathodes is a major challenge in the design of the devices and of the overall system. The gas must be safely vented at either selected locations in the piping or at product tanks.

SUMMARY

In accordance with an aspect of the present invention, there is provided an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area.

In some embodiments, the electrochemical cell has an overall electrode packing density of at least about 2 $mm^{-1}$.

In some embodiments, the electrochemical cell further comprises a central core element disposed within the electrochemical cell and configured to block flow of fluid through a portion of the electrochemical cell along the central axis, the central core element unconnected to at least one electrode of the anode-cathode pair.

In some embodiments, the anode-cathode pair is spiral-wound about the central axis.

In some embodiments, the electrochemical cell further comprises one or more spiral-wound bipolar electrodes. In some embodiments, the anode is laterally displaced from the cathode along a length of the electrochemical cell.

In some embodiments, at least one of the anode and the cathode is a rigid electrode. The anode and the cathode may each include a titanium plate, and surfaces of the anode may be coated with an oxidation resistant coating selected from the group consisting of platinum and a mixed metal oxide. The anode and the cathode may each comprise one or more of titanium, nickel, and aluminum. Surfaces of the anode may be coated with an oxidation resistant coating selected from the group consisting of platinum, a mixed metal oxide, magnetite, ferrite, cobalt spinel, tantalum, palladium, iridium, gold, and silver. At least one of the anode and the cathode may be fluid permeable and/or may include a perforated titanium plate.

In some embodiments, the electrochemical cell further comprises a separator configured to maintain a gap distance between the anode and the cathode, the separator being open to flow of an electrolyte solution through the active area. The separator may include a hub having spokes with slots that engage edges of at least one of the anode and the cathode.

The hub may further include an electrical connector configured to electrically connect the one of the anode and the cathode to a source of current.

In some embodiments, the electrochemical cell further comprises a hub including spokes in electrical contact with one of the anode and the cathode. The spokes may include slots that engage edges of the one of the anode and the cathode and maintain a gap between turns of the spiral wound anode-cathode pair.

In some embodiments, the central core element comprises a non-conductive core disposed within an innermost winding of the anode-cathode pair. In some embodiments, the anode-cathode pair includes a plurality of concentric electrode tubes and gaps defined between adjacent electrode tubes. The plurality of concentric electrode tubes may include one of a plurality of anode electrode tubes and a plurality of cathode electrode tubes. One of the plurality of anode electrode tubes and the plurality of cathode electrode tubes may be rigid electrodes.

In some embodiments, the plurality of concentric tube electrodes includes a plurality of anode electrode tubes and a plurality of cathode electrode tubes.

In some embodiments, the electrochemical cell is configured to enable current (DC and/or AC) to flow through an electrolyte solution from an anode electrode tube to a cathode electrode tube in a single pass.

In some embodiments, the electrochemical cell further comprises a bipolar electrode tube disposed between an anode electrode tube and a cathode electrode tube.

In some embodiments, an anode electrode tube is laterally displaced along a length of the electrochemical cell from a cathode electrode tube having a same diameter as the anode electrode tube. The electrochemical cell may comprise an electrode tube including an anodic half and a cathodic half.

In some embodiments, the electrochemical cell further comprises a plurality of bipolar electrode tubes disposed between respective concentrically arranged adjacent pairs of anode electrode tubes and cathode electrode tubes.

In some embodiments, at least one of the plurality of anode electrode tubes and the plurality of cathode electrode tubes is perforated and/or fluid permeable.

In some embodiments, the electrochemical cell further comprises at least one separator positioned between adjacent electrode tubes, the at least one separator configured to define and maintain a gap between the adjacent electrode tubes. The separator may be open to flow of an electrolyte solution through the gap defined between the adjacent electrode tubes.

In some embodiments, the electrochemical cell further comprises a metallic hub including spokes electrically coupled to edges of a plurality of the concentric electrode tubes. Each spoke may include slots that engage the edges of the plurality of the concentric electrode tubes maintain gaps between adjacent electrode tubes in the plurality of the concentric electrode tubes.

In some embodiments, the central core element includes an end cap disposed within an end of an innermost concentric tube electrode of the electrochemical cell.

In some embodiments, the electrochemical cell has an obround cross section.

In some embodiments, the electrochemical cell further comprises an electrical connector in electrical communication with one of the anode and the cathode, the electrical connector including at least two materials having different degrees of resistance to chemical attack by an electrolyte solution. The at least two materials may include a first material and a second material and the electrical connector may include a fluid permeable body formed of the first material. The fluid permeable body may include a plurality of apertures.

In some embodiments, the electrochemical cell includes a plate or body of the second material coupled to the fluid permeable body formed of the first material with one or more mechanical fasteners.

In some embodiments, the electrochemical cell includes a plate or body of the second material coupled to the fluid permeable body formed of the first material with a compression fit.

In some embodiments, the electrochemical cell includes a plate or body of the second material coupled to the fluid permeable body formed of the first material with threads formed in an edge of the fluid permeable body formed of the first material.

In some embodiments, the electrochemical cell includes a body formed of the second material coupled to the fluid permeable body formed of the first material with threads formed in cylindrical portion of the body formed of the second material.

In some embodiments, the electrochemical cell includes a body formed of the second material welded to the body formed of the first material.

In accordance with another aspect, there is provided a system comprising an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area. The system further comprises a source of electrolyte in fluid communication with the electrochemical cell. The electrochemical cell is configured to produce one or more reaction products from electrolyte from the source of electrolyte and to output the one or more reaction products. The system further comprises a point of use for the one or more reaction products output by the electrochemical cell. The one or more reaction products may include a disinfectant. The disinfectant may include or consist essentially of sodium hypochlorite.

In some embodiments, the source of electrolyte comprises one of brine and seawater.

In some embodiments, the system is included in one of a ship and an oil platform.

In some embodiments, the point of use includes one of a cooling water system and a ballast tank.

In some embodiments, the system is included in a land-based oil drilling system, wherein the point of use is a downhole of the oil drilling system.

In accordance with another aspect, there is provided an electrochemical cell. The electrochemical cell includes a cathode and an anode disposed in a housing and defining a gap therebetween, each of the cathode and anode including arcute portions, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap.

In some embodiments, the anode includes a plurality of plates extending from an arcuate base and the cathode includes a plurality of plates extending from an arcuate base, the plurality of plates of the anode interleaved with the plurality of plates of the cathode.

In accordance with another aspect, there is provided an electrochemical cell. The electrochemical cell includes a cathode and an anode disposed in a housing and defining a gap therebetween, each of the cathode and anode including a portion conforming to respective portions of an internal surface of the housing, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap. At least one of the anode and the cathode may include a corrugated portion.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 19C illustrates another embodiment of electrode spacers for use in embodiments of electrochemical cells as disclosed herein;

FIG. 20A illustrates another embodiment of an electrode separator/electrical contactor that may be used in embodiments of electrochemical cells as disclosed herein;

FIG. 22D is a cross-sectional perspective view of the anode of the electrochemical cell of FIG. 22A;

FIG. 24 illustrates another embodiment of an electrochemical cell including radially arranged electrodes;

FIG. 30A schematically illustrates an arrangement of busbar electrodes in an embodiment of an obround electrochemical cell;

FIG. 31B is an enlarged view of one of the connection and retaining elements and associated electrodes of the obround electrochemical cell of FIG. 31A;

FIG. 33B illustrates another embodiment of an electrical connector for electrodes of an electrochemical cell;

FIG. 34E illustrates an embodiment of an electrochemical cell including interleaved electrodes in a monopolar configuration;

FIG. 38 is a table illustrating various functional parameters of different embodiments of electrochemical cells as disclosed herein.

DETAILED DESCRIPTION

Figure 1A:
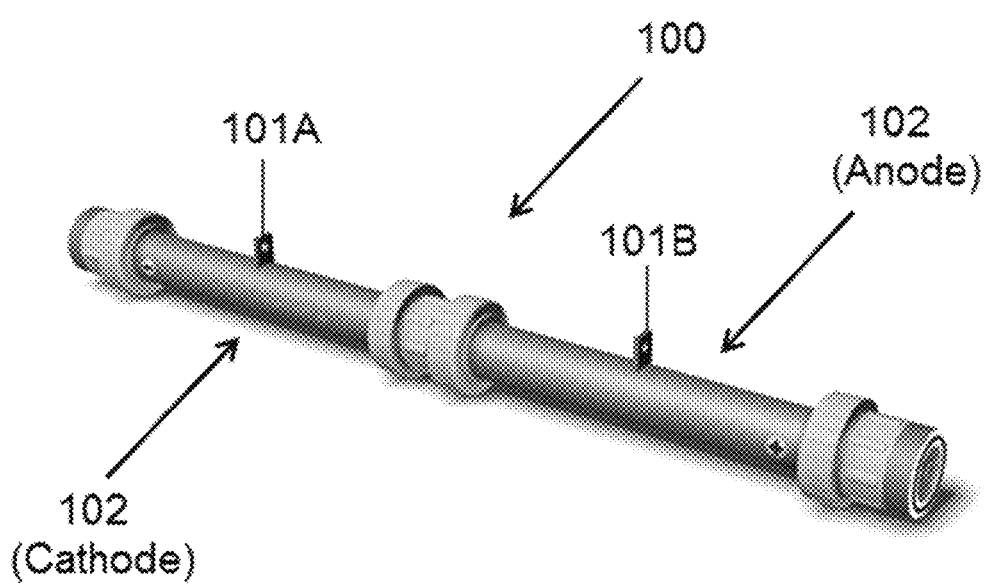
FIG. 1A is a perspective view of an embodiment of a concentric tube electrochemical cell.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein are generally directed to electrochemical devices to generate disinfectants such as sodium hypochlorite. The terms "electrochemical device" and "electrochemical cell" and grammatical variations thereof are to be understood to encompass "electrochlorination devices" and "electrochlorination cells" and grammatical variations thereof. Aspects and embodiments disclosed herein are described as including one or more electrodes. Some aspects and embodiments disclosed herein are described as including rigid electrodes. As the term is used herein, a "rigid" object is one that maintains its shape in the absence of an applied force at a normal operating temperature and/or at an elevated temperature. A "rigid electrode," as the term is used herein, is considered to have sufficient mechanical stiffness such that it maintains its shape and separation between adjacent electrodes or electrode windings in the various embodiments of electrochemical cells and devices disclosed herein without the need for spacers. For example, a flexible film including a metal coating is not to be considered a "rigid electrode" as the term is used herein.

The term "metal electrodes" or grammatical variation thereof as used herein is to be understood to encompass electrodes formed from, comprising, or consisting of one or more metals, for example, titanium, aluminum or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials. "Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. Electrodes utilized in embodiments disclosed herein may include a base of one or more of titanium, tantalum, zirconium, niobium, tungsten, and/or silicon. Electrodes for any of the electrochemical cells disclosed herein can be formed as or from plates, sheets, foils, extrusions, and/or sinters.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a common central axis, but does not exclude tubes or interleaved spirals surrounding a common axis that is not necessarily central to each of the concentric tubes or interleaved spirals in a set of concentric tubes or interleaved spirals.

Aspects and embodiments disclosed herein are more compact than previously known electrochlorination cells. As the term is used herein, an "active density" of an electrochemical cell is defined as the ratio of the cross-sectional area between active or functional electrode surfaces (surfaces of the electrodes from or to which current contributing to electrochemical treatment of a fluid in the electrochemical cell flows) through which fluid undergoing treatment in the electrochemical cell may flow (an "active area" of the electrochemical cell) to a total cross-sectional area within a housing of the electrochemical cell. "Active density," as defined, is the area in a plane normal to the center axis through which fluid can flow divided by the total cross-sectional area normal to the center axis. The unit of measure is dimensionless, a fraction or a percentage. Aspects and embodiments disclosed herein include electrochemical cells having active densities of between about 46% and about 52%, greater than about 50%, in some embodiments, greater than about 75%, in some embodiments, greater than 85%, in some embodiments, greater than 90%, and in some embodiments up to about 95%.

As the term is used herein an "overall packing density" of an electrochemical cell is defined as total functional electrode path length in a plane normal to flow of fluid through an electrochemical cell respective to a total cross-sectional area within a housing of the electrochemical cell. "Packing density" is the "active surface area" of the electrodes in an electrochemical device divided by the total internal volume of the device. The unit of measure is 1/length (e.g. $m^{-1}$). An "active surface area" of an electrode is the surface area of the electrode from which or into which current that contributes to electrochemical reactions within an electrochemical device flows. An electrode having opposing surfaces may have active surface area on a single surface or on both surfaces. An "anodic packing density" is the "active surface area" of the anode(s) in an electrochemical device divided by the total internal volume of the device. A "cathodic packing density" is the "active surface area" of the cathode(s) in an electrochemical device divided by the total internal volume of the device. An "overall electrode packing density" or "total electrode packing density" is the sum of the anodic packing density and cathodic packing density of an electrochemical device. Aspects and embodiments of electrochemical cells disclosed herein may have anodic packing densities, cathodic packing densities, and/or overall electrode packing densities of 2 $mm^{-1}$ or more.

In some embodiments, a line passing from a central axis of an electrochlorination cell toward a periphery of the electrochlorination cell in a plane defined normal to the central axis passes through multiple electrode plates. The multiple electrode plates may include multiple anodes and/or multiple cathodes. The central axis may be parallel to an average direction of flow of fluid through the electrochemical cell. Additional embodiments disclosed herein include structures and methods for fabricating electrodes of an electrochemical cell, controlling the spacing between electrodes of an electrochemical cell and connecting the electrodes to sources of electrical power.

Figure 5:
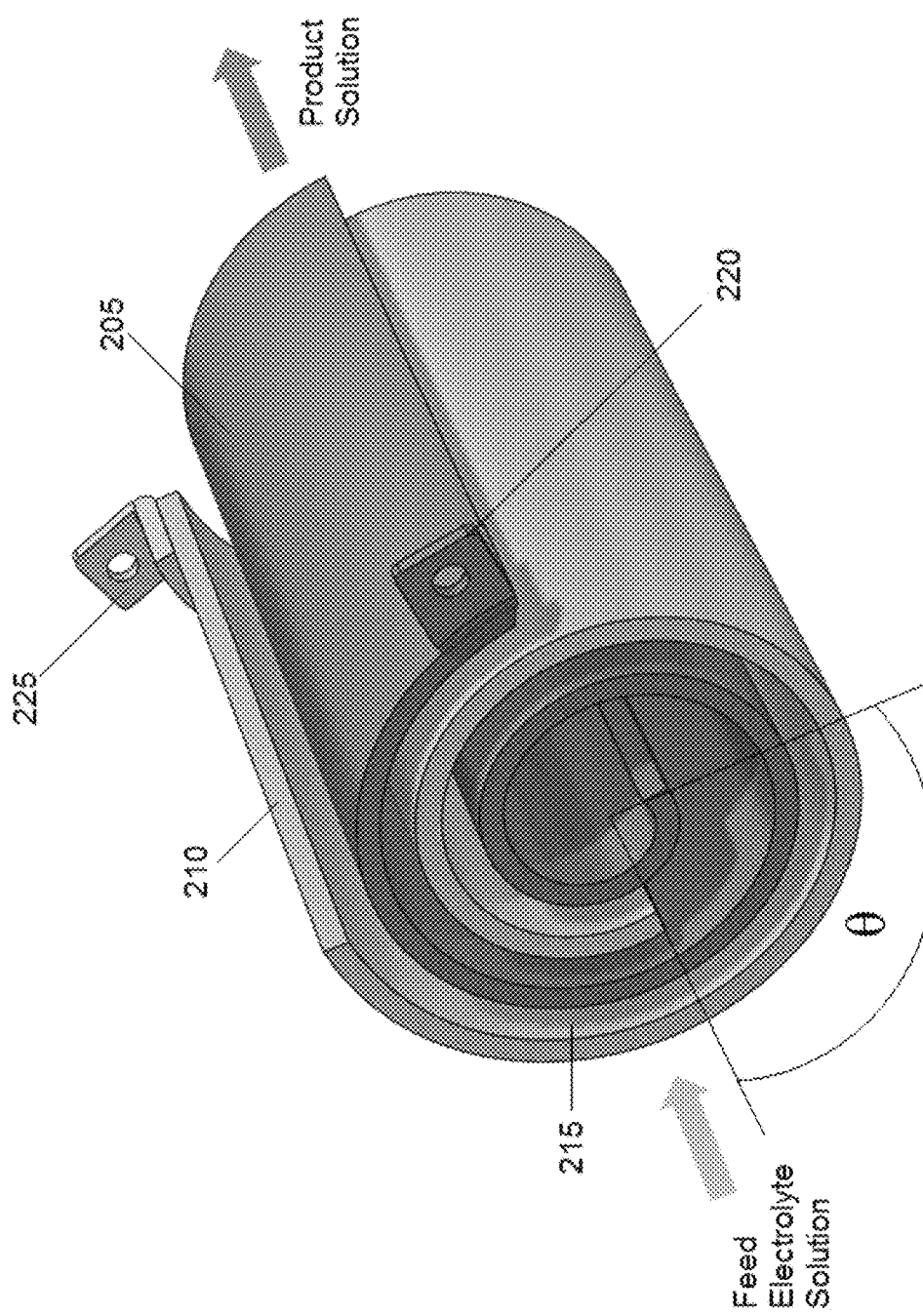
FIG. 5 is a schematic illustration of an embodiment of a single pass spiral wound electrochemical cell.

FIG. 5 shows one embodiment of a pair of spiral-wound electrodes for an electrochemical or electrochlorination cell. Two spiral-wound electrodes, an anode 205 and a cathode 210 forming an anode-cathode pair, are positioned to form a gap 215 in between the anode 205 and cathode 210. The width of the gap 215 may be constant or variable. In some embodiments, the width of the gap 215 may be between about 1 mm and about 5 mm In any embodiments of electrochemical cells disclosed herein, the width of gap(s) between electrodes may be selected based on the type of electrolyte to be treated in the electrochemical cell. For example, if brine is used as the electrolyte, the gap may be set at about 2 mm. If seawater is used as the electrolyte, the gap may be set at between about 3 mm and about 5 mm The angular difference between the starting ends of the helices and/or the ending ends of the helixes, labeled θ in the figure, may range from 0° to 180°. A feed electrolyte solution flows through the gap 215 in a direction substantially parallel to the axes of the spirals. A DC voltage, constant or variable, or in some embodiments, AC current, is applied across the electrodes and through the electrolyte solution. An anode tab 220 and a cathode tab 225 are connected to or formed integral with the anode 205 and cathode 210, respectively, to provide electrical connection to the anode 205 and cathode 210. The current flows from the anode 205 to the cathode 210 in a single pass. Electrochemical and chemical reactions occur at the surfaces of the electrodes and in the bulk electrolyte solution in the electrochemical cell to generate a product solution.

Figure 6:
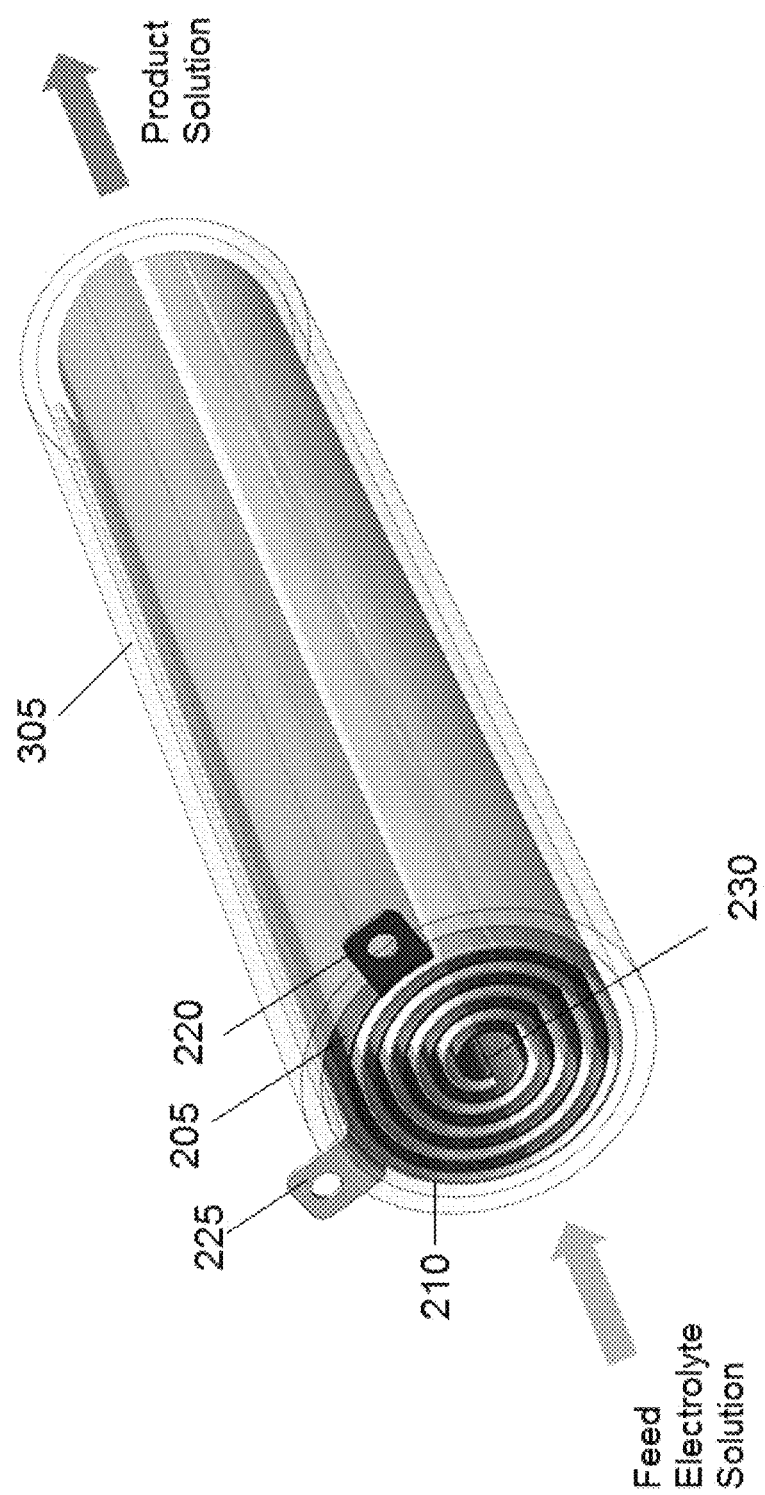
FIG. 6 is a schematic illustration of another embodiment of a single pass spiral wound electrochemical cell.

In one embodiment, a spiral wound electrochemical cell as illustrated in FIG. 5 and/or FIG. 6 may have a housing inner diameter of about 23.8 mm, an inner housing cross-sectional area of about 444.1 $mm^2$ an electrode path length of about 301.1 mm, a core outer diameter of about 12 mm (a cross-sectional area of about 113 $mm^2$), and an overall packing density of about 0.68 $mm^{-1}$.

In some aspects and embodiments of electrochemical cells including spiral-wound anode(s) and cathode(s) as disclose herein, the anode(s) and the cathode(s) are configured and arranged to direct fluid through one or more gaps between the anode(s) and the cathode(s) in a direction parallel to a central axis of the electrochemical cell. In some aspects and embodiments of electrochemical cells including spiral-wound anode(s) and cathode(s) as disclose herein, the anode(s) and the cathode(s) are configured and arranged to direct all fluid introduced into the electrochemical cell through the one or more gaps between the anode(s) and the cathode(s) in a direction parallel to a central axis of the electrochemical cell.

The design illustrated in FIG. 5 can be extended to include an anode, a cathode and one or more bipolar electrodes so that the current can make multiple passes through the electrolyte solution.

In all the figures in this disclosure, the dimensions of the components may not be to scale for the purpose of clarity. Similarly the design and location of features, for example, the electrode connectors 220, 225 in FIG. 5 may be for illustration only.

FIG. 6 shows another embodiment of a single current pass spiral-wound electrochemical cell. The gap between the spiral-wound anode 205 and cathode 210 is constant. The gap may be, for example, between about 1 mm and about 5 mm across. A solid core 230 (illustrated more clearly in FIG. 7B) is a central core element or fluid flow director that prevents fluid from flowing down the center and bypassing the gap. The core may be formed of a non-conductive material, for example, any one or more of polyvinyl chloride (PVC), polytetrafluoroethylene (PTFE), polyvinylidene fluoride (PVDF), acrylonitrile butadiene styrene (ABS), or high-density polyethylene (HDPE). The core 230 may be mechanically unconnected to the anode 205 and cathode 210. In other embodiments, one or more mechanical fasteners may be provided to fix the core in place and/or attach the core 230 to the innermost electrode winding (the innermost winding portion of the anode in the embodiment shown in FIG. 5). In other embodiments, the core 230 is held in place within the innermost electrode winding by a friction fit. The core 230 contacts only a single one of the anode 205 and cathode 210 electrodes in the embodiment shown in FIG. 5. One of the anode 205 and cathode 210 electrodes are unconnected to and do not contact the core 230. In other embodiments, the central core element may be a conductive member that is electrically coupled to one of the anode 205 and cathode 210 electrodes and may be utilized to deliver current to the one of the anode 205 and cathode 210 electrodes. In further embodiments, the central core element may include axial busbars and/or other conductive central elements insulated from one another with a first axial busbar and/or other conductive central element electrically coupled to the anode 205 and a second axial busbar and/or other conductive central element electrically insulated from the first and electrically coupled to the cathode 210.

The electrodes are positioned inside a non-metallic housing 305, designed to electrically isolate the electrodes from the outside environment and to withstand the fluid pressure of electrolyte passing through the electrochemical cell. The housing 305 is non-conductive, chemically non-reactive to electrolyte solutions, and has sufficient strength to withstand system pressures. The housing 305 may comprise one or more of PVC, PTFE, PVDF, ABS, HDPE, FRP, or other appropriate materials, and in some embodiments may include reinforcing elements, for example, glass or carbon fibers embedded in a polymer matrix. Electrode connectors 220, 225 extend outside the walls of the housing 305 at an end of the housing 305. In some embodiments, the electrode connectors 220, 225 may extend outside the walls of the housing 305 at opposite ends of the housing 305. Alternate designs for the electrical connectors 220, 225 are discussed in subsequent sections and these alternate designs are equally applicable to the embodiment of FIG. 6 and the other embodiments disclosed herein.

Figure 2A:
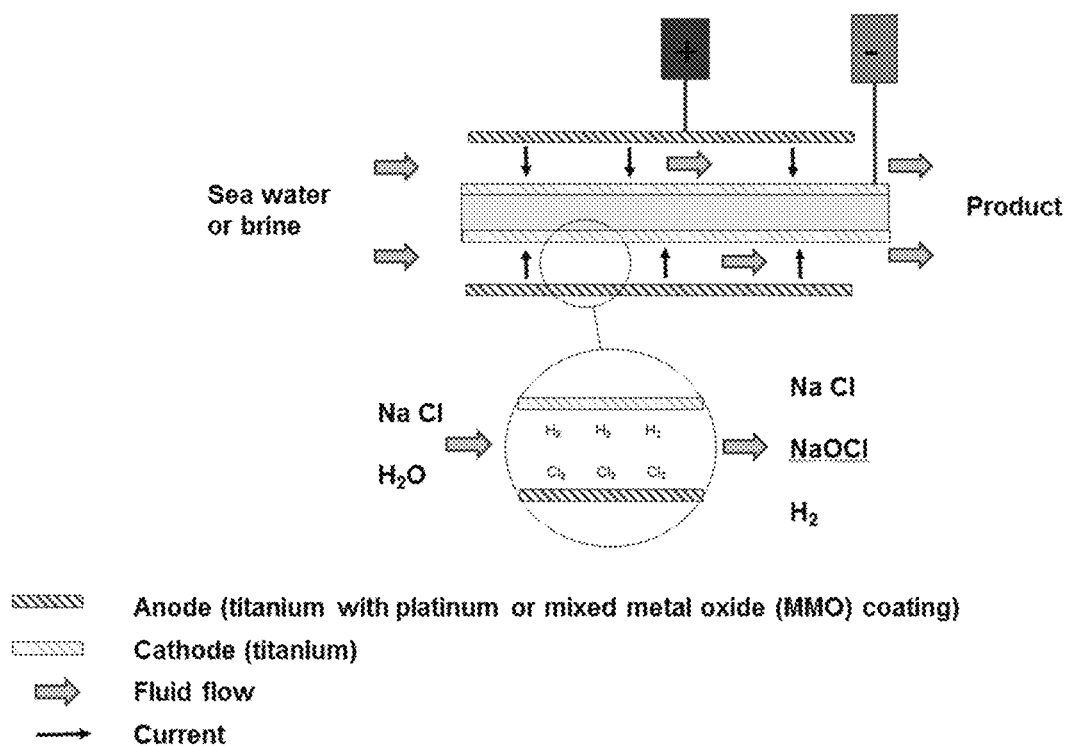
FIG. 2A illustrates current flow through an embodiment of a concentric tube electrochemical cell.
Figure 2B:
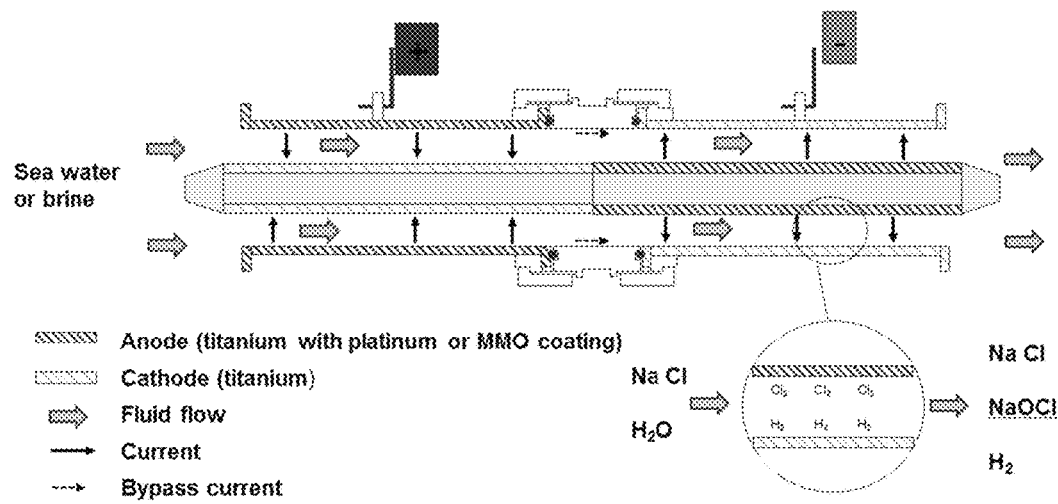
FIG. 2B illustrates current flow through another embodiment of a concentric tube electrochemical cell.
Figure 2C:
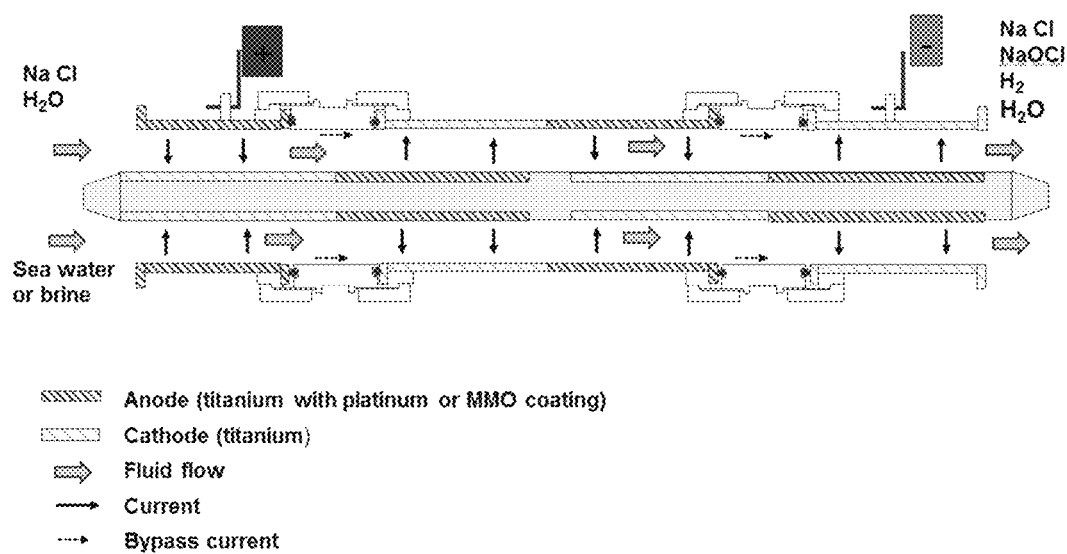
FIG. 2C illustrates current flow through another embodiment of a concentric tube electrochemical cell.
Figure 7A:
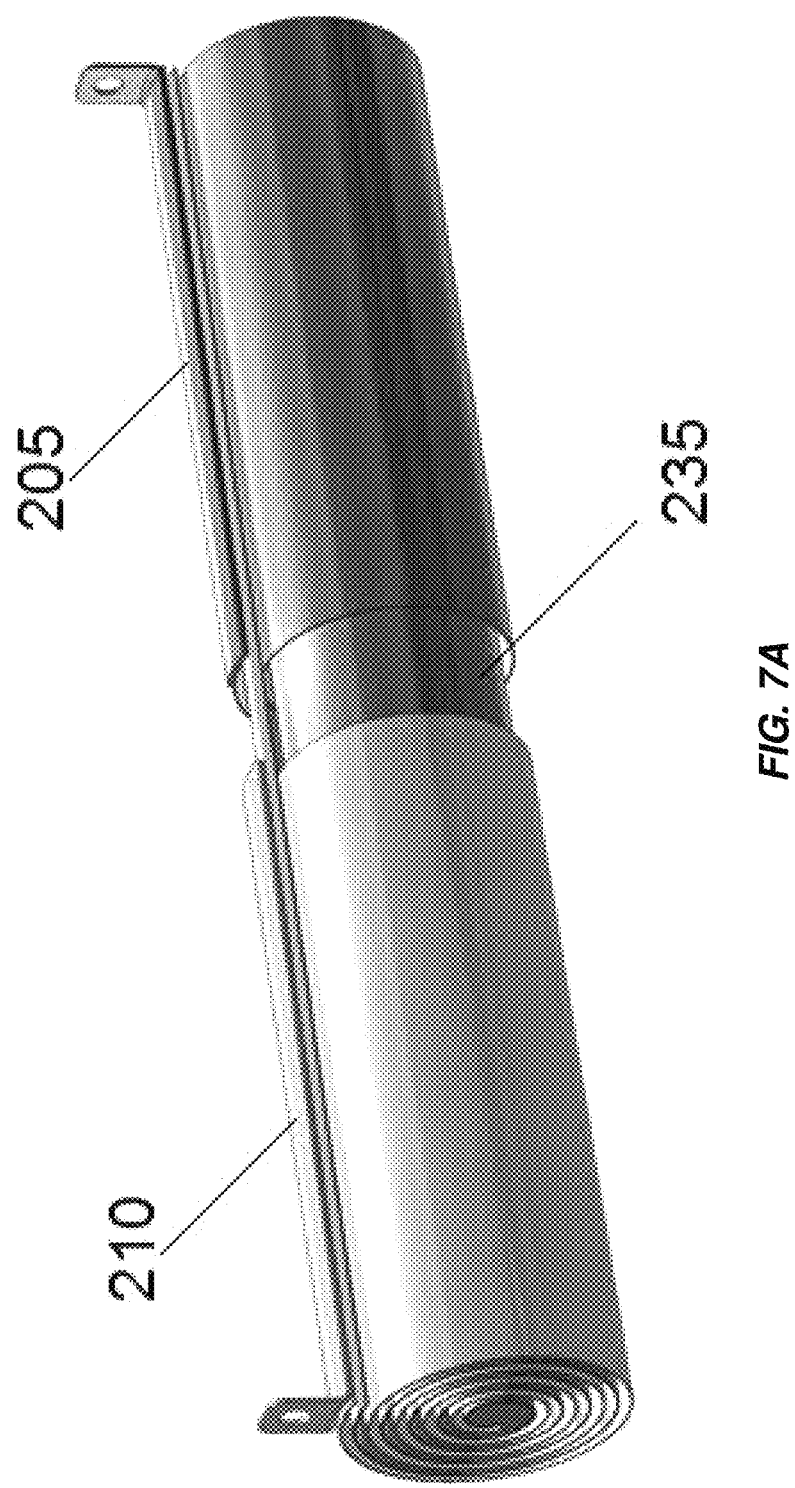
FIG. 7A is an isometric view of an embodiment of a dual pass spiral wound electrochemical cell.
Figure 7B:
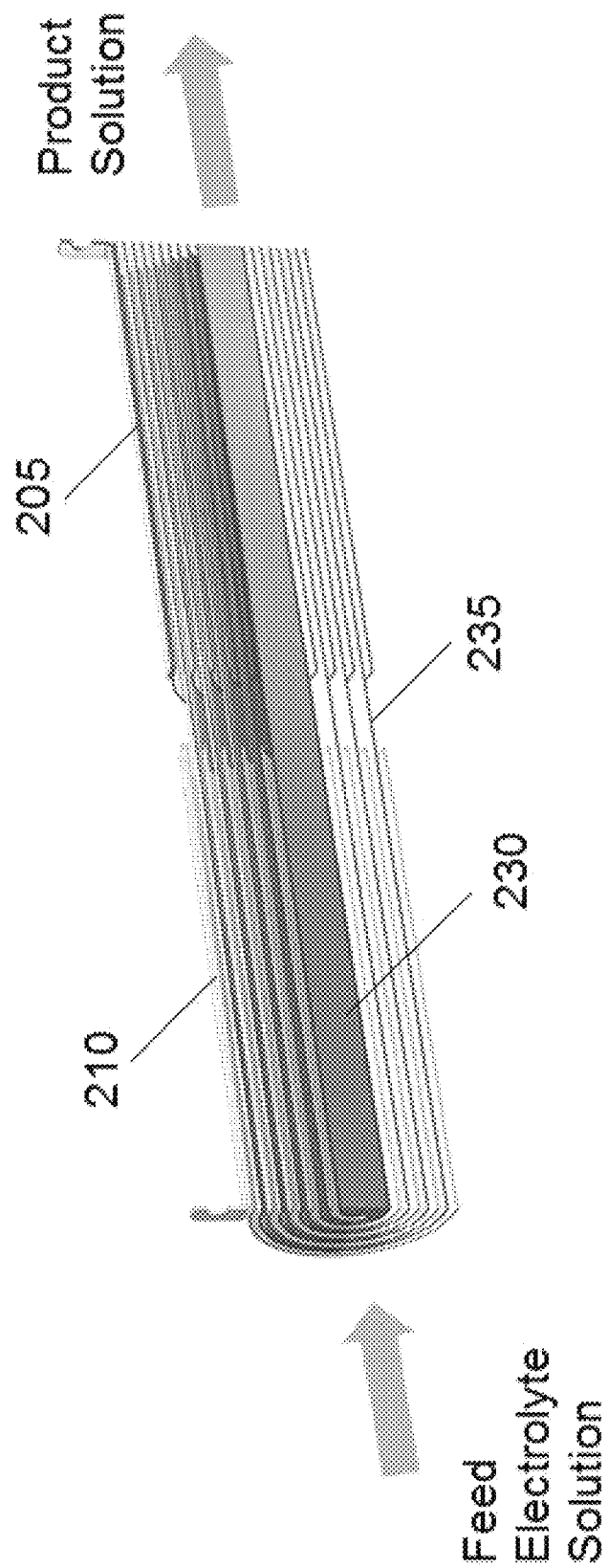
FIG. 7B is a cross section al view of the electrochemical cell of FIG. 7A.

FIGS. 7A and 7B show another embodiment of a spiral-wound electrochemical cell having two current passes. In addition to the spiral wound anode 205 and cathode 220 there is a third electrode 235 that is bipolar. The spiral wound anode 205 and cathode 220 are laterally displaced from another in a direction parallel to a central axis of the electrochemical cell. One end (in some embodiments, about one half) of the third electrode 235 (on the side of the electrochemical cell with anode 205) is uncoated to function as a cathode and the other end (on the side of the electrochemical cell with cathode 210, in some embodiments about one half of the electrode 235) is coated with an oxidation resistant coating, for example, platinum or MMO to function as anode. The third electrode 235 is nested within the anode 205 along a first portion and within the cathode 210 along a second portion and is oriented to enable the current to flow in two passes through the electrolyte solution, in a similar manner as in the CTE of FIG. 2B.

The central core 230 is a is a central core element or fluid flow director that prevents fluid from flowing down the center of the electrochemical cell and bypassing gaps between the anode 205 and the bipolar electrode 235 and the gaps between the cathode 210 and the bipolar electrode 235. The core 230 may be mechanically unconnected to the anode 205, cathode 210, and bipolar electrode 235. In other embodiments, one or more mechanical fasteners may be provided to fix the core in place and/or attach the core 230 to the innermost electrode winding (the anode 205 or bipolar electrode 235 on the side of the electrochemical cell with the anode 205 and the cathode 210 or bipolar electrode 235 on the side of the electrochemical cell with the cathode 210). In other embodiments, the core 230 is held in place within the innermost electrode winding by a friction fit. In some embodiments, the core 230 contacts and/or is connected to only a single one of the anode 205 or bipolar electrode 235 on the side of the electrochemical cell with the anode 205 and contacts and/or is connected to only a single one of the cathode 210 or bipolar electrode 235 on the side of the electrochemical cell with the cathode 210.

The cell illustrated in FIGS. 7A and 7B can be positioned inside a non-metallic housing 305, for example, a non-metallic housing as illustrated in FIG. 6. In another embodiment, multiple current passes can be used. By inserting additional bipolar electrodes and overlapping respective anode and cathode sections, an electrochlorination cell can be assembled to provide three or more current passes, schematically similar to the multi-pass PPE shown in FIG. 4.

The electrodes 205, 210 in the embodiments illustrated in FIGS. 5-7B and in any other embodiment of spiral-wound electrochemical cells disclosed herein can be individually wound and then assembled together. For example, each electrode can be fabricated by winding a titanium plate, coated or uncoated, around a mandrel. Rollers or other means can be used to press and bend a metal (e.g., titanium) plate used to form an electrode as the mandrel is rotated. Due to residual stress, the titanium will spring back, resulting in a gap between each turn of the spiral. By calculations and experimentation a degree of tightness of winding of each electrode may be determined such that the electrode relaxed into a state with a gap large enough to accommodate another spiral-wound electrode, aligned with the same center axis. Alternatively a second material may be placed adjacent to the titanium plate and wound with the titanium around the mandrel to ensure the required gap between the turns of the spiral. The material may be an elastomer with high durometer, for example. The central core 230 may be inserted into and/or fixed in place in the space defined by the innermost winding of the innermost electrode after or before assembling the electrodes or inserting the electrodes in the housing.

The electrodes 205, 210, and/or 235 of any embodiment of electrochemical cells disclosed herein may include or consist of titanium plates (a single titanium plate for each spiral wound electrode in spiral-wound embodiments) with a thickness of between about 0.25 mm and about 3 mm. The electrodes 205, 210, and/or 235 of any embodiment of electrochemical cells disclosed herein may be rigid electrodes.

Platinum coating of a titanium electrode after winding is straightforward and may be accomplished by, for example, electroplating. MMO coating may be carried out on a flat electrode before it is wound. The MMO may be applied by one or more of chemical, thermal and/or vapor deposition, painting spraying, and heat treating, and may be heat treated after deposition.

The electrodes 205, 210 can be wound together with separators in between; the separators may have a porous structure that allows fluid flow through gaps between the electrodes. The separators may be left in place to maintain the gap between the electrodes and provide other functions such as flow dispersion and mixing.

Figure 8:
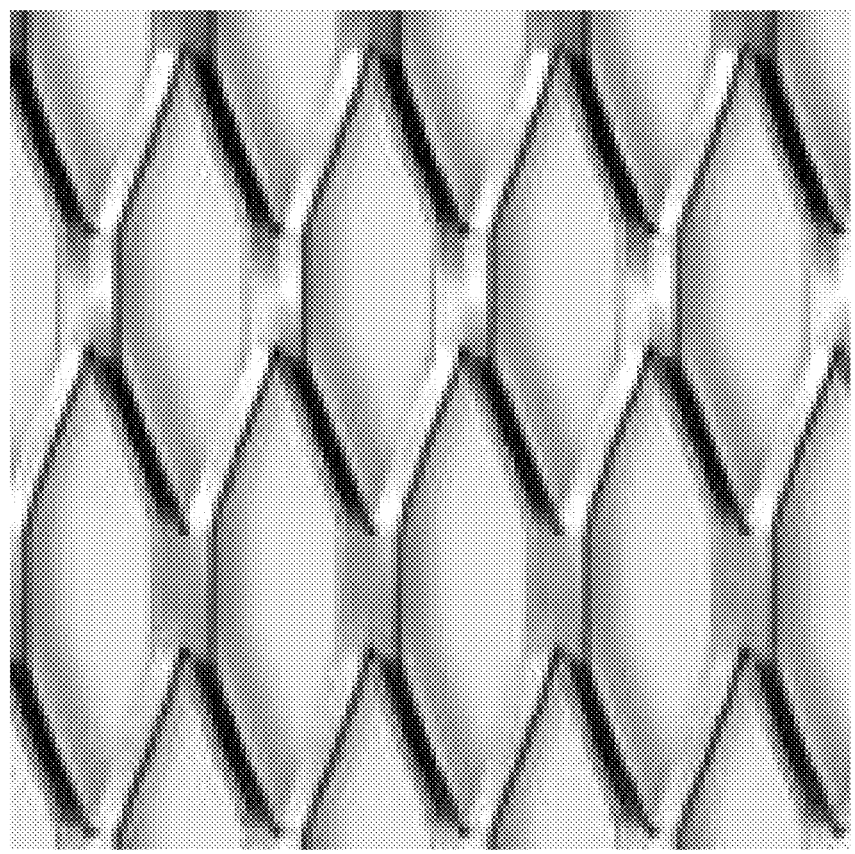
FIG. 8 is an illustration of an expanded titanium material that may be used in embodiments of electrodes for electrochemical cells as disclosed herein.

The electrodes can be fabricated from a fluid permeable material, for example, perforated titanium plates or an expanded mesh (see FIG. 8). For an anode 205 or the portion of a bipolar electrode 235 that serves as an anode, all exposed surfaces can be coated with an oxidation resistant coating, for example, platinum or MMO.

Figure 9A:
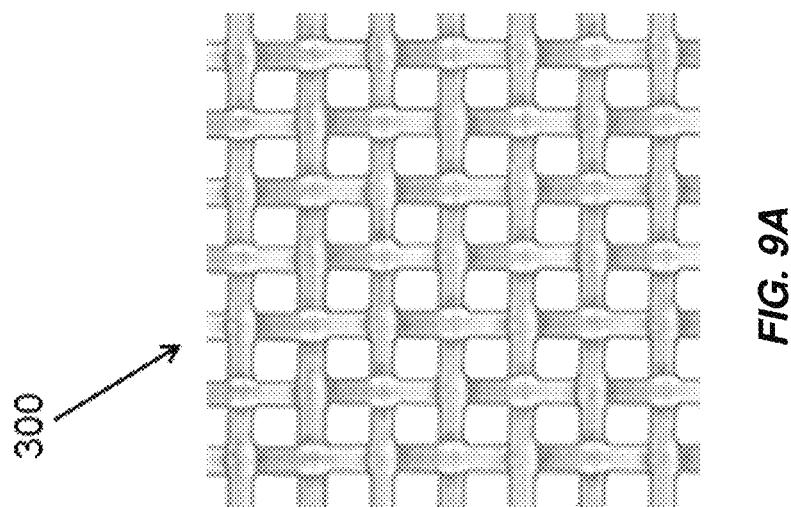
FIG. 9A is an illustration of a woven mesh separator that may be used in embodiments of electrodes for electrochemical cells as disclosed herein.
Figure 9B:
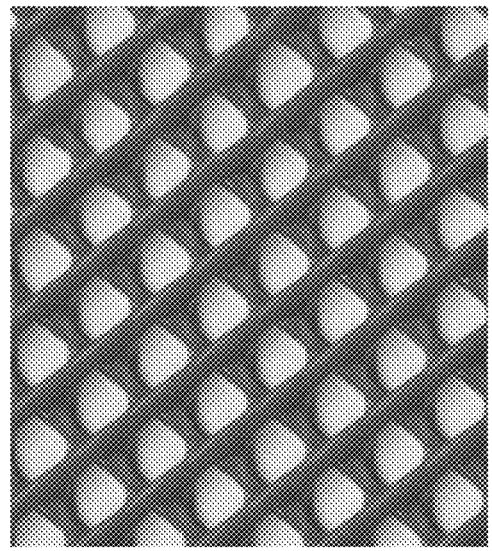
FIG. 9B is an illustration of an extruded mesh separator that may be used in embodiments of electrodes for electrochemical cells as disclosed herein.

Possible methods for maintaining the spacing between the electrodes 205, 210, and/or 235 (when present) include, for example, providing separators between the electrodes. The separators may include commercially available non-conductive woven or extruded screens, for example, as indicated generally at 300 and 350 in FIGS. 9A and 9B, respectively. The separators 300, 350 may be configured to minimize the areas of contact between a separator and adjacent electrodes; those areas may be masked from electrode reactions, to minimize interference with release of $H_2$ gas from electrode surfaces and removal of the gas in fluid flow stream, to minimize pressure drop across ends of the electrochlorination device, and/or to maximize mixing and mass transfer and thereby reaction rates at the electrode surfaces. In some embodiments, the electrodes 205, 210, and/or 235 (when present) may be metal electrodes that are rigid and that may require a lesser number of spacers (or even no spacers) to maintain a desired separation between the electrodes 205, 210, and/or 235 (when present) than if the electrodes were formed from flexible materials.

In some embodiments, a non-metallic (for example, PVC, PTI-B, PVDF and/or HDPE or another material with both high electrical end chemical resistance) hub or a wheel 240 with a plurality of spokes 245 may be utilized for maintaining the spacing between the electrodes 205, 210, and/or 235 (when present). Each spoke 245 is slotted at specified intervals to accommodate and locate the edges of the electrodes 205, 210, and/or 235 (when present) as shown in FIG.

Figure 10:
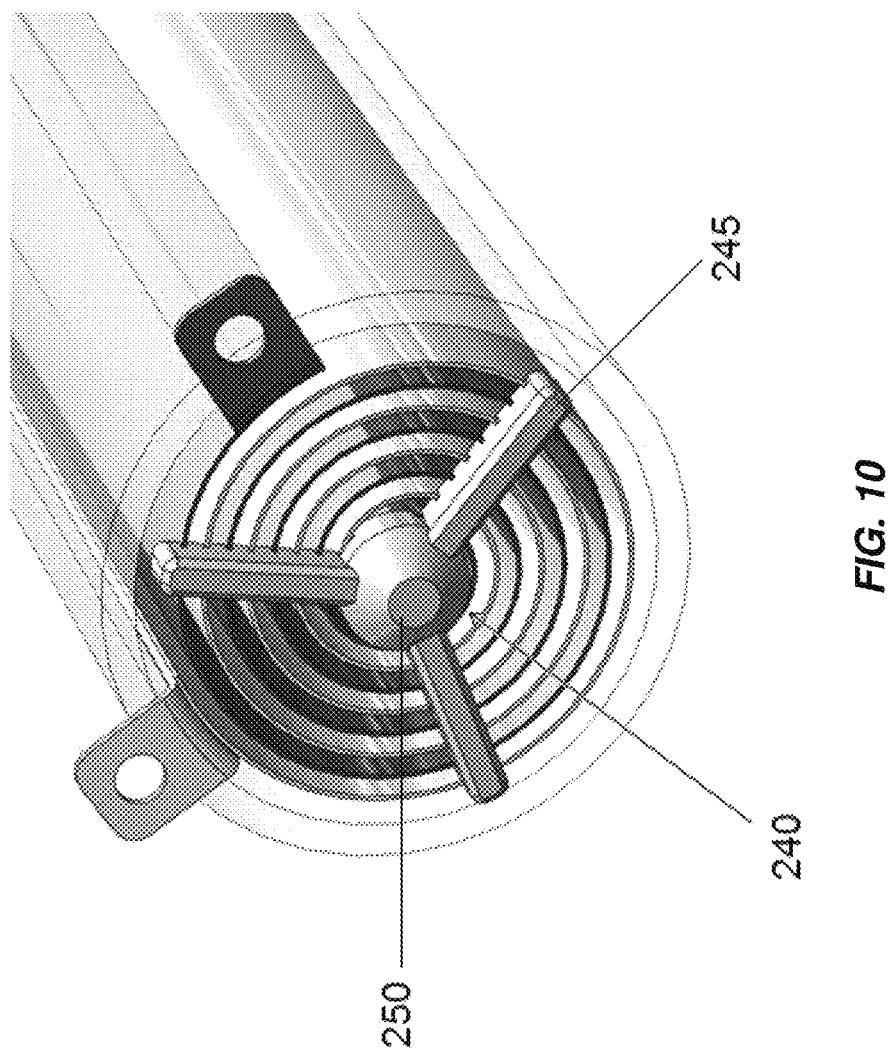
FIG. 10 illustrates a hub or wheel electrode separator/electrical contactor that may be used in embodiments of electrochemical cells as disclosed herein.

10. Alternatively or additionally, the spokes 245 may include pins or protrusions that may engage alternate sides of edges of the electrodes to hold them in position. A hub or wheel 240 as illustrated in FIG. 10 may be provided at both ends of the electrochlorination device. A pair of embodiments of the hub or wheel 240 may be installed at the two outer ends of an electrochlorination cell, one hub or wheel 240 at each end. The non-metallic hub or wheel 240 may include a solid center portion 250 to prevent fluid flow down the core of the electrochlorination device. The core of the electrochlorination device is defined by a central area in which current applied to the anode and cathode would pass through electrolyte in the electrochlorination device in the absence of the solid center portion. In some embodiments, the solid center portion 250 contacts only the innermost electrode of the electrochemical device.

In other embodiments the hub or wheel 240 may be formed of a conductive material, for example, titanium to aid in delivering and/or distributing current to the electrodes 205, 210. In such embodiments a first hub or wheel 240 may make electrical contact with only one of the anode 205 or cathode 210, while a second hub or wheel 240 makes electrical contact with the other of the anode 205 or cathode 210.

Figure 11:
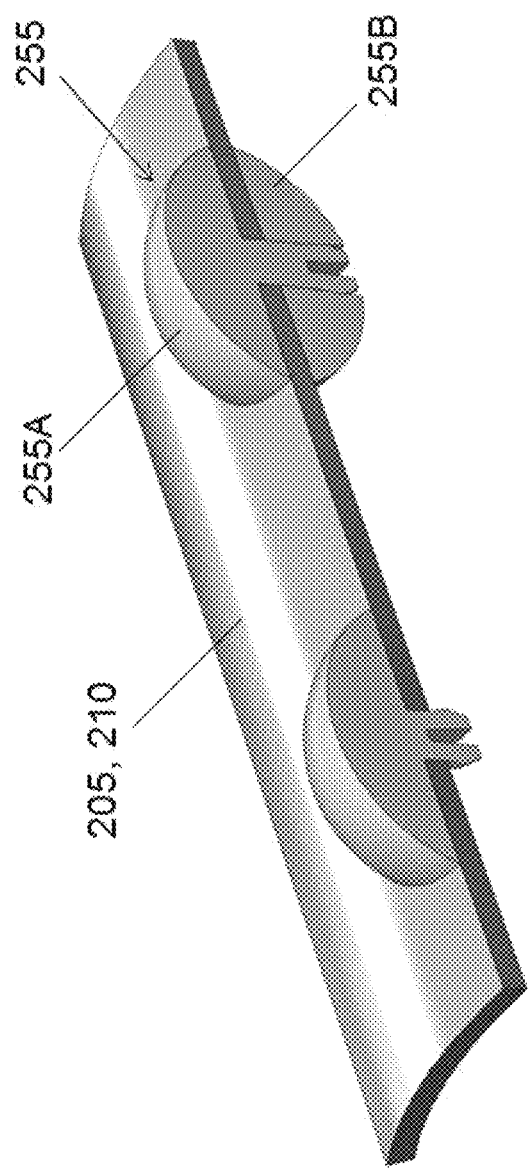
FIG. 11 illustrates an embodiment of electrode separators that may be used in embodiments of electrochemical cells as disclosed herein.

In other embodiments, the electrodes can be drilled at selected locations and nonconductive bumpers 255 installed to maintain the spacing to adjacent electrode surfaces, as shown in FIG. 11. The bumpers 255 can be molded non-conductive polymer, for example, PTFE or PVDF, and designed to snap in place. For example, the bumpers may include male and female portions, 255A, 255B, the male portion 255A configured to snap in place into the female portion 255B with the male portion 255A disposed on a first surface of the electrode 205, 210, and/or 235 (when present), and the female portion disposed on an opposite surface of the electrode 205, 210, and/or 235 (when present).

Figure 12A:
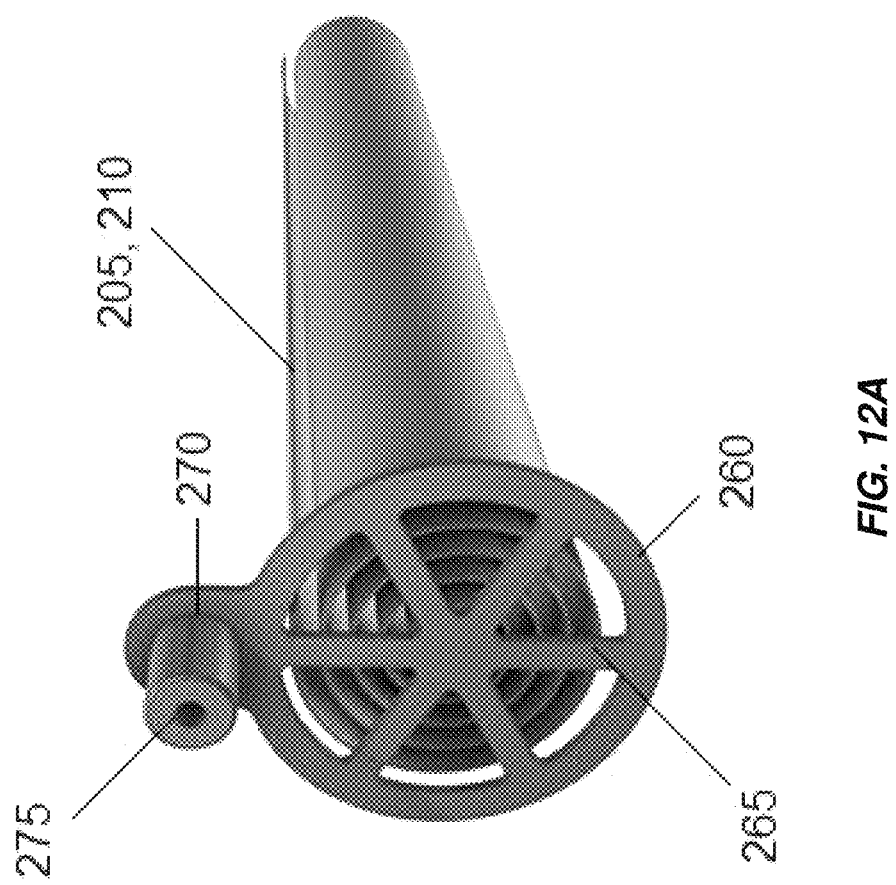
FIG. 12A illustrates another embodiment of an electrode separator/electrical contactor that may be used in embodiments of electrochemical cells as disclosed herein.
Figure 12B:
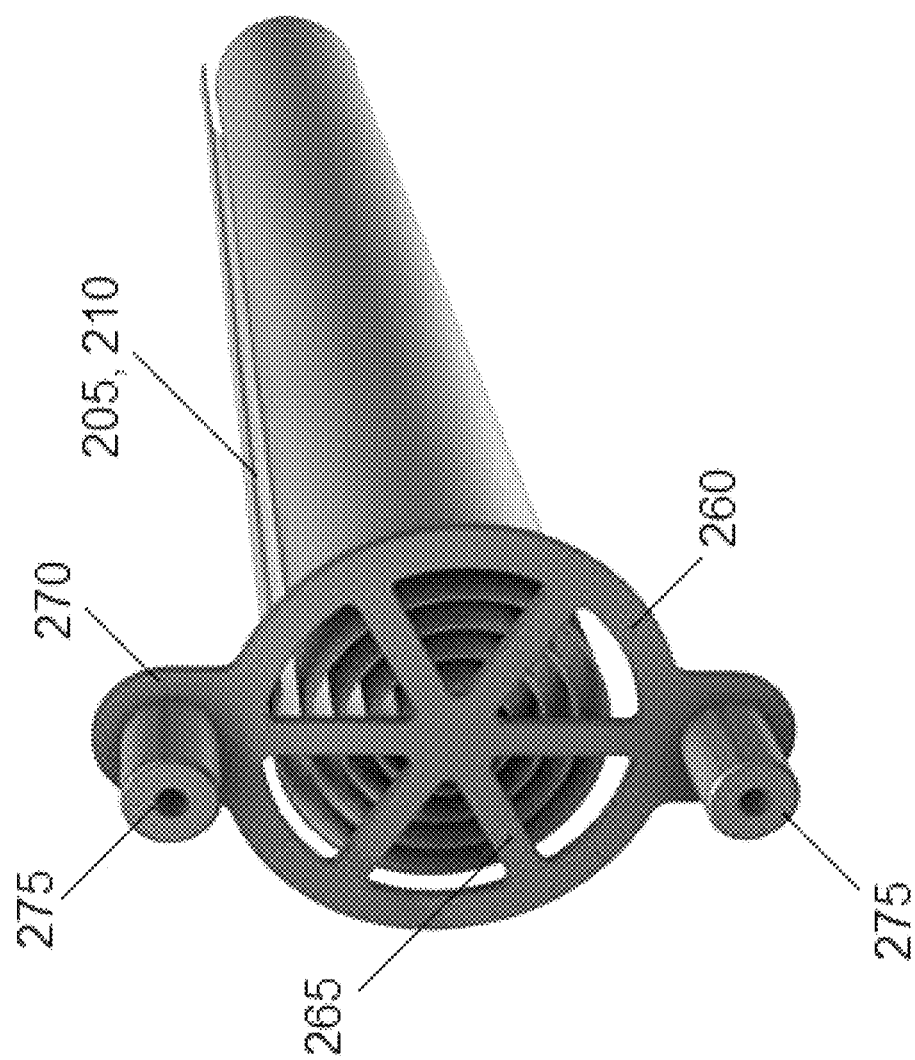
FIG. 12B illustrates another embodiment of an electrode separator/electrical contactor that may be used in embodiments of electrochemical cells as disclosed herein.
Figure 12C:
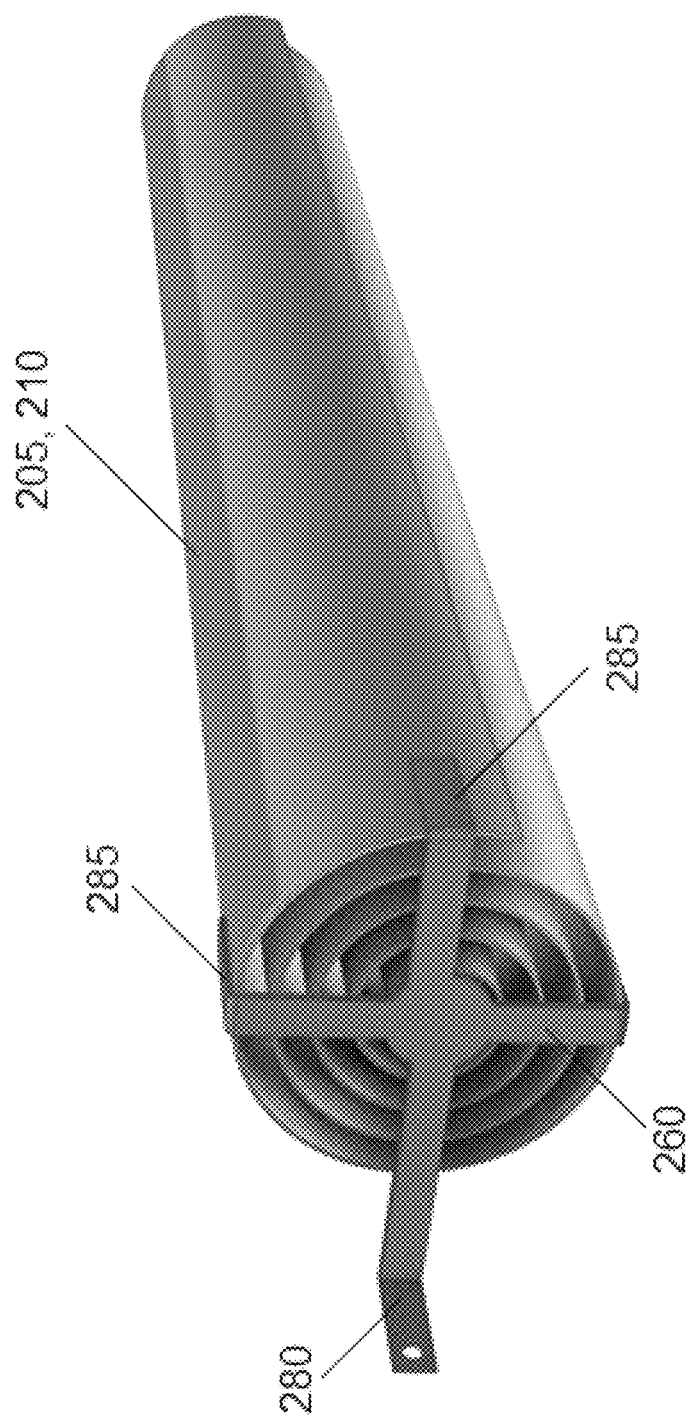
FIG. 12C illustrates another embodiment of an electrode separator/electrical contactor that may be used in embodiments of electrochemical cells as disclosed herein.

Electrical connections to the electrodes 205, 210 may include a titanium wheel-like device 260 with spokes 265 that are welded to the edge of an electrode to provide electrical connections, as shown in FIGS. 12A-12C. The spokes 265 may include slots at intervals that engage end edges of one of the electrodes 205, 210 to maintain spacing between the turns of the spiral of the electrode to which it connects. The outer rim 270 of the device 260 can be connected to a source of DC power, to provide electrical current to the electrode to which the device 260 is electrically connected. The outer rim 270 may include a single electrical connection 275 as illustrated in FIG. 12A, multiple electrical connections 275 as illustrated in FIG. 12B and/or a tab connector 280 as illustrated in FIG. 12C. The device 260 may include arms 285 extending along surfaces of the electrode 205, 210 to which it is electrically connected as illustrated in FIG. 12C to provide a greater area of electrical contact and thus a lower resistance contact than the devices 260 illustrated in FIGS. 12A and 12B. The connection(s) 275, 280 can be sealed and isolated from the environment for safety and corrosion prevention utilizing structures and methodologies as disclosed below.

In various embodiments, one or more tabs are attached to each electrode. FIG. 6 shows, for example strips of titanium welded to electrodes 205, 210 and bent at one end to form tabs 220, 225. The strips may be of thicker titanium than the electrodes to mechanically stiffen the edges of the electrodes and to provide a path of lower electrical resistance for current to flow down the edges.

Figure 13A:
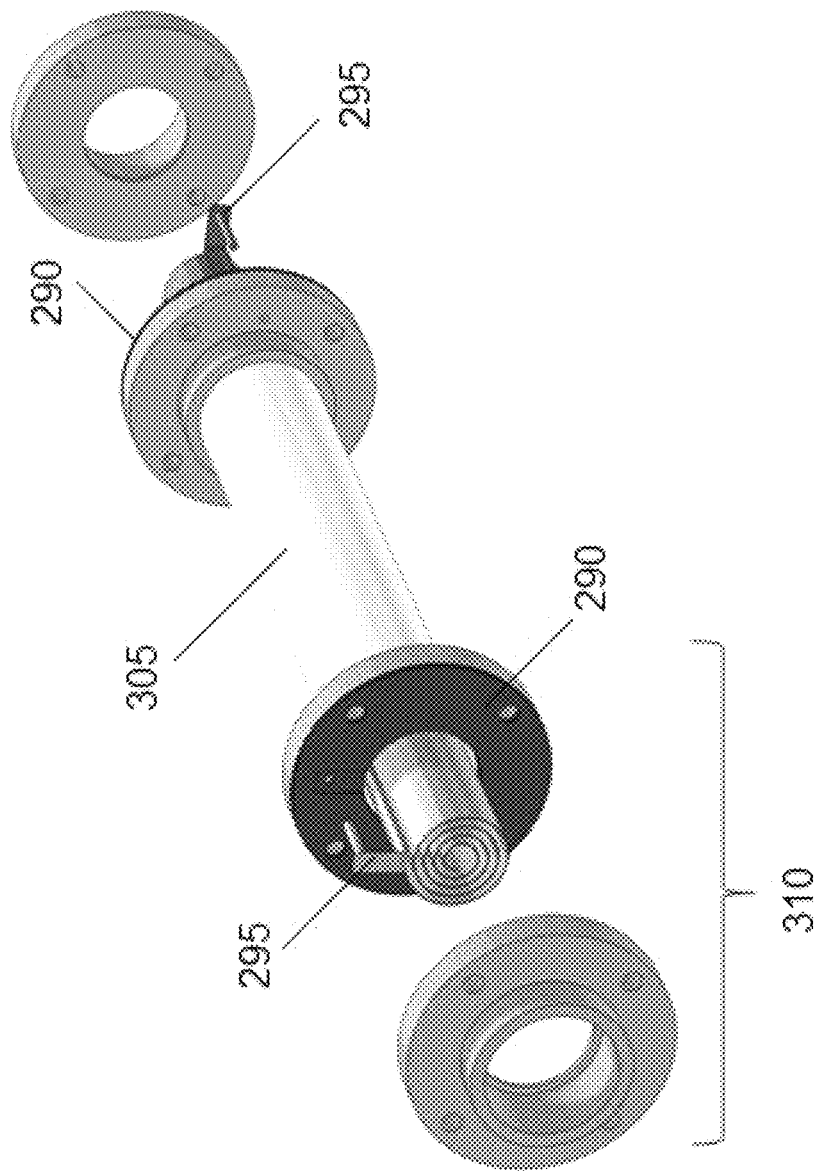
FIG. 13A is an exploded view of an embodiment of an electrochemical cell including a feature for hermetically sealing an electrode contact.
Figure 13B:
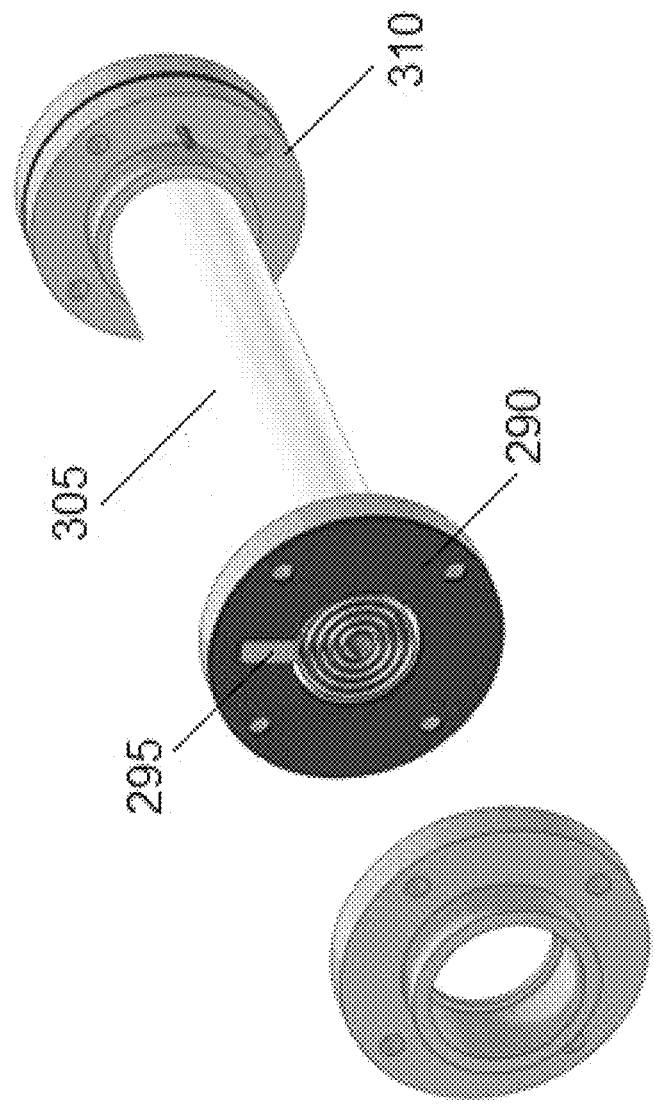
FIG. 13B is a partially assembled view of the electrochemical cell of FIG. 13A.
Figure 13C:
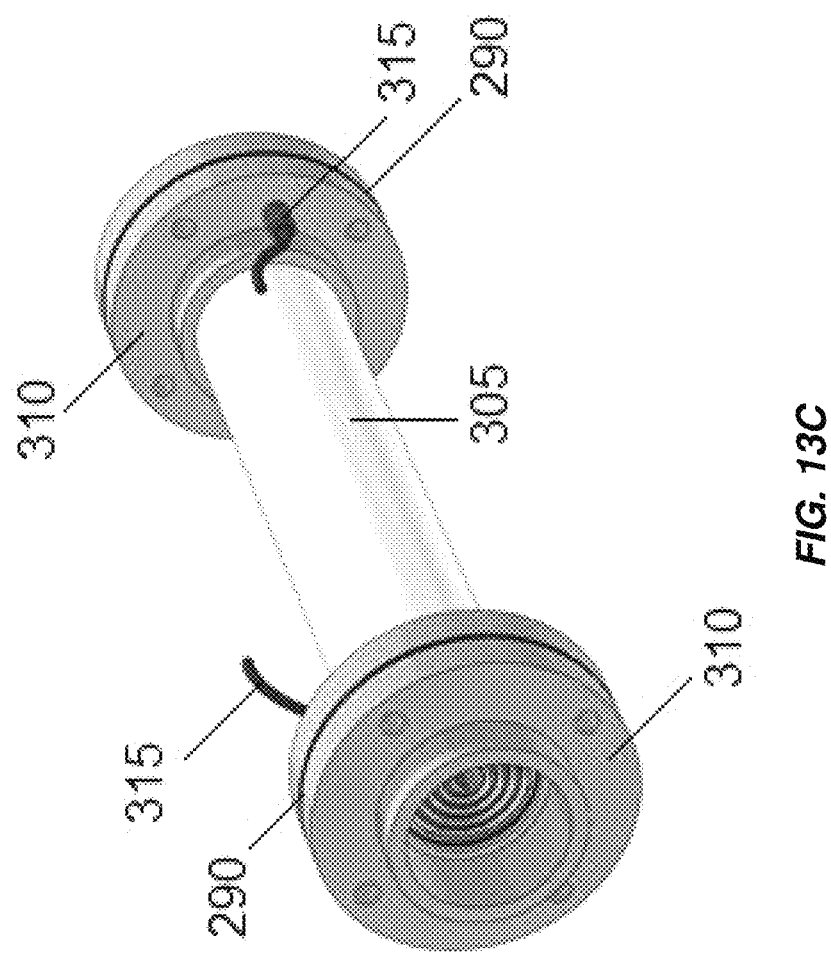
FIG. 13C is an assembled view of the electrochemical cell of FIG. 13A.

The connection between a tab and an electrical wire from a power source can be sealed and isolated from the environment and from electrolyte flowing through the electrochemical cell for safety and corrosion prevention. FIGS. 13A-13C show, for example, a method using gaskets 290 to seal tabs 295 within flanges 310 at the end of a non-metallic housing 305. Waterproof connectors 315 (for example, IP54 connectors) may be used to connect the tabs 295 to a source of DC power.

Aspects and embodiments of electrochemical or electrochlorination devices including spiral wound electrodes as disclosed herein may include anodes and cathodes (or anode-cathode pairs) that are configured and arranged to direct substantially all or all fluid passing through active areas or gaps between the anodes and cathodes in a direction substantially or completely axially through the active areas. The direction substantially or completely axially through the active areas may be parallel or substantially parallel to the central axis of the electrochemical cell and/or of the anodes and cathodes (or anode-cathode pairs). Fluid flowing through the active areas may still be considered flowing in the direction substantially or completely axially through the active areas even if the fluid flow exhibits turbulence and/or vortices during flow through the active areas.

Aspects and embodiments of electrochemical or electrochlorination devices including spiral wound electrodes as disclosed herein may have many advantages over the concentric tubes electrochlorination cells and parallel plate electrochlorination cells currently in the market. For example, in current concentric tube electrochlorination (CTE) cells, only the inner surface of the outer electrode and the outer surface of the inner electrode are active in the electrode reactions that produce sodium hypochlorite. The other electrode surfaces are isolated from the electrolyte solution. The outer tubes and the electrical connections are exposed to the environment.

In a design with spiral-wound electrodes, most or all of the surface area on both sides of each electrode is active. A device with two current passes in a four inch Schedule 40 housing (or a PVC housing, for example, SCH80 PVC), as shown in FIGS. 7A and 7B, has over five times the active area per unit volume of the device as compared to the electrochemical cell shown in FIG. 1. A device as disclosed herein would therefore be much more compact (over 80% smaller in volume) for an equivalent amount of active electrode area as a conventional CTE device.

In aspects and embodiments disclosed herein, the spiral-wound electrodes can be inserted into a non-metallic housing and connected to a source of DC or AC power by waterproof connectors so that no electrically live components are exposed to the outside environment (see FIGS. 13A-13C, for example). This design is much safer for the operators and there is no risk of short-circuit between the devices and an external grounded component or liquid. The sealed enclosures required by the current CTE devices would not be necessary, thereby decreasing the complexity and capital cost of a system.

Figure 3:
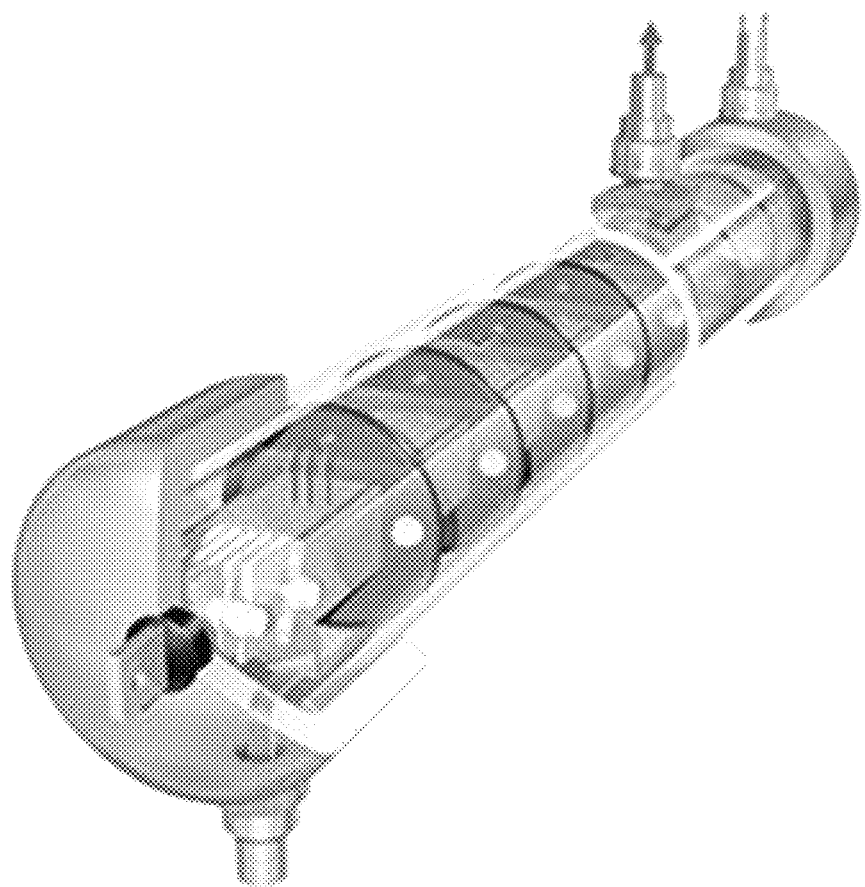
FIG. 3 is a perspective view of an embodiment of a parallel plate electrochemical cell.

In parallel plate electrochlorination (PPE) cells a complex frame structure is necessary to support and align a large number of flat electrodes and to direct fluid flow through the device (see FIG. 3, for example). A much smaller number of electrodes are necessary in embodiments of spiral-wound electrochemical devices as disclosed herein.

The density of active electrode area per unit volume of device as disclosed herein is expected to be higher for the spiral-wound device than for a parallel plate electrochlorination cell. The electrodes occupy the entire circular cross section of a cylindrical housing, vs. only a square or rectangular portion in the PPE.

Aspects and embodiments of electrochemical or electrochlorination devices including spiral wound electrodes as disclosed herein may have active densities of between about 46% and about 52%, greater than about 50%, in some embodiments, greater than about 75%, in some embodiments, greater than 85%, in some embodiments, greater than 90%, and in some embodiments up to about 95%.

Electrical connections to a single anode at one end of a spiral-wound device and a single cathode at the other end are less complex than connections to a multitude of anodes and cathodes as in the PPE (compare FIG. 4 to FIGS. 7A and 7B). Further, spiral-wound devices as disclosed herein are expected to have fewer parts and easier to assemble than a PPE.

Electrochlorination cells are used in marine, offshore, municipal, industrial and commercial implementations. The design parameters of spiral-wound electrochemical devices, for example, inter-electrode spacing, thickness of electrodes and coating density, electrode areas, methods of electrical connections, etc. can be optimized for different implementations. Aspects and embodiments disclosed herein may therefore replace both the CTE and PPE designs and allow consolidation of product lines on one design platform, with consequent benefit from commonality in components and scale in procurement and manufacturing.

Figure 14A:
FIG. 14A is a partially cross-sectional view of an embodiment of a three tube concentric tube electrochemical cell.

In accordance with another aspect, an electrochlorination cell includes a plurality of concentric tube electrodes. At least some of the concentric tube electrodes may be mono-polar or bi-polar. A first embodiment, including three concentric tubes, is illustrated in FIG. 14A indicated generally at 400. The middle tube electrode 405 is an anode having an oxidation resistant coating, for example, platinum or MMO, on both the inner and outer surface to make full use of the surface area of the middle tube electrode 405. The inner tube electrode 410 and outer tube electrode 415 have no coating, acting as an inner cathode and an outer cathode, respectively. The electrodes are mono-polar such that current passes through the electrolyte once per electrode. Each of the electrodes 405, 410, 415 may include a titanium tube. The anode electrical connection 430 is in electrical communication with the middle tube electrode 405. The cathode electrical connection 435 is in electrical communication with the inner tube electrode 410 and outer tube electrode 415.

In embodiments disclosed herein including multiple anode or cathode tube electrodes, the multiple anode tube electrodes may be referred to collectively as the anode or the anode tube, and the multiple cathode tube electrodes may be referred to collectively as the cathode or the cathode tube. In embodiments including multiple anode and/or multiple cathode tube electrodes, the multiple anode tube electrodes and/or multiple cathode tube electrodes may be collectively referred to herein as an anode-cathode pair.

In some aspects and embodiments of electrochemical cells including concentric tube electrodes, for example, one or more anodes and/or cathodes as disclosed herein, the electrodes are configured and arranged to direct fluid through one or more gaps between the electrodes in a direction parallel to a central axis of the electrochemical cell. In some aspects and embodiments of electrochemical cells including concentric tube electrodes, for example, one or more anodes and/or cathodes as disclosed herein, the electrodes are configured and arranged to direct all fluid introduced into the electrochemical cell through the one or more gaps between the electrodes in a direction parallel to a central axis of the electrochemical cell.

The width of the gaps 420, 425 between the electrodes may be constant or variable. The width of the gaps between the electrodes may be, for example, between about 1 mm and about 5 mm across, and, as discussed above, may be selected based on a type of electrolyte to be treated in the electrochemical cell. A feed electrolyte solution flows through the two annular gaps 420, 425 formed between the three tube electrodes. A DC voltage, constant or variable, or in some embodiments, an AC current, is applied across the anode and cathode electrical connections 430, 435. The current flows from the inner and outer surfaces of the anode (middle tube electrode 405) simultaneously to the inner and outer cathodes (inner tube electrode 410 and outer tube electrode 415). Electrical connection may be made between the inner tube electrode 410 and outer tube electrode 415 by one or more conductive bridges 440, which may be formed of the same material as the inner tube electrode 410 and outer tube electrode 415, for example, titanium. Electrochemical and chemical reactions occur at the surfaces of the electrodes and in the bulk solution to generate a product solution, for example, sodium hypochlorite for disinfection. Electrochlorination cell 400 may be included in a non-conductive housing, for example housing 305 illustrated in FIG. 6.

Figure 14B:
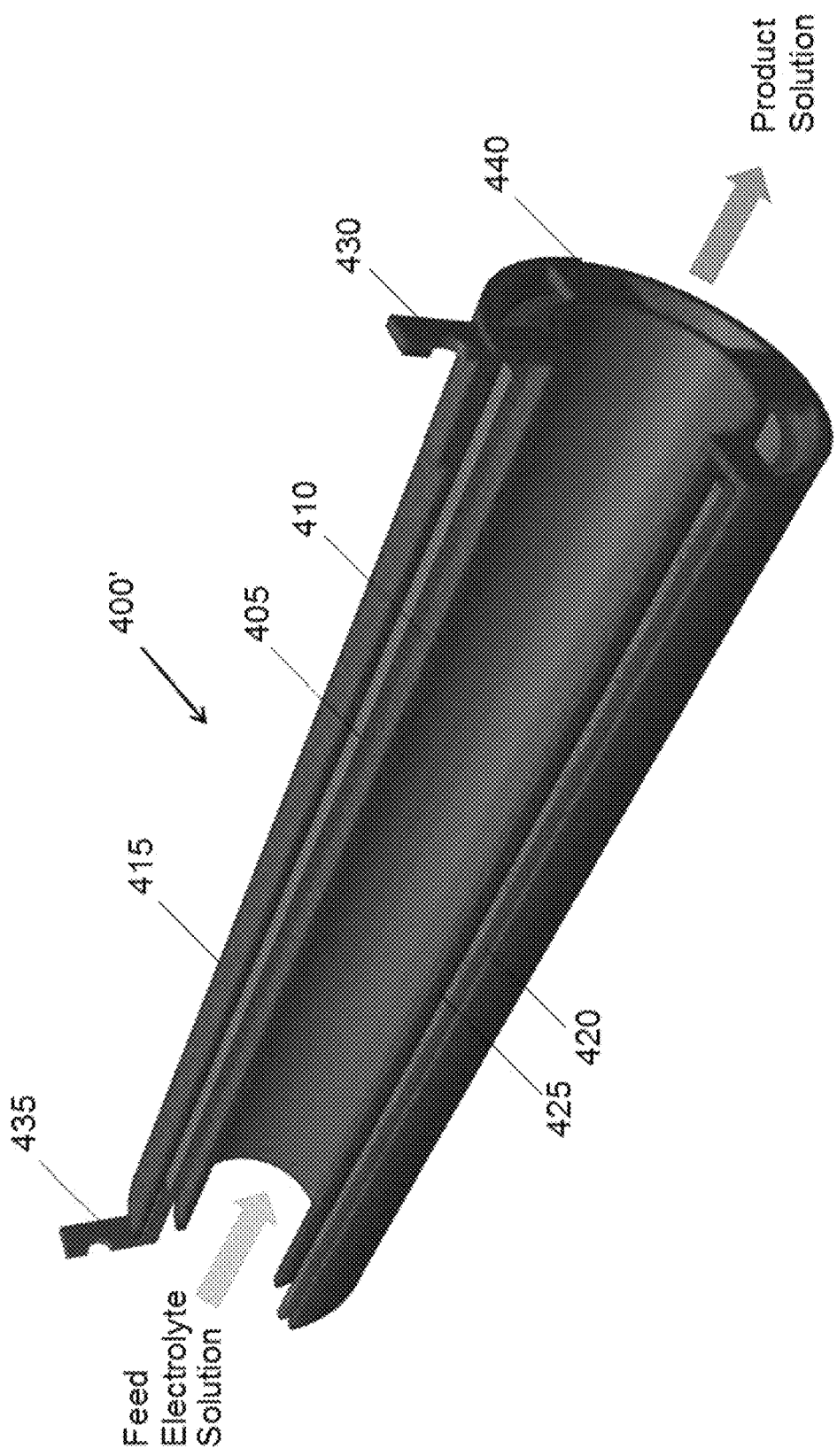
FIG. 14B is a partially cross-sectional view of another embodiment of a three tube concentric tube electrochemical cell.

In another embodiment illustrated in FIG. 14B generally at 400', the middle tube electrode 405 is uncoated or un-plated, so the inside and outside of middle tube electrode 405 act as two cathode surfaces. The surface of inner tube electrode 410 and outer tube electrode 415 facing the middle tube electrode 405 are coated with an oxidation resistant coating, for example, MMO or platinum to form two anode surfaces. The electrodes are mono-polar such that current passes through the electrolyte once per electrode. Each of the electrodes 405, 410, 415 may include a titanium tube. The anode electrical connection 430 is electrical communication with the inner tube electrode 410 and outer tube electrode 415. The cathode electrical connection 435 is in electrical communication with the of middle tube electrode 405.

The embodiment illustrated in FIG. 14B is similar to that illustrated in FIG. 14A, except the current flows from the anode surface on inner tube electrode 410 and outer tube electrode 415 to the two cathode surfaces on the middle tube electrode 405. Electrical connection may be made between the inner tube electrode 410 and outer tube electrode 415 by one or more conductive bridges 440, which may be formed of and comprise or consist of the same material as the inner tube electrode 410 and outer tube electrode 415, for example, titanium. The electrodes of any embodiments of electrochemical cells including concentric tube electrodes may be rigid metal electrodes with thicknesses of, for example, between about 0.25 mm and about 3 mm, between about 0.9 mm and about 2 mm, or about 1.5 mm. Electrochemical and chemical reactions occur at the surfaces of the electrodes and in the bulk solution to generate a product solution such as sodium hypochlorite in the annular gaps 420, 425 formed between the tube electrodes 405, 410, 415. Electrochemical or electrochlorination cell 400' may be included in a non-conductive housing, for example, housing 305 illustrated in FIG. 6. In some embodiments, flow of electrolyte through the center of electrochemical cells 400, 400' through the interior of innermost electrodes 410, may be blocked by including a non-conductive core, for example, as illustrated in FIG. 7B and as described above in the electrochemical cells and/or end caps, for example, as illustrated in FIG. 10 and/or FIG. 17, discussed below.

Figure 15:
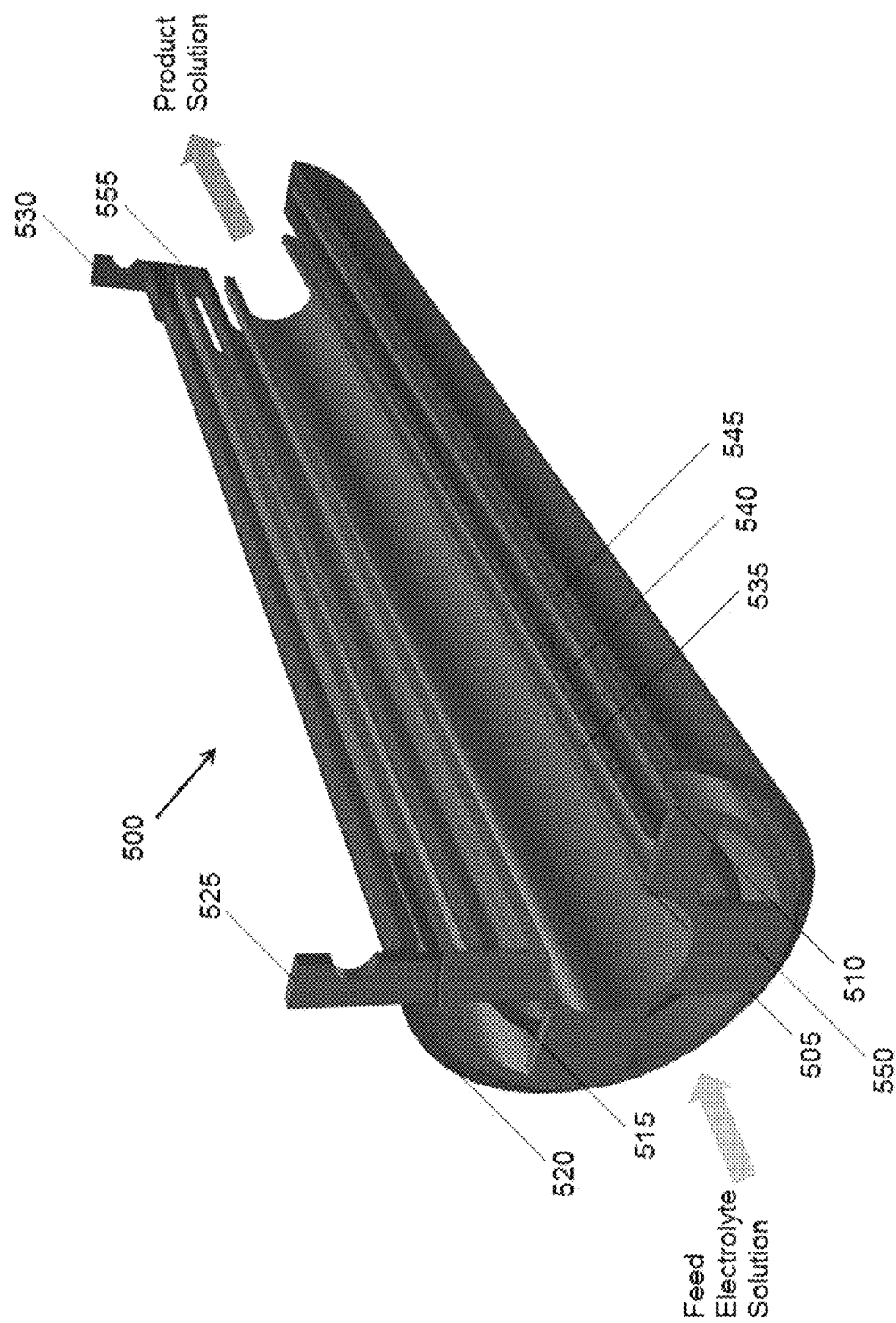
FIG. 15 is a partially cross-sectional view of an embodiment of a four tube concentric tube electrochemical cell.

In accordance with another embodiment, a concentric tube electrochemical or electrochlorination cell includes four concentric tube electrodes. An example of a four tube electrochlorination cell is shown in FIG. 15, indicated generally at 500. The four tube electrochlorination cell 500 includes inner tube electrode 505 and intermediate tube electrode 510 that act as anodes and that may be in electrical communication with anode electrical connector 525. Inner tube electrode 505 and intermediate tube electrode 510 may also be in electrical communication with one another via one or more conductive bridges 550. Outer tube electrode 520 and intermediate tube electrode 515 act as cathodes that may be in electrical communication with cathode electrical connector 530. Outer tube electrode 520 and intermediate tube electrode 515 may also be in electrical communication with one another via one or more conductive bridges 555. Outer tube electrode 520 and intermediate tube electrode 515 are disposed on opposite sides of intermediate anode tube electrode 510.

The four tube electrochlorination cell 500 works in a similar way to the three tube electrochlorination cell 400, except that a feed electrolyte solution flows through the three annular gaps 535, 540, 545 formed in the four tube electrochlorination cell 500. The extra tube added to the three tube electrochlorination cell 400 to form the four tube electrochlorination cell 500 provides an additional cathode electrode surface, an additional anode surface and an additional annular gap. Electrochemical and chemical reactions occur at the surfaces of the electrodes and in the bulk solution to generate a product solution in the three annular gaps 535, 540, 545 formed in the four tube electrode electrochlorination cell 500. Electrochlorination cell 500 may be included in a non-conductive housing, for example, housing 305 illustrated in FIG. 6. In other embodiments, outer tube electrode 520 and intermediate tube electrode 515 are used as anodes and may be coated with an oxidation resistant coating, and inner tube electrode 505 and intermediate tube electrode 510 are used as cathodes and do not include the oxidation resistant coating. In some embodiments, flow of electrolyte through the center of electrochemical cell 500 through the interior of innermost electrode 505, may be blocked by including a non-conductive core, for example, as illustrated in FIG. 7B in the electrochemical cell and/or end caps, for example, as illustrated in FIG. 10 and/or FIG. 17, discussed below.

Figure 16:
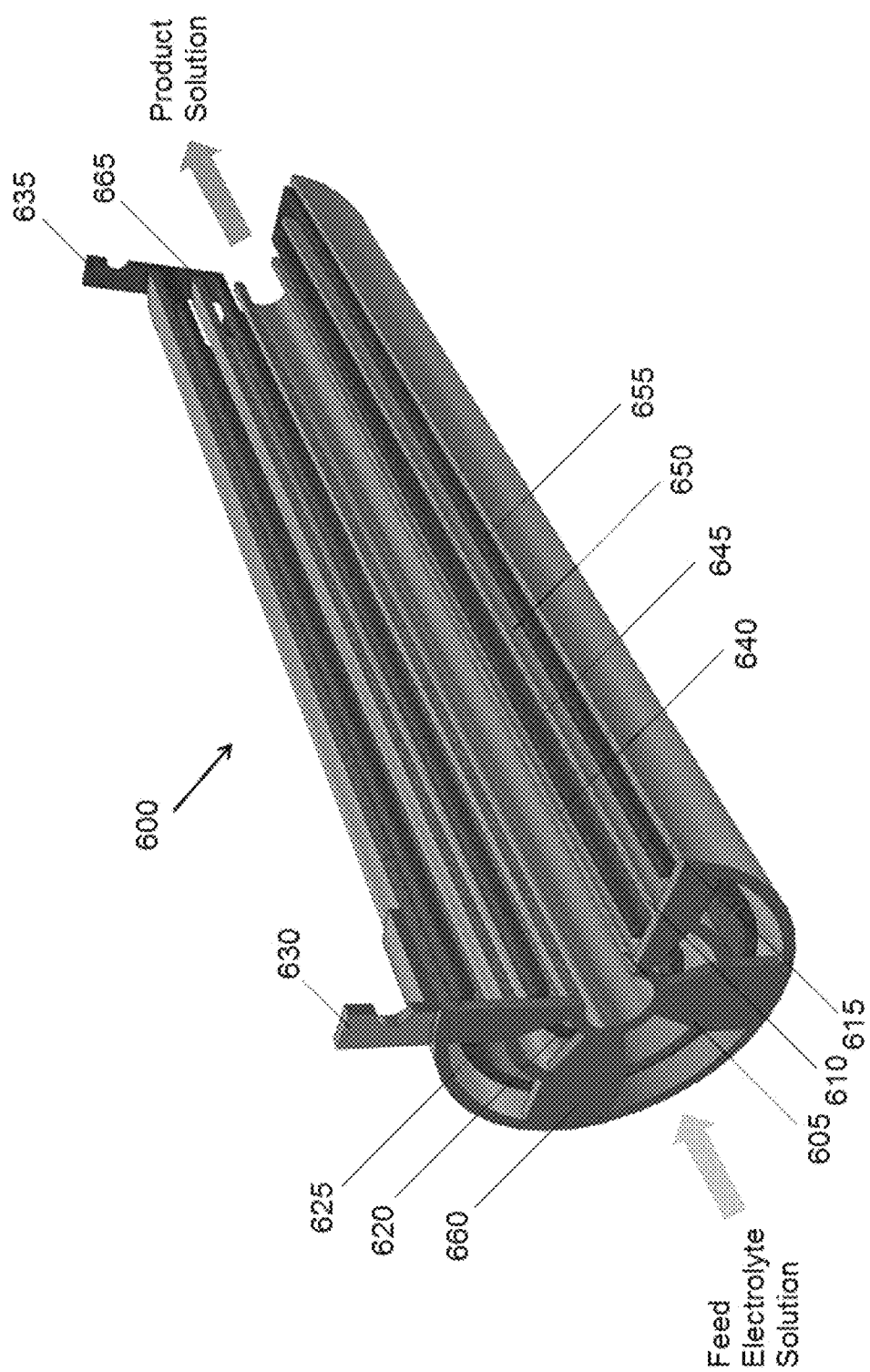
FIG. 16 is a partially cross-sectional view of an embodiment of a five tube concentric tube electrochemical cell.

In accordance with another embodiment, a concentric tube electrochlorination cell includes five concentric tube electrodes. An example of a five tube electrochlorination cell is shown in FIG. 16, indicated generally at 600. The five tube electrochlorination cell 600 includes intermediate tube electrodes 620 and 625 that act as anodes and that may be in electrical communication with anode electrical connector 635. Intermediate tube electrodes 620, 625 may also be in electrical communication with one another via one or more conductive bridges 665. Inner tube electrode 605, center tube electrode 610, and outer tube electrode 615 act as cathodes that may be in electrical communication with cathode electrical connector 630. Inner tube electrode 605, center tube electrode 610, and outer tube electrode 615 may also be in electrical communication with one another via one or more conductive bridges 660. Intermediate tube electrodes 620, 625 are disposed on opposite sides of center anode tube electrode 610.

The five tube electrochlorination cell works in a similar way to the four tube electrochlorination cell 500, except a feed electrolyte solution flows through the four annular gaps 640, 645, 650, 655 formed in the five tube electrochlorination cell. The extra tube added to the four tube electrochlorination cell 500 to form the five tube electrochlorination cell 600 provides additional cathode electrode surface, an additional anode surface and an additional annular gap. Electrochemical and chemical reactions occur at the surfaces of the electrodes and in the bulk solution to generate a product solution in the four annular gaps formed in the five tube electrode electrochlorination cell 600. Electrochlorination cell 600 may be included in a non-conductive housing, for example, housing 305 illustrated in FIG. 6. In other embodiments, inner tube electrode 605, center tube electrode 610, and outer tube electrode 615 are used as anodes and may be coated with an oxidation resistant coating, and intermediate tube electrodes 620 and 625 are used as cathodes and do not include the oxidation resistant coating. In some embodiments, flow of electrolyte through the center of electrochemical cell 600 through the interior of innermost electrode 605, may be blocked by including a non-conductive core, for example, as illustrated in FIG. 7B in the electrochemical cell and/or end caps, for example, as illustrated in FIG. 10 and/or FIG. 17, discussed below.

Figure 17:
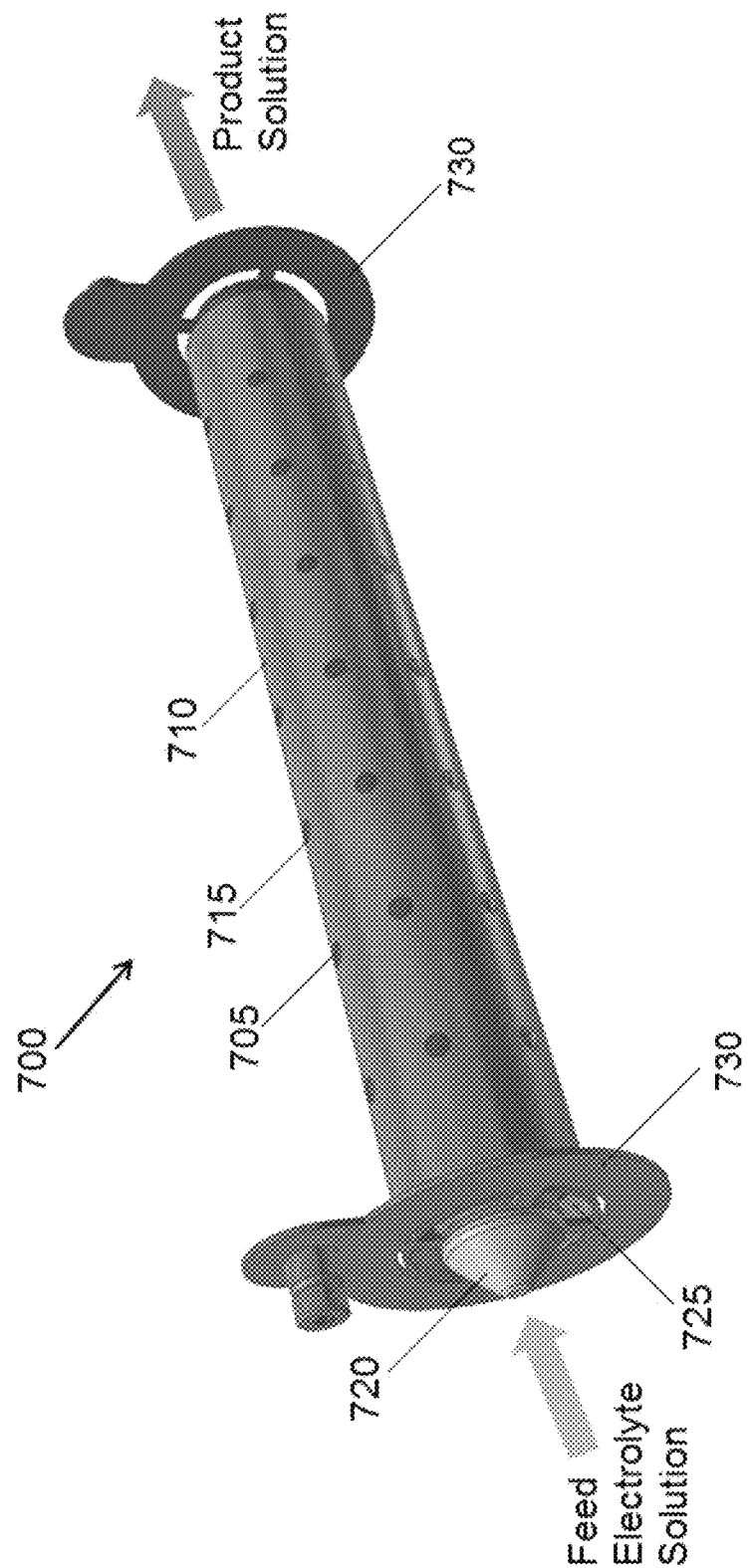
FIG. 17 is an isometric view of an embodiment of an electrochemical cell including a fluid permeable electrode and end caps.

FIG. 17 shows another embodiment of an electrochemical cell, indicated generally at 700. As illustrated in FIG. 17 the anode and/or cathode tubes 705, 710 of an electrochlorination cell may have apertures 715 to allow hydrogen generated in electrochemical reactions in the electrochlorination cell to flow through the electrodes 705, 710 more easily and reduce hydrogen masking effects at the electrode surface(s). Hydrogen masking reduces available anode area and subsequently sodium hypochlorite output. Additionally or alternatively the anode(s) and/or cathode(s) may include a fluid permeable and/or perforated or mesh material, for example, perforated titanium or a titanium mesh as illustrated in FIG. 8. An end cap 720 may be provided and an inlet end and/or an outlet end of the electrochemical cell 700 to provide a capped central core. The end cap(s) 720 are central core elements or fluid flow directors that prevent fluid from flowing down a central conduit of the electrochemical cell 700 defined inside of the innermost tube electrode and bypassing the annular gap(s) 725. In some embodiments, the end cap(s) 720 may be connected to the innermost concentric tube electrode of a concentric tube electrode electrochemical cell with one or more mechanical fasteners and/or by a friction fit. In some embodiments, the end cap(s) 720 may contact and/or be connected to only the innermost concentric tube electrode of a concentric tube electrode electrochemical cell. At least one electrode of embodiments of concentric tube electrode electrochemical cells may be unconnected to and not in contact with the end cap(s) 720.

The electrodes may be positioned inside a non-metallic housing, designed to electrically isolate the electrodes from the outside environment and to withstand the fluid pressure, for example, the housing 305 as illustrated in FIG. 6. The features, for example, the holes in the electrodes 715 and the end cap(s) 720 illustrated in FIG. 17 may be included in any of the embodiments of multi-tube electrochlorination or electrochemical cells or embodiments of spiral wound electrochemical cells disclosed herein.

Figure 18A:
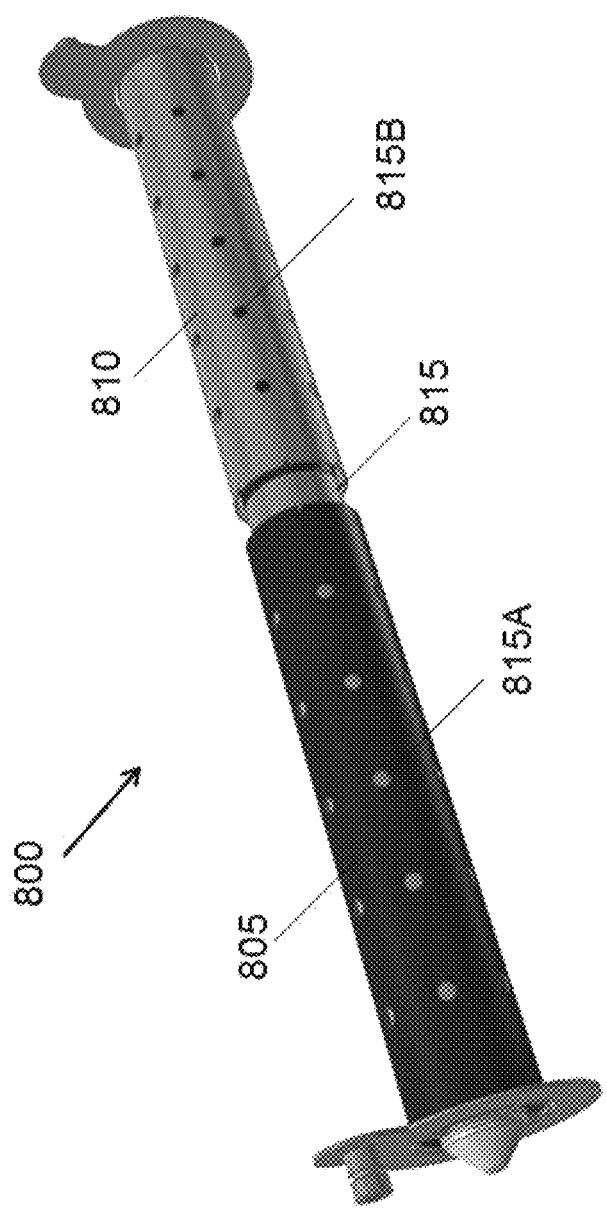
FIG. 18A is an isometric view of an embodiment of an dual pass electrochemical cell including a fluid permeable electrode and end caps.
Figure 18B:
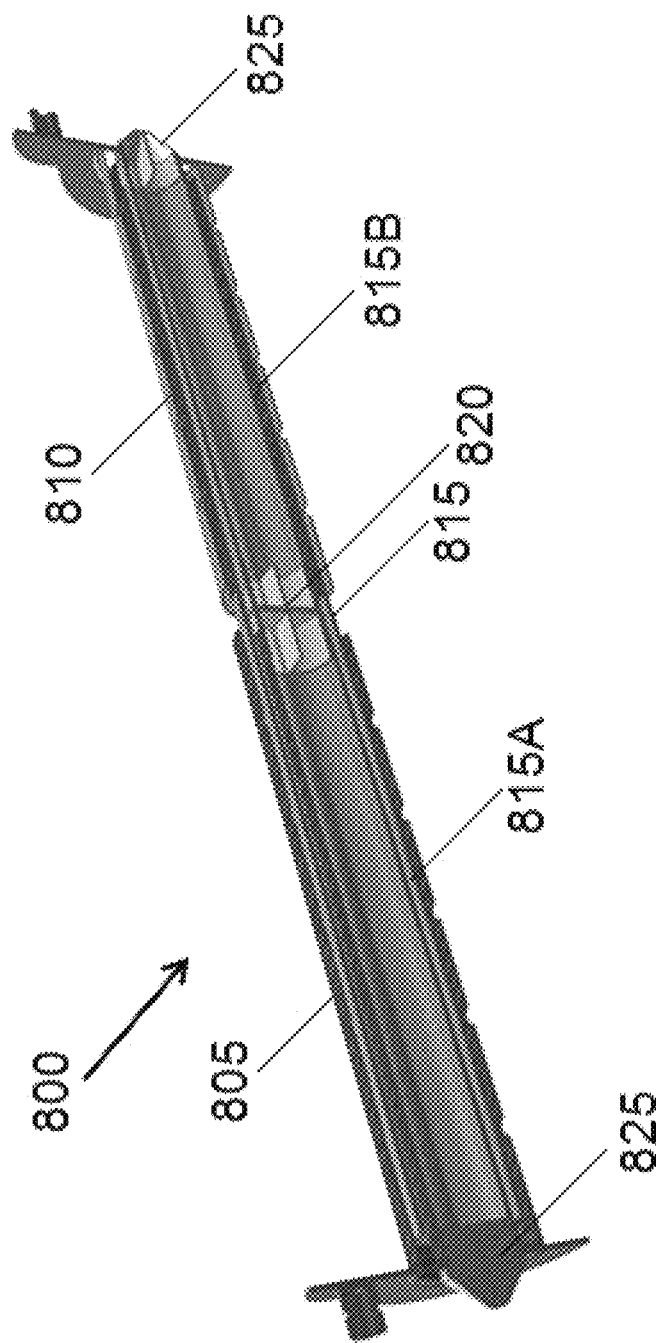
FIG. 18B is a cross-sectional view of the electrochemical cell of FIG. 18A.

FIGS. 18A and 18B show another embodiment of a concentric electrode tube electrochemical cell, indicated generally at 800. In addition to the multi-tube anode 805 and cathode 810 there is a third tube electrode 815 that is bipolar. One end portion 815A of bipolar tube electrode 815 (in some embodiments about one half of the electrode 815) is uncoated to function as a cathode and the other end portion 815B (in some embodiments about one half of the electrode 815) is coated with an oxidation resistant coating, for example, platinum or MMO, to function as an anode. The bipolar tube electrode 815 is nested within the anode tube electrode 805 and the cathode tube electrode 810, the anode tube electrode 805 surrounding end portion 815A and the cathode tube electrode 810 surrounding end portion 815B. An anode tube electrode 805 and a cathode tube electrode 810 having a common diameter are laterally displaced along a length of the electrochemical cell 800. The bipolar tube electrode 815 is oriented to enable current to flow in two passes through electrolyte solution passing between the bipolar tube electrode 815 and the anode tube electrode 805 and the cathode tube electrode 810, in a similar manner as in the device illustrated in FIG. 2B. As shown in FIG. 18B, an internal spacer cap 820 and/or end cap(s) 825 is a central core element or fluid flow director that may be disposed in the bipolar tube electrode 815 to prevent flow of liquid through the center of the innermost electrode (e.g., the innermost bipolar tube electrode 815) of the electrochemical cell 800. The electrochemical cell 800 may be mounted inside a non-metallic housing, for example, housing 305 illustrated in FIG. 6.

Figure 4:
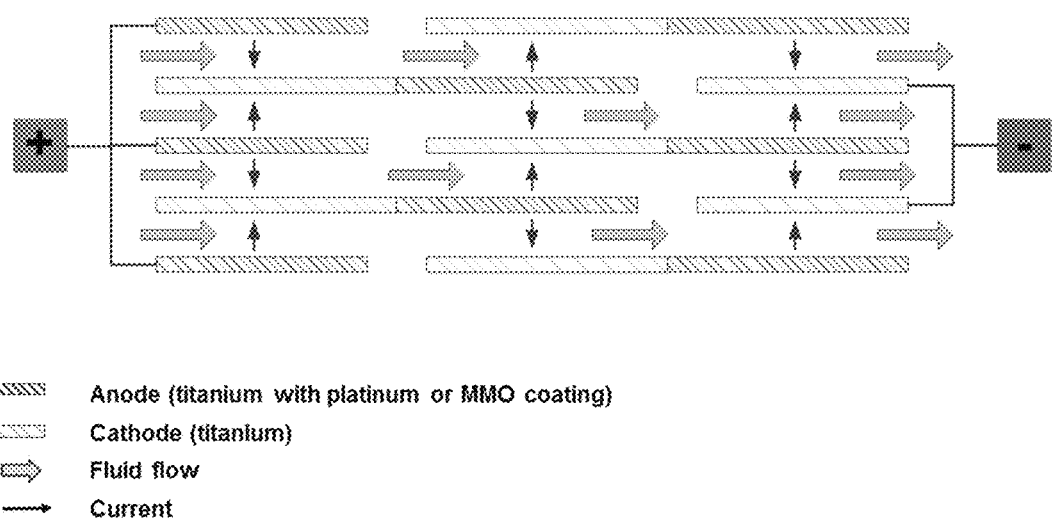
FIG. 4 is a schematic of a multiple-pass parallel plate electrochlorination cell.

By inserting additional bipolar tube electrodes 815 and overlapping respective anode tube electrodes 805 and cathode tube electrodes 810 such that anode and cathode tube electrodes are provided on alternative sides of a plurality of bipolar tube electrodes along a radial direction through the electrochlorination or electrochemical cell, an electrochlorination cell can be assembled to provide three or more current passes, schematically similar to the multi-pass PPE shown in FIG. 4.

Figure 19A:
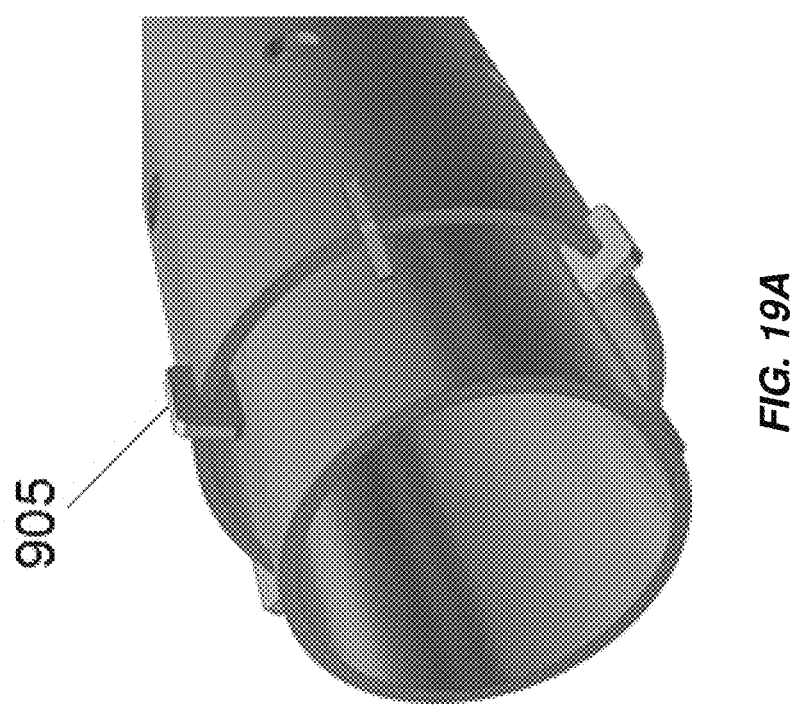
FIG. 19A illustrates an embodiment of electrode spacers for use in embodiments of electrochemical cells as disclosed herein.
Figure 19B:
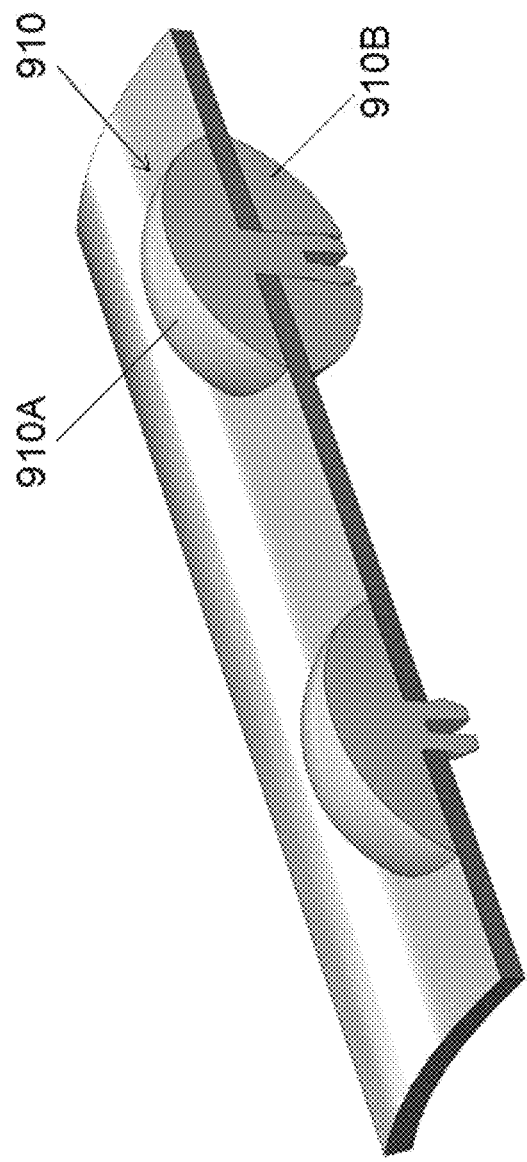
FIG. 19B illustrates another embodiment of electrode spacers for use in embodiments of electrochemical cells as disclosed herein.

Each electrode in a concentric tube electrochemical or electrochlorination cell may be fabricated using commercially available ASTM B338 titanium tube or ANSI pipework or metric equivalent, coated or uncoated. Titanium end connector plates 730 may be laser cut and may be welded to the electrode tubes as shown in FIG. 17, to set the gap width between the electrode tubes and to transfer current the electrode tubes. A gap of, for example, from about 1 mm to about 5 mm in width or between about 3 mm and about 4 mm in width may be maintained along the electrode tubes using spacer pips or separators made from a chemically inert and/or non-conductive material, for example, PTFE or PVDF. The separators may include spacer tabs 905, for example, C-shaped or U-shaped spacer tabs that fit around edges of electrode tubes as illustrated in FIG. 19. Additionally or alternatively, the electrodes can be drilled at selected locations and non-conductive bumpers 910 installed to maintain the spacing to adjacent electrode surfaces, as shown in FIG. 19B. The bumpers 910 can be molded non-conductive polymer, for example, PTFE or PVDF, and designed to snap in place. For example, the bumpers may include male and a female portions, 910A, 910B, the male portion 910A configured to snap in place into the female portion 910B with the male portion 910A disposed on a first surface of an electrode, and the female portion disposed on an opposite surface of the electrode. Additionally or alternatively, the separators may include threaded fixtures 915 that pass through an orifice in an electrode tube and space the electrode tube from an adjacent electrode tube as illustrated in FIG. 19C. Any of the separators illustrated in FIGS. 19A-19C may also be utilized in embodiments of spiral-wound or parallel plate electrochemical or electrochlorination cells as disclosed herein.

Figure 20B:
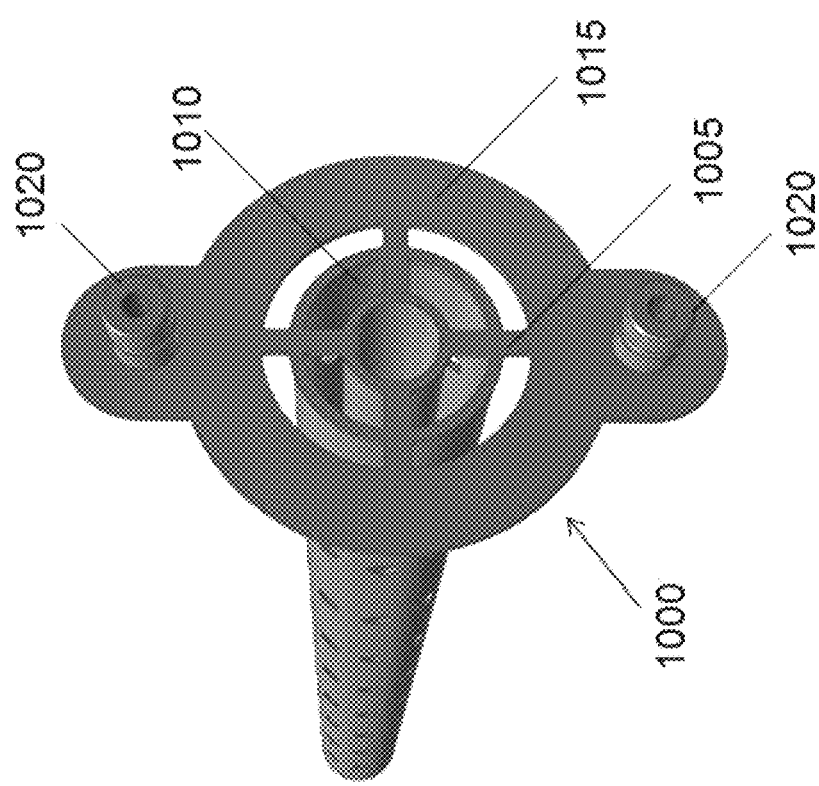
FIG. 20B illustrates another embodiment of an electrode separator/electrical contactor that may be used in embodiments of electrochemical cells as disclosed herein.

As illustrated in FIGS. 20A and 20B, a wheel-like device 1000 made of, for example, titanium and including spokes 1005 that are welded to edges of electrodes in a multi-tube electrochemical or electrochlorination cell as disclosed herein may be utilized to provide electrical connections to the electrodes. A first wheel-like device 1000 may be provided on a first end of a multi-tube electrochemical or electrochlorination cell as disclosed herein to provide electrical contact to the anode electrode tube(s) and a second wheel-like device 1000 may be provided on a second end of a multi-tube electrochemical or electrochlorination cell as disclosed herein to provide electrical contact to the cathode electrode tube(s). Apertures 1010 may be provided in the wheel-like device 1000 to allow fluid to flow through the gaps between the concentric electrode tubes. The spokes 1005 may have positioning elements, for example, slots, tabs, pins, and/or protrusions at intervals, for example, similar to the slots in the wheel 240 shown in FIG. 10 to engage the electrode tubes and maintain spacing between the electrode tubes. The outer rim 1015 of the wheel-like device 1000 can be connected to a source of power utilizing a single connector 1020, as shown in the FIG. 20A, or multiple connectors 1020, as shown in FIG. 20B.

Figure 21A:
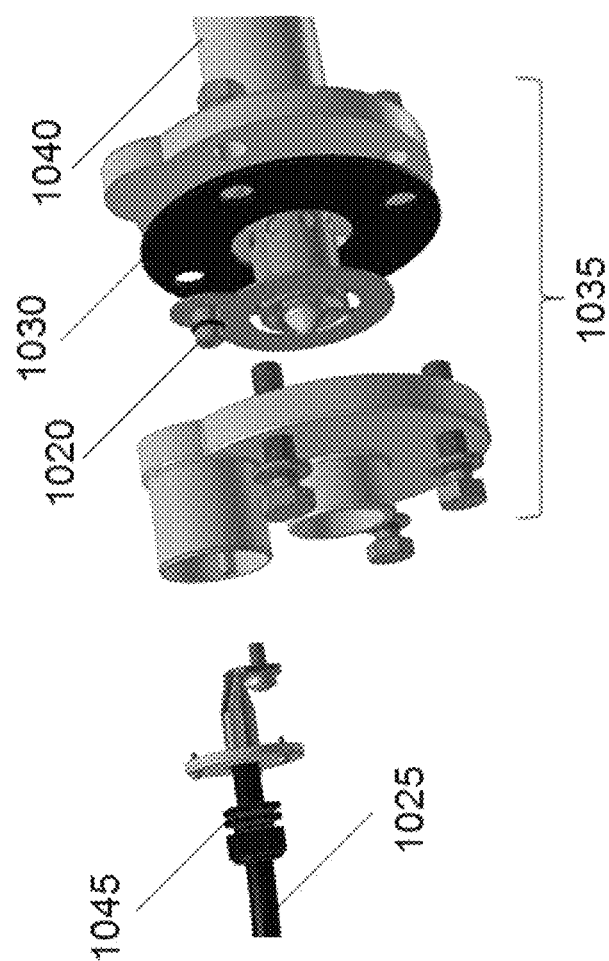
FIG. 21A is an exploded view of an embodiment of system for assembling an electrochemical cell with a hermetically sealed electrode contact.
Figure 21B:
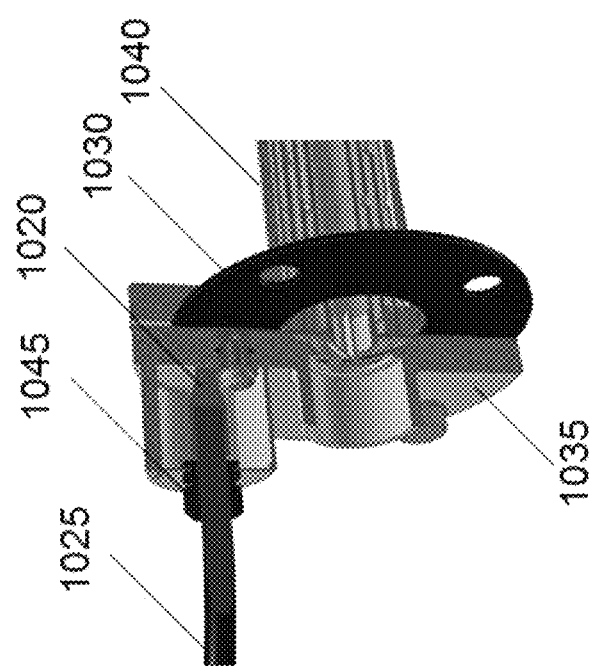
FIG. 21B is a cross-sectional view of an assembled version of the system of FIG. 21A.

The connection between an electrical connector 1020 and an electrical wire 1025 from a power source can be sealed and isolated from the environment for safety and corrosion prevention. FIGS. 21A and 21B illustrate an example of a method using gaskets 1030 to seal an electrical connector 1020 within a flange 1035 at the end of a non-metallic housing 1040 in which an electrochemical or electrochlorination cell is disposed. Waterproof connectors 1045 (for example, IP54 connectors) are used to connect the electrical connector 1020 to the source of power.

FIGS. 21A and 21B also illustrate embodiments that provide for a high ingress protection (IP) rating which protects operators from shock hazard and dispenses with the need for an expensive weatherproof enclosure. High density plastic pipework components using, for example, ABS, U-PVC, C-PVC, and/or PVDF material may be used for the non-metallic housing 1040 due to their chemical resistance to sodium hypochlorite and a high achievable pressure rating in the range of about 5 to about 15 Bar. Commercially available high IP rated cable connectors may be used to transfer current to and from the electrodes.

The embodiments of electrochemical or electrochlorination cells and devices including multiple concentric tube electrodes have many advantages over electrochemical or electrochlorination designs currently in use. For example, in current concentric tube electrochlorination (CTE) cells, only the inner surface of the outer electrode and the outer surface of the inner electrode are active in the electrode reactions that product sodium hypochlorite. The other surfaces are isolated from the electrolyte solution. The outer tubes and the electrical connections are exposed to the environment. In contrast, in embodiments with multi-tube electrodes (for example three tube and five tube embodiments), the anodes use both inside and outside surfaces of the anode electrode tubes are coated with an oxidation resistant coating, for example, MMO or platinum.

An electrochemical or electrochlorination cell including four concentric electrode tubes would be coated or plated on both sides of one anode tube, while the other anode tube would only be coated on one side. However, this still represents a more efficient use of material when compared to existing CTE design.

Figure 1B:
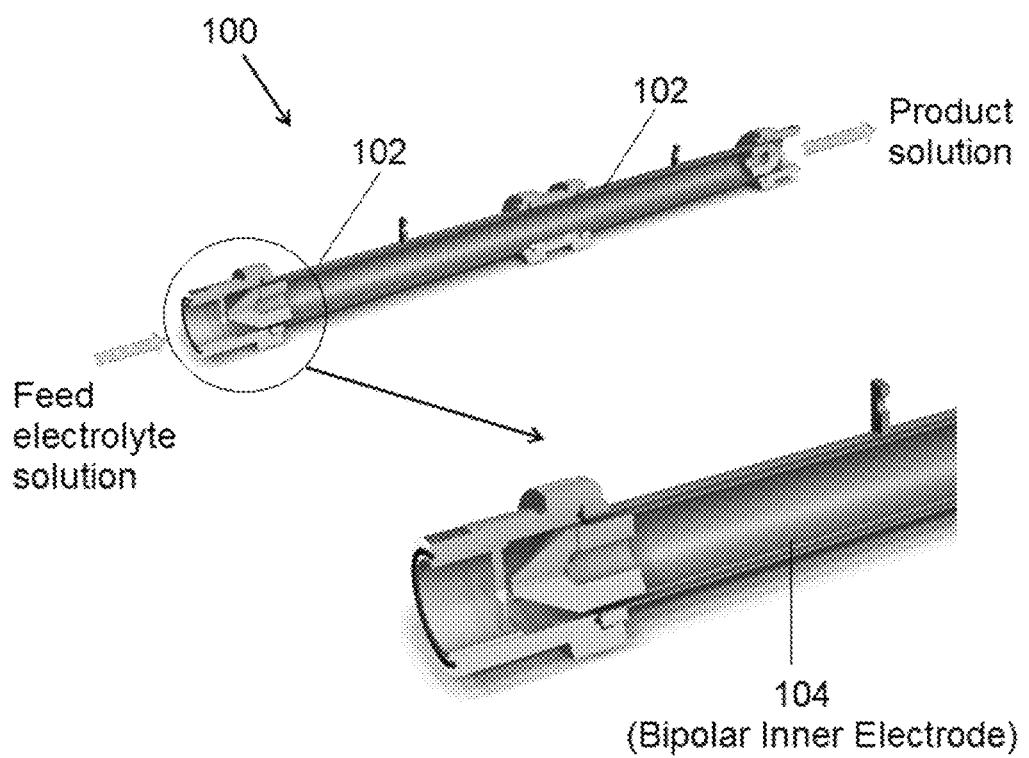
FIG. 1B is a cross-sectional view of the concentric tube electrochemical cell of FIG. 1A.

Three tube, four tube, and five tube multi-tube electrode arrangements as disclosed herein progressively increase active area per unit volume when compared to the CTE electrode illustrated in FIGS. 1A and 1B. With increasing number of multi-tubes used in electrochemical or electrochlorination cells and devices including multiple concentric tube electrodes, the innermost tube diameter will become increasingly smaller with less active surface area per tube. However, the overall result is the multi-tube electrode will have significantly more active surface when compared the CTE electrode device illustrated in FIGS. 1A and 1B.

The multi-tube electrochemical or electrochlorination cells disclosed herein would therefore be much more compact when used in multiple units to form an electrolyzer sized to produce an equivalent amount of sodium hypochlorite as compared to existing CTE electrolyzers. An electrochemical or electrochlorination cell including three concentric electrode tubes would require about 30% less space than a conventional CTE. An electrochemical or electrochlorination cell including four or five concentric electrode tubes would save considerably more space.

The multi-tube electrodes can be inserted into a non-metallic non-conductive housing and connected to a source of power by waterproof connectors so that no electrically live components are exposed to the outside environment (see FIGS. 21A and 21B, for example). This design is much safer for the operators and there is no risk of short-circuit between the devices and an external grounded component or liquid. The sealed enclosures required by the current CTE devices would not be necessary, thereby decreasing the complexity and capital cost of a system.

Parallel plate electrochlorination (PPE) cells have a much higher packing density per unit volume vs. conventional CTE cells, and higher concentration strengths of sodium hypochlorite can be produced. An electrochlorination cell including a plurality of concentric electrode tubes will be able to challenge both these PPE advantages. However, the electrochlorination cell including the plurality of concentric electrode tubes will not have the PPE disadvantage of requiring periodic acid cleaning due to the low flow velocity and subsequent low degree of self-cleaning typically exhibited in PPE cells, resulting in considerably less maintenance and no handling of hazardous chemicals. The electrochlorination cell including a plurality of concentric electrode tubes device would have fewer parts and be easier to assemble than a PPE.

Aspects and embodiments of electrochemical or electrochlorination devices including concentric electrode tubes as disclosed herein may include anodes and cathodes (or anode-cathode pairs) that are configured and arranged to direct substantially all or all fluid passing through active areas or gaps between the anodes and cathodes in a direction substantially or completely axially through the active areas. The direction substantially or completely axially through the active areas may be parallel or substantially parallel to the central axis of the electrochemical cell and/or of the anodes and cathodes (or anode-cathode pairs). Fluid flowing through the active areas may still be considered flowing in the direction substantially or completely axially through the active areas even if the fluid flow exhibits turbulence and/or vortices during flow through the active areas.

Aspects and embodiments of electrochemical or electrochlorination devices including concentric electrode tubes as disclosed herein may have active densities of between about 46% and about 52%, of greater than about 50%, in some embodiments, greater than about 75%, in some embodiments, greater than 85%, in some embodiments, greater than 90%, and in some embodiments up to about 95%.

Electrochlorination cells are used in marine, offshore, municipal, industrial and commercial applications. The design parameters of electrochlorination cells including a plurality of concentric electrode tubes, for example, inter-electrode spacing, thickness of electrodes and coating density, electrode areas, methods of electrical connections, etc., can be selected for different implementations. Aspects and embodiments disclosed herein are not limited to the number of electrodes, the space between electrodes, the electrode material or spacer material, number of passes within the electrochlorination cells or electrode coating material.

In accordance with another aspect, electrochemical or electrochlorination cells may be provided with axially radiating electrodes, also referred to herein as electrodes substantially aligned in a radial orientation. The axially radiating electrodes may include cathodes and anodes that extend from a region proximate a central channel in an electrochemical or electrochlorination cell toward an external shell or housing of the cell. Cathode and anode electrodes alternate along a circular path defined in a plane generally normal to a flow of liquid through the cell. The cathode and anode electrodes are separated by gaps and liquid flowing through the gaps undergoes electrochemical treatment, for example, electrochlorination. Although spiral-wound electrode architectures are generally considered to possess the highest possible ratio of surface area to volume, axially radiating designs can approach the same packing densities. Construction of axially radiating designs may also prove to be more straightforward than the construction of spiral-wound designs due to the simplicity of their subunit components and the robust technologies which can be used (sheet metal, sintering, extrusion) to fabricate them.

Figure 22A:
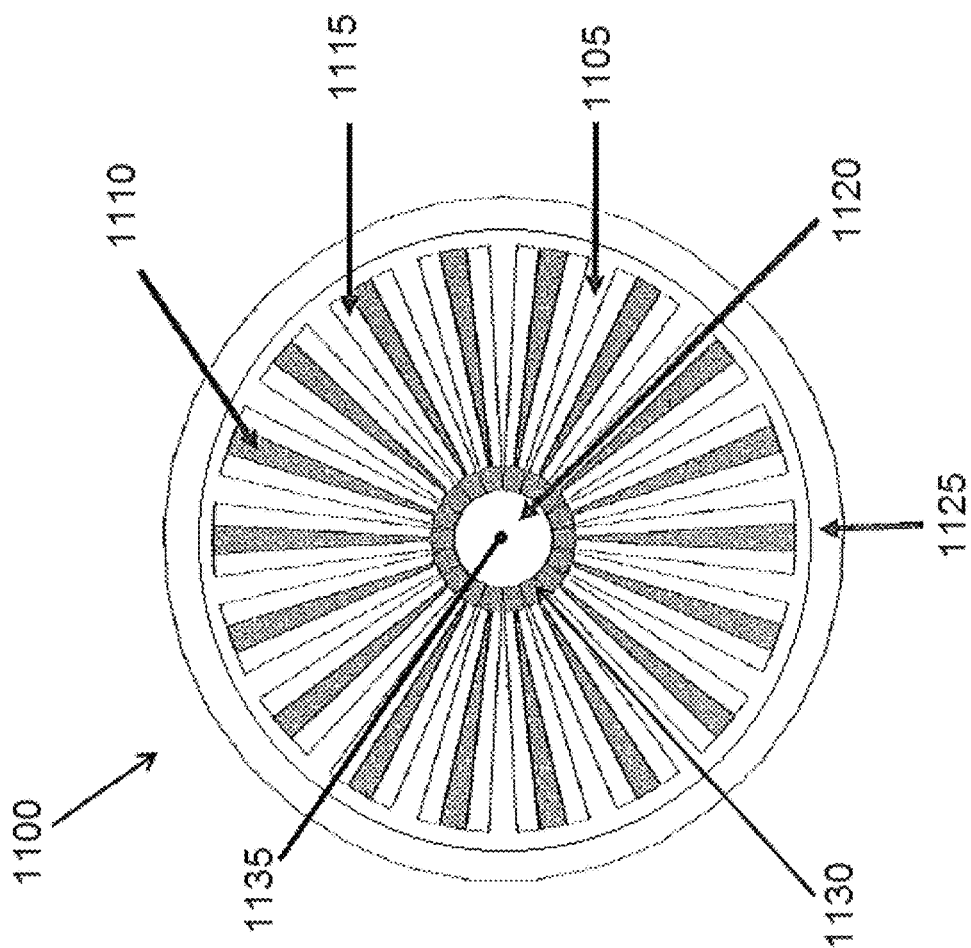
FIG. 22A is a cross-sectional view of an embodiment of an electrochemical cell including radially arranged electrodes.
Figure 22B:
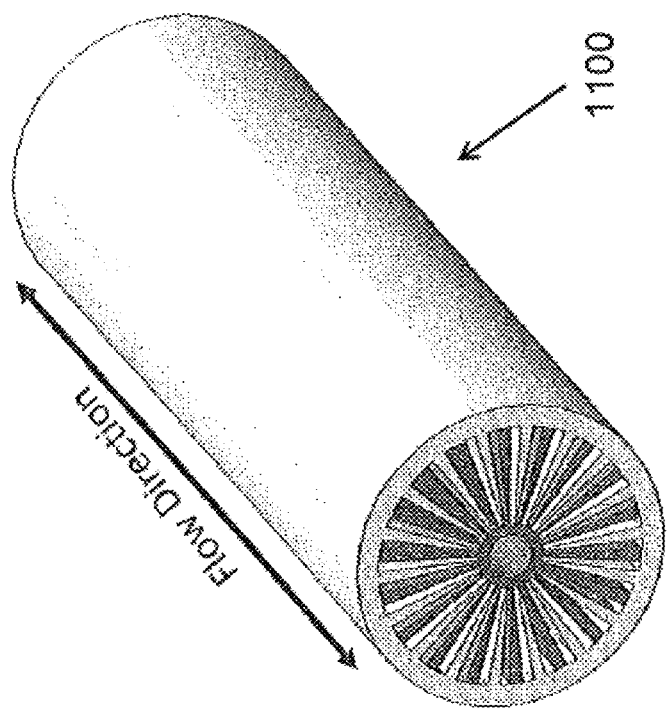
FIG. 22B is an isometric view of the electrochemical cell of FIG. 22A.

FIGS. 22A and 22B depict one representative, non-limiting embodiment of an electrochemical or electrochlorination cell including radially extending electrodes, indicated generally at 1100. The electrochemical cell 1100 includes a plurality of radially extending anodes 1105 separated from radially extending cathodes 1110 by fluid channels 1115. The radially extending anodes 1105 and radially extending cathodes 1110 extend from a region 1130 defined proximate to and about a central axis 1135 of the electrochemical cell 1100 toward an outer periphery or housing of the electrochemical cell. In some embodiments some or all of the anodes 1105 are rigid metal electrodes, for example, titanium electrodes than may be coated with an oxidation resistant coating, for example, MMO or platinum. In some embodiments some or all of the cathodes 1110 are rigid metal electrodes, for example, titanium electrodes or, in other embodiments, porous gas diffusion cathodes that provide for hydrogen abatement. In some embodiments some or all of the anodes 1105 may be gas diffusion anodes. In some embodiments, electrochemical or electrochlorination cells including radially extending electrodes as disclosed herein may include one or more bipolar electrodes. The electrodes of any embodiments of electrochemical cells including radially extending electrodes disclosed herein may be rigid metal electrodes with thicknesses of, for example, between about 0.25 mm and about 3 mm or between about 1 mm and about 2 mm A central gas conduit 1120 may be provided for oxygen delivery so that the oxygen may combine with hydrogen produced by, for example, electrochlorination reactions in the cell 1100 to produce water. In some embodiments, a catalyst is provided, for example, on and/or in the cathodes 1110 to facilitate reaction of oxygen and hydrogen in the cell 1100. A non-conductive external shell 1125 may house the radially extending anodes 1105, radially extending cathodes 1110, fluid channels 1115, and central conduit 1120. The electrode surface area to volume ratio could be manipulated through selection of factors such as electrode thickness, inter-electrode spacing, as well as overall cell size.

Fluid, for example, electrolyte undergoing treatment in the cell 1100 may flow through the fluid channels in a direction substantially parallel to the central conduit 1120 and central axis 1135. In some embodiments of electrochemical cells including radially extending anodes 1105 and radially extending cathodes 1110 as disclosed herein, the radially extending anodes 1105 and the radially extending cathodes 1110 are configured and arranged to direct the flow of some or all fluid through fluid channels defined between adjacent radially extending anodes 1105 and radially extending cathodes 1110 in a direction parallel, or at least substantially parallel to a central longitudinal axis of the electrochemical cell.

Figure 22C:
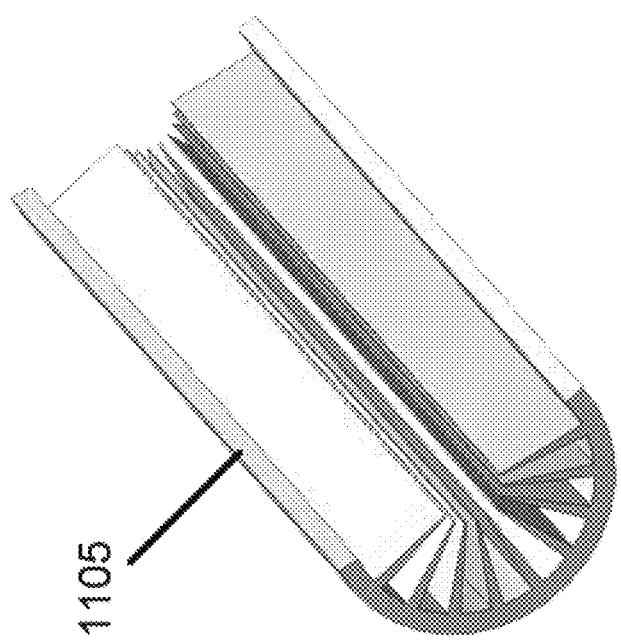
FIG. 22C is a cross-sectional perspective view of the cathode of the electrochemical cell of FIG. 22A.

FIG. 22C is a cross-sectional perspective view of the anode 1105 of the electrochemical cell 1100 of FIG. 22A. FIG. 22D is a cross-sectional perspective view of the cathode 1110 of the electrochemical cell 1100 of FIG. 22A, illustrating how the radially extending portions 1110A may be coupled by supports 1110B.

Figure 22E:
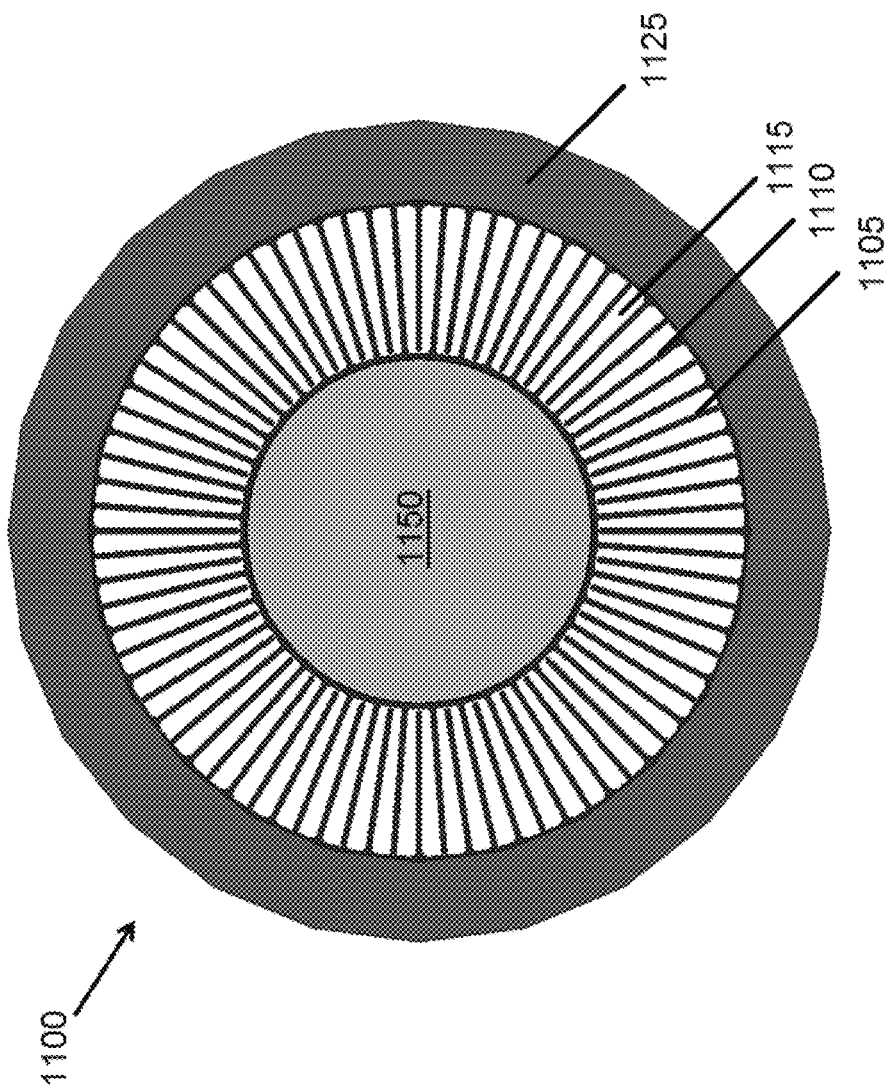
FIG. 22E is a cross-sectional view of an alternate configuration of the electrochemical cell of FIG. 22A.
Figure 22F:
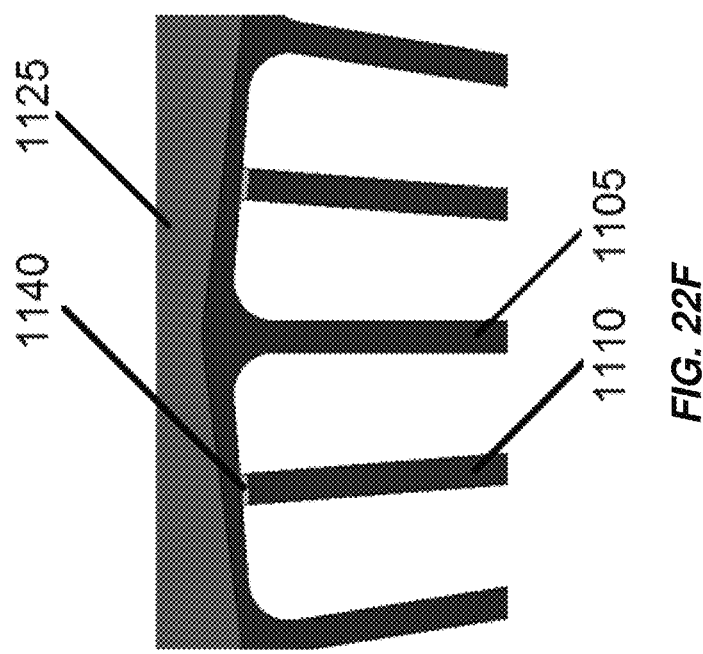
FIG. 22F illustrates anodes coupled to cathodes of the electrochemical cell of FIG. 22E with insulating members.
Figure 22G:
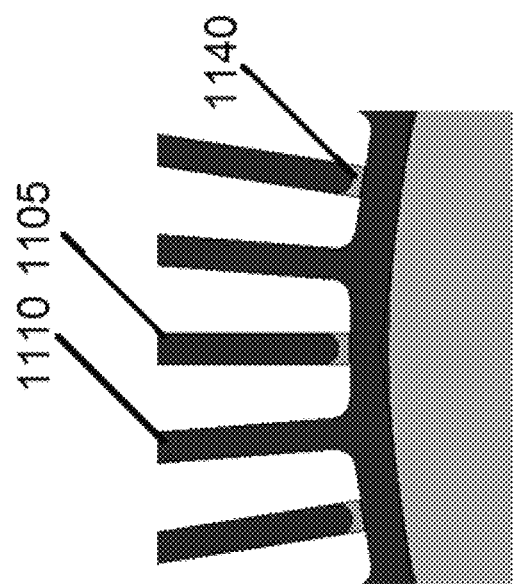
FIG. 22G is another illustration of anodes coupled to cathodes of the electrochemical cell of FIG. 22E with insulating members.
Figure 22H:
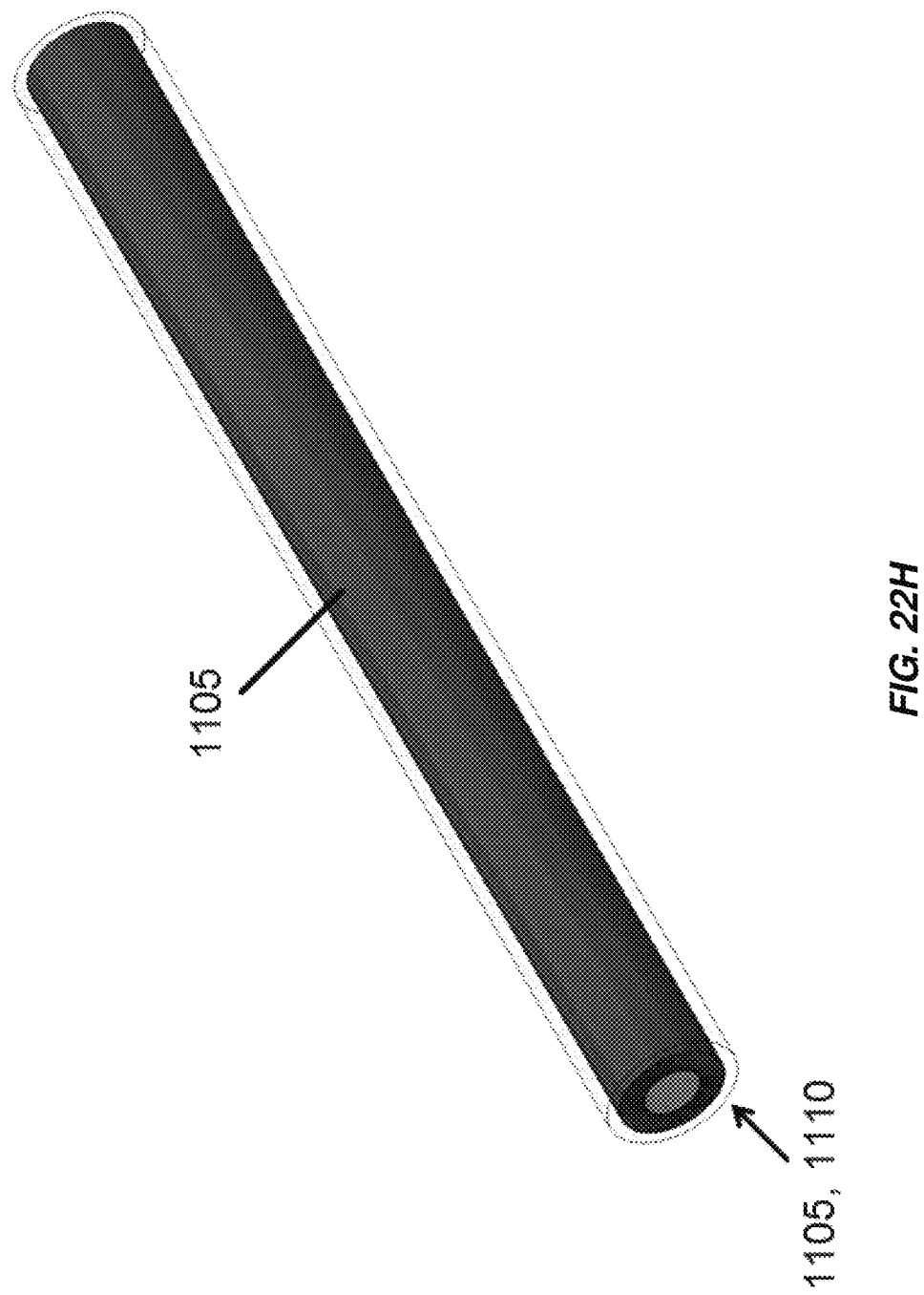
FIG. 22H illustrates a monopolar configuration of an electrochemical cell including radially arranged electrodes.
Figure 22I:
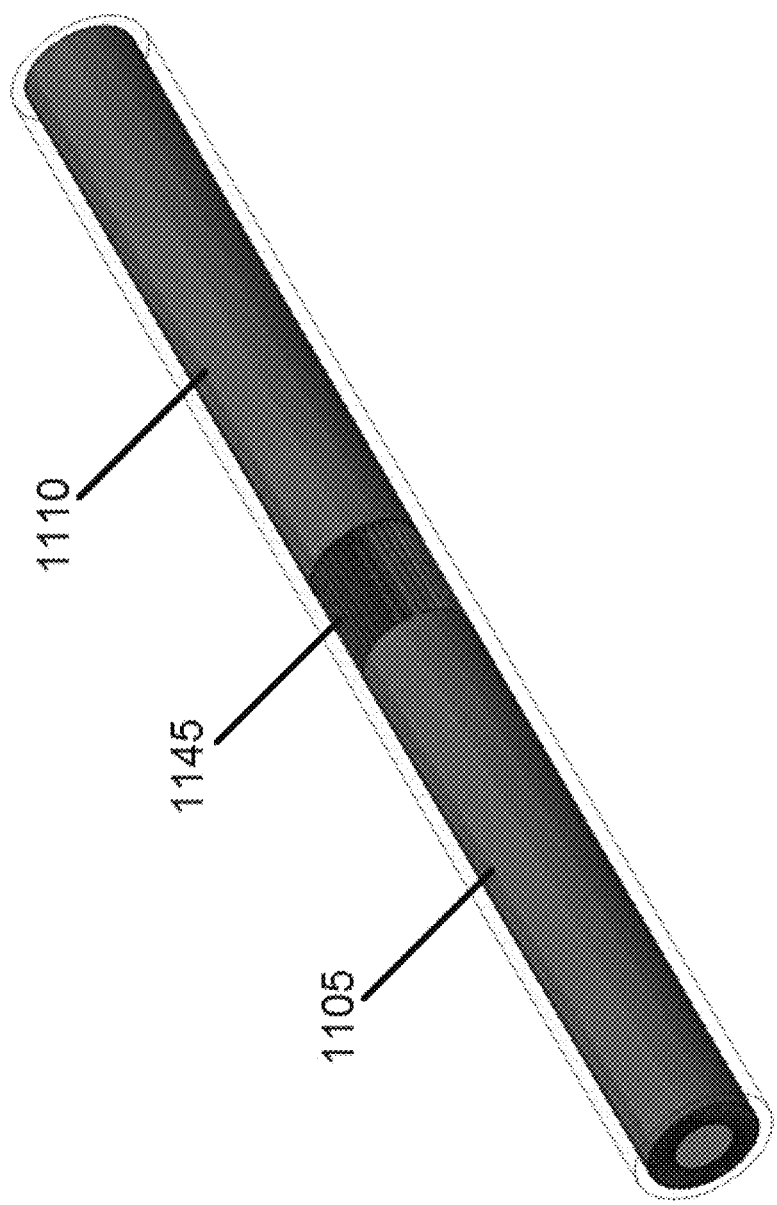
FIG. 22I illustrates a bipolar configuration of an electrochemical cell including radially arranged electrodes.

FIG. 22E illustrates an alternate configuration of the electrochemical cell 1100 of FIGS. 22A and 22B in which the radially extending anodes 1105 and radially extending cathodes 1110 have a substantially same thickness along their radial extents. The electrochemical cell of FIG. 22E also includes a solid core 1150 that prevents fluid from flowing through the core of the electrochemical cell. The core 1150 may include a non-conductive material, for example, PVDF, PTFE, or another polymer, or may be formed of a conductive material. FIGS. 22F and 22G illustrate how the radially extending anodes 1105 and radially extending cathodes 1110 of embodiments of an electrochemical or electrochlorination cells including radially extending electrodes may be coupled or connected to one another by insulating elements 1140. FIG. 22H illustrates that embodiments of an electrochemical or electrochlorination cells including radially extending electrodes 1105, 1110 may be monopolar. FIG. 22I illustrates that embodiments of an electrochemical or electrochlorination cells including radially extending electrodes may be bipolar and include the radially extending anodes 1105 and radially extending cathodes 1110 displaced from one another along a length of the electrochemical cell as well and a bipolar radially extending electrode 1145. Additional radially extending anodes 1105 and/or radially extending cathodes 1110 may be provided to render the electrochemical cell multi-polar.

Figure 23A:
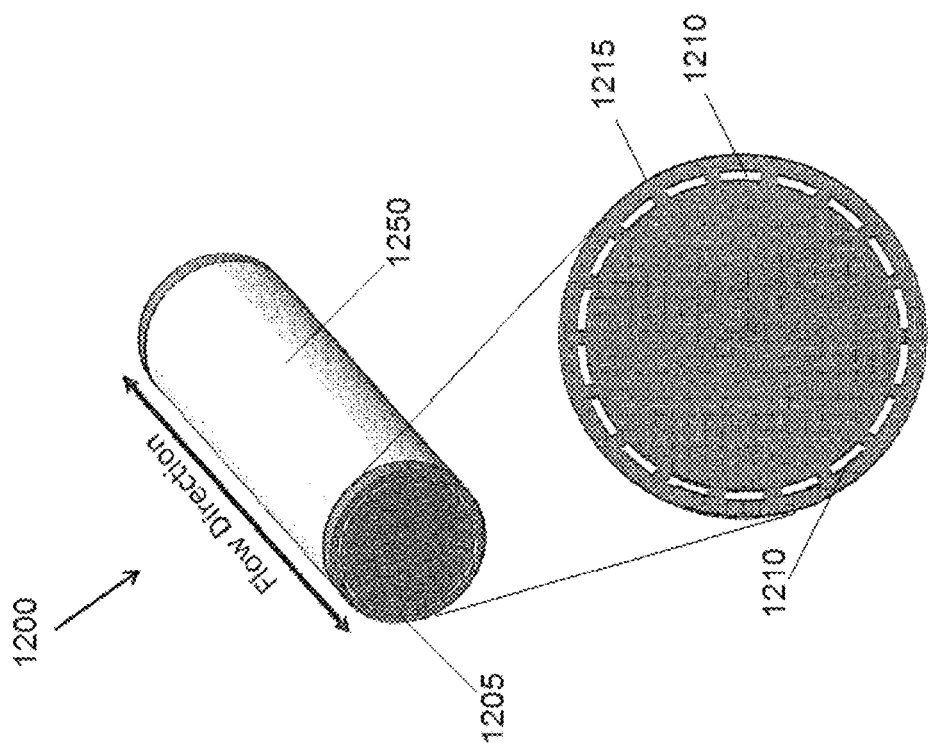
FIG. 23A illustrates an embodiment of an end cap for an electrochemical cell.
Figure 23B:
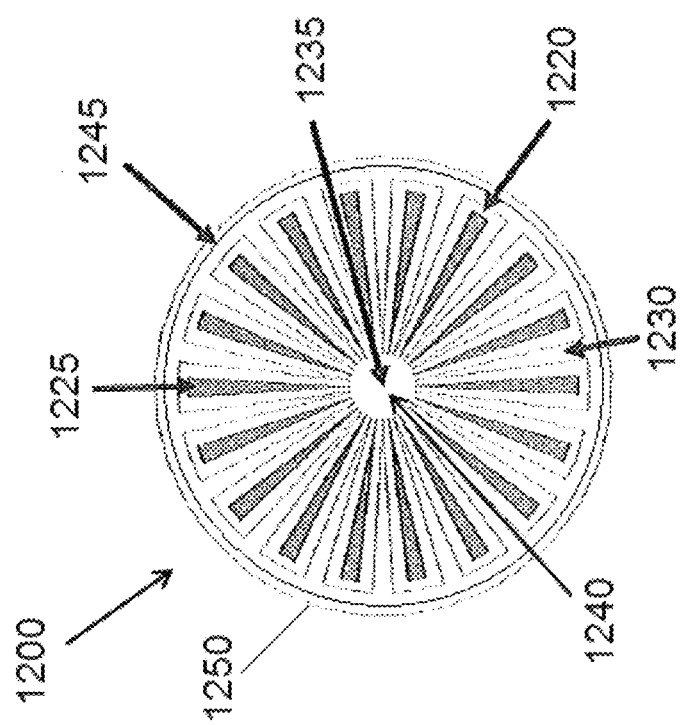
FIG. 23B illustrates a flow pattern through an embodiment of an electrochemical cell utilizing the end cap of FIG. 23A.
Figure 23C:
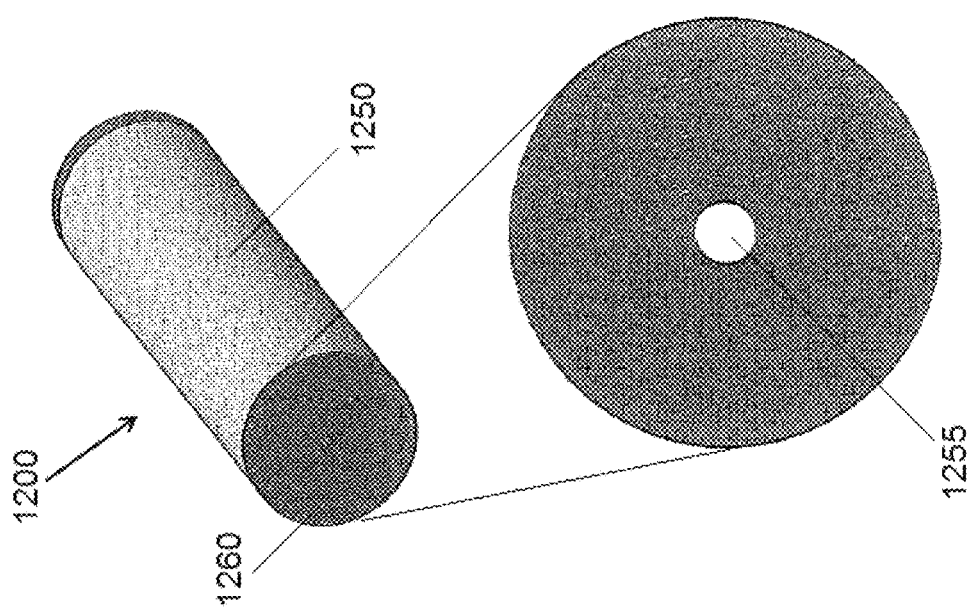
FIG. 23C illustrates another embodiment of an end cap for an electrochemical cell.

FIGS. 23A-23D illustrate an electrochemical cell indicated generally at 1200 that includes an alternative plumbing configuration from the geometry of the electrochemical cell of FIGS. 22A and 22B. Through the use of diverting caps, an axial flow pattern of fluid flow through the electrochemical cell 1200 may be instituted. As illustrated in FIG. 23A, the electrochemical cell 1200 may include an inlet end cap 1205 with apertures 1210 arranged circumferentially proximate to, but displaced from, an outer edge 1215 of the inlet end cap 1205. The apertures 1210 may be in fluid communication with fluid channels 1220 between anodes 1225 and cathodes 1230 in the interior of the electrochemical cell 1200. Fluid, for example, electrolyte introduced through the apertures 1210, may thus flow radially inward in the direction indicated by arrow 1235 (FIG. 23B) toward a central fluid conduit 1240 as the fluid travels along a length of the electrochemical cell 1200. The radially extending anodes 1225 and radially extending cathodes 1230 extend from the central conduit 1240 of the electrochemical cell 1200 toward an outer periphery or housing of the electrochemical cell 1200. As in electrochemical cell 1100, some or all of the anodes 1225 are metal electrodes, for example, titanium electrodes than may be coated with an oxidation resistant coating, for example, MMO or platinum and some or all of the cathodes 1230 are porous gas diffusion cathodes that provide for hydrogen abatement. A gas conduit 1245 may be provided circumferentially outside of the fluid channels 1220 within the non-conductive external shell or housing 1250 to provide for a flow of oxygen to the gas diffusion cathodes 1230. As illustrated in FIG. 23C an outlet aperture 1255 is provided generally centrally located in an outlet end cap 1260 and in fluid communication with the central conduit 1240. In an alternate embodiment, fluid may flow from the outlet end cap 1260 to the inlet end cap 1205 and flow radially outward from the central conduit 1240 to the apertures 1210 as the fluid flows through the electrochemical cell 1200.

Figure 23D:
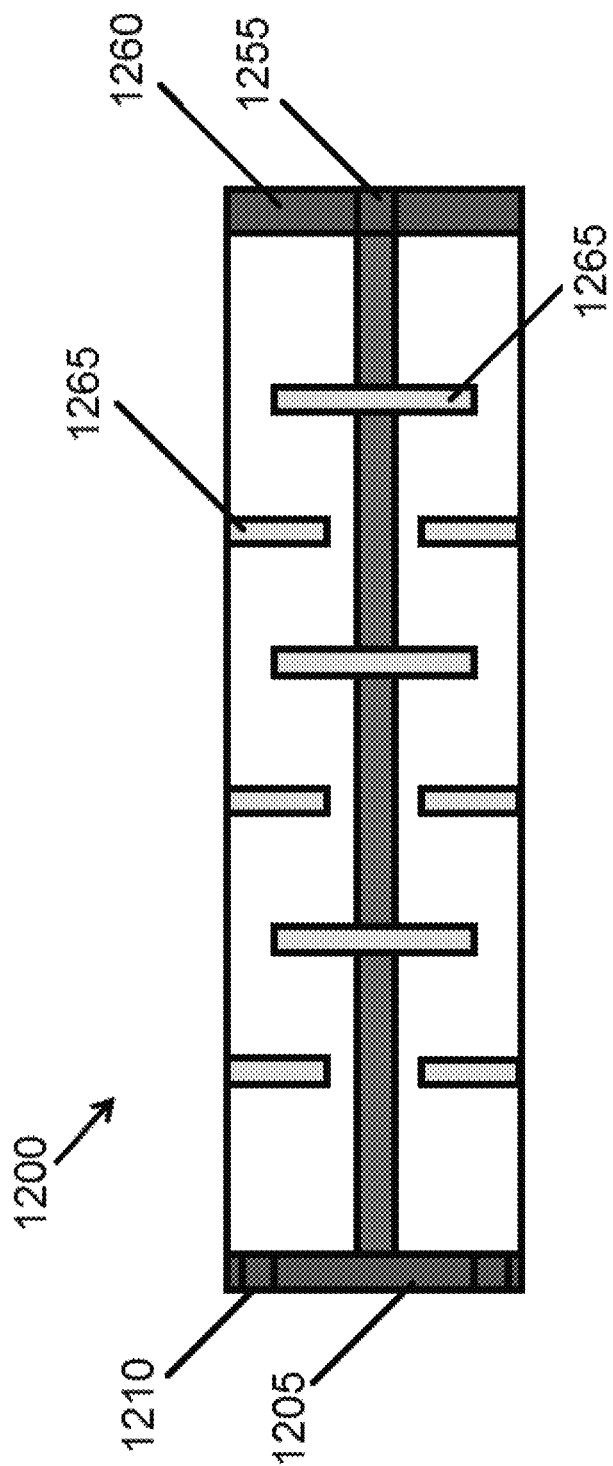
FIG. 23D is a cross-sectional view of an electrochemical cell including the end caps of FIGS. 23A and 23C as well as internal baffles.

As illustrated in FIG. 23D, the electrochemical cell 1200 may include internal baffles 1265. The baffles 1265 may be utilized to control or modify the flow direction and/or mixing of fluid passing through the electrochemical cell 1200 and may provide additional path length to the fluid flow channels 1220 as compared to the electrochemical cell 1200 in the absence of the baffles 1265. Fluid flow through the electrochemical cell 1200 may be from the external apertures 1210 to the central fluid conduit 1240, from the central fluid conduit 1240 to the central fluid conduit 1240, or from the external apertures 1210 to the external apertures 1210.

FIG. 24 represents another variation of the geometry of the electrochemical cell of FIGS. 22A and 22B. By decreasing the electrode thickness and inter-electrode gaps, the electrode 1105, 1110 surface area to electrochlorination cell volume ratio has been increased.

Figure 25A:
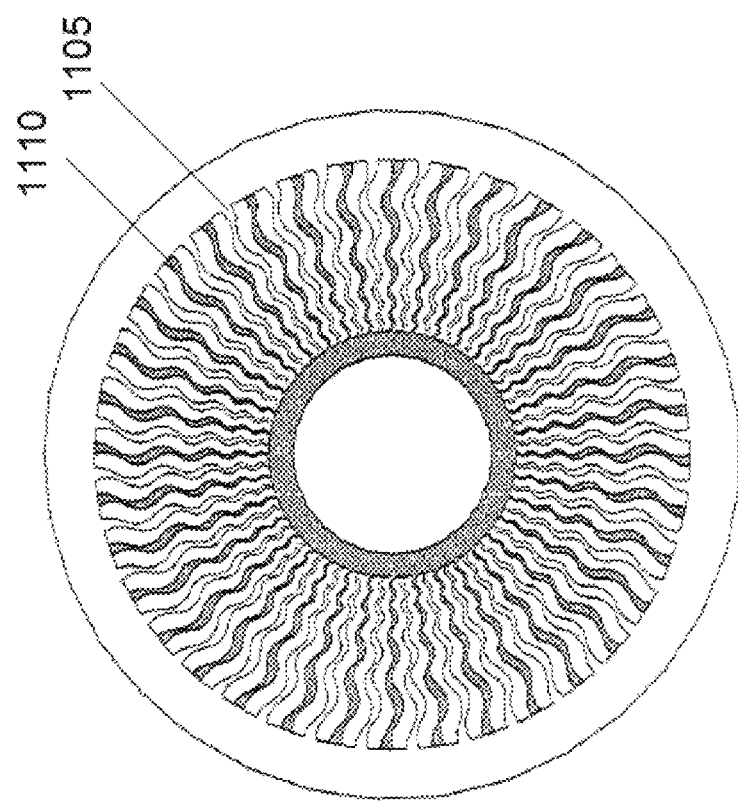
FIG. 25A illustrates an embodiment of an electrochemical cell including radially arranged and corrugated electrodes.
Figure 25B:
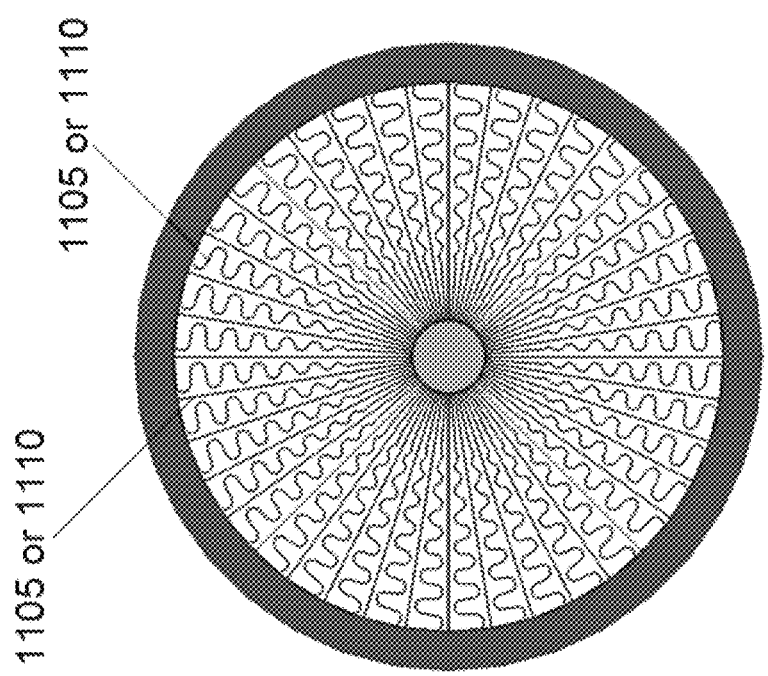
FIG. 25B illustrates another embodiment of an electrochemical cell including radially arranged and corrugated electrodes.

FIG. 25A depicts another variation of the geometry of the electrochemical cell of FIG. 24, where the surface area of the electrodes 1105, 1110, has been further increased through the use of corrugations. In the embodiment of FIG. 25A, each of the anodes 1105 and cathodes 1110 are corrugated. In other embodiments, the anodes 1105 and cathodes 1110 may have different forms of curvature than illustrated to provide increased electrode surface area. For example, as shown in FIG. 25B the electrochemical cell may include one of anodes 1105 or cathodes 1110 that are corrugated, while the other of the anodes 1105 or cathodes 1110 are non-corrugated.

Figure 26:
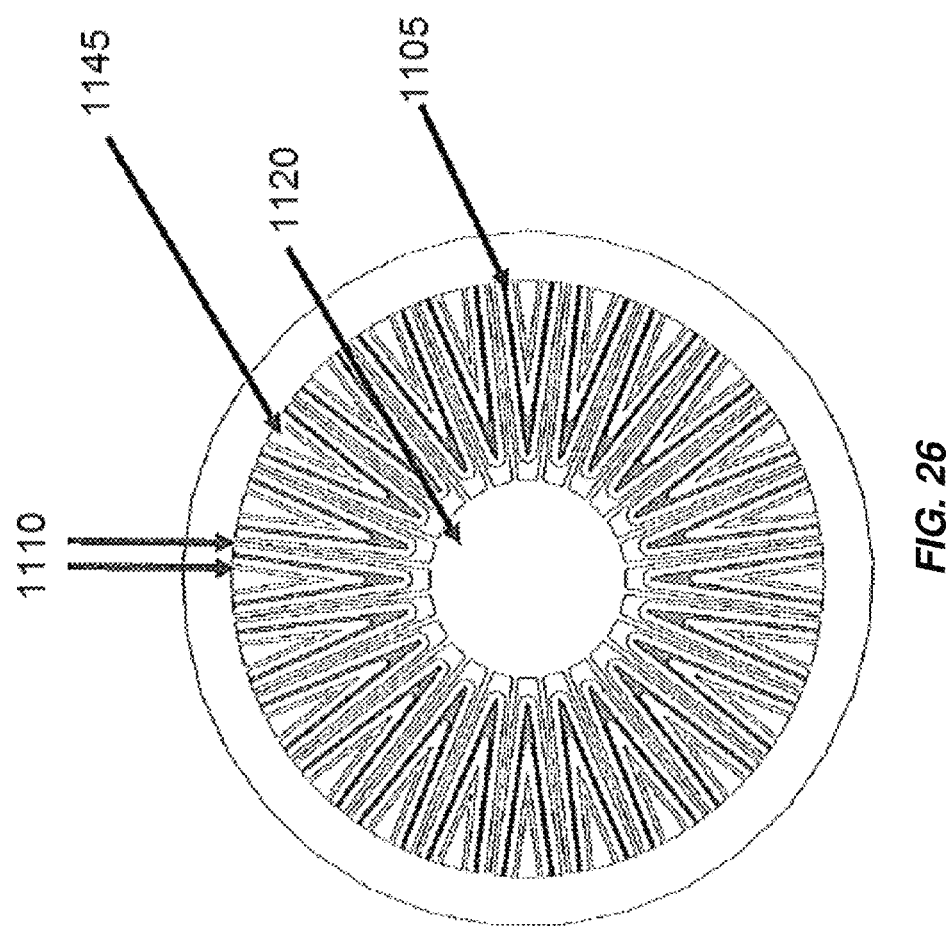
FIG. 26 illustrates another embodiment of an electrochemical cell including radially arranged electrodes.

FIG. 26 depicts a modification to the embodiment of FIGS. 22A and 22B including a multi-channel corrugated electrode geometry. In the embodiment of FIG. 26, surface area for hydrogen abatement at or in cathodes 1110 could be increased as compared to the embodiment of FIGS. 22A and 22B through the use of multiple gas diffusion cathodes 1110 per anode 1105. The multiple gas diffusion cathodes 1110 may be supplied with gas, for example, oxygen, through axial gas conduits 1145 radially displaced from the central conduit 1120, as well as through the central conduit 1120.

Figure 27A:
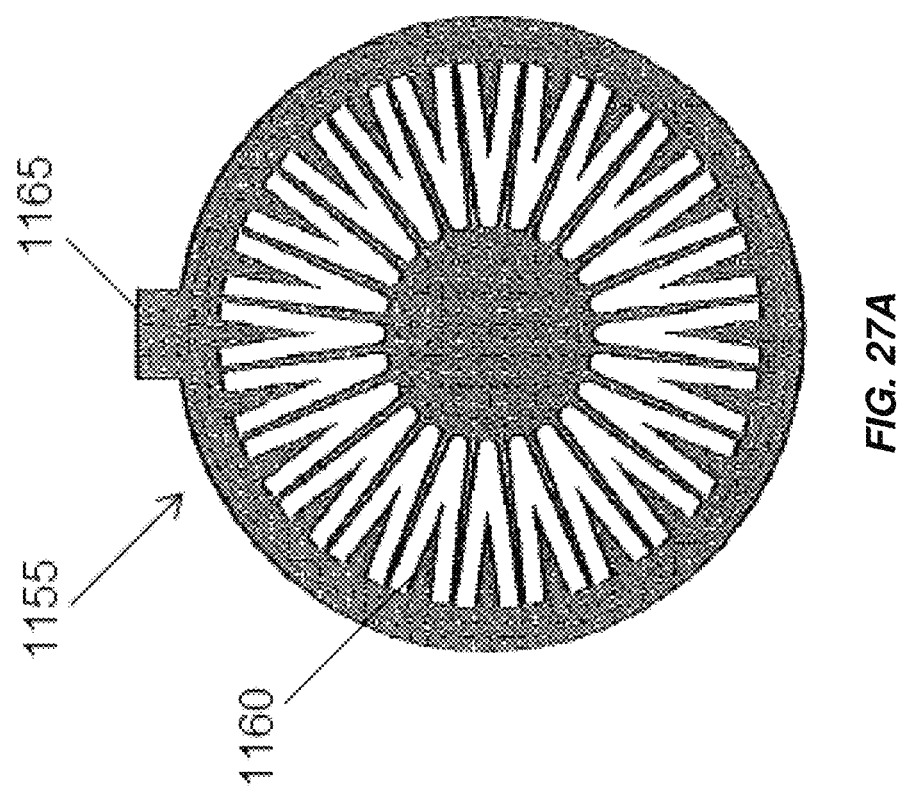
FIG. 27A illustrates another embodiment of an end cap for an electrochemical cell.
Figure 27B:
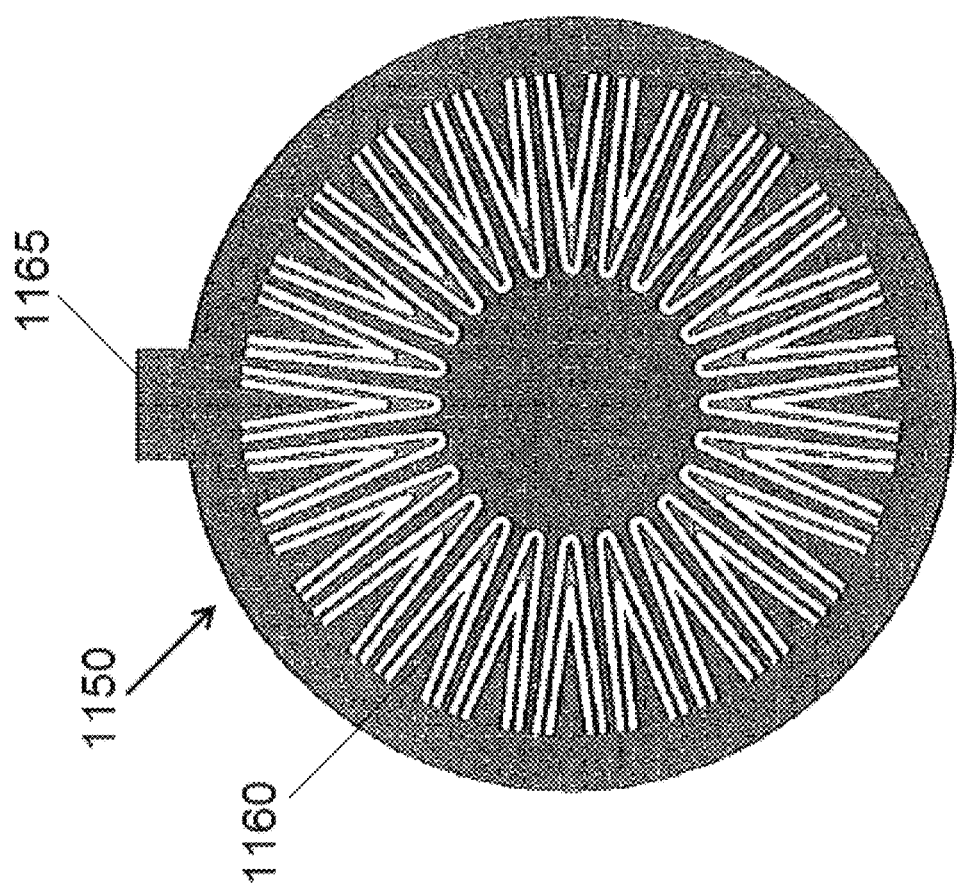
FIG. 27B illustrates another embodiment of an end cap for an electrochemical cell.
Figure 27C:
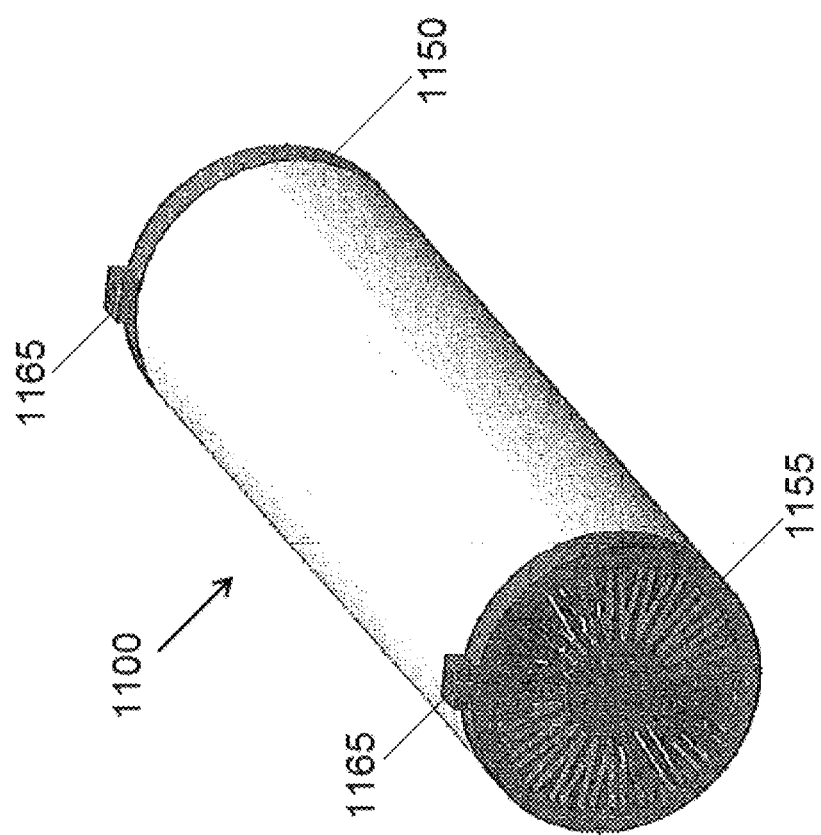
FIG. 27C is an isometric view of an electrochemical cell including the end caps of FIGS. 27A and 27B.

FIGS. 27A-27C depict an embodiment of a configuration for pneumatic and electrical routing of the axial gas conduits 1145 of FIG. 26. End caps 1150, 1155 with relieved channel features 1160 and gas inlets/outlets 1165 may be fastened to opposing ends 1170, 1175 of the electrochemical cell 1100, thus forming pneumatically sealed chambers. These caps 1150, 1155 could potentially serve dual purposes, as they could also incorporate electrical contacts for the delivery of current to electrodes 1105, 110.

Aspects and embodiments of electrochemical or electrochlorination devices including radially extending electrodes as disclosed herein may include anodes and cathodes (or anode-cathode pairs) that are configured and arranged to direct substantially all or all fluid passing through active areas or gaps between the anodes and cathodes in a direction substantially or completely axially through the active areas. The direction substantially or completely axially through the active areas may be parallel or substantially parallel to the central axis of the electrochemical cell and/or of the anodes and cathodes (or anode-cathode pairs). Fluid flowing through the active areas may still be considered flowing in the direction substantially or completely axially through the active areas even if the fluid flow exhibits turbulence and/or vortices during flow through the active areas.

Aspects and embodiments of electrochemical or electrochlorination devices including radially extending electrodes as disclosed herein may have active densities of between about 46% and about 52%, of greater than about 50%, in some embodiments, greater than about 75%, in some embodiments, greater than 85%, in some embodiments, greater than 90%, and in some embodiments up to about 95%.

Figure 28A:
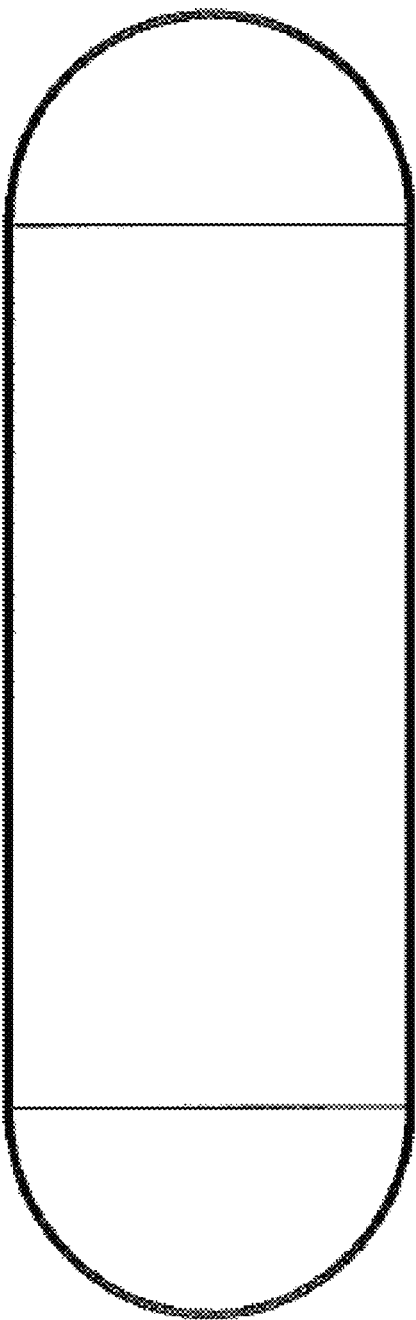
FIG. 28A is a schematic cross-sectional view of an embodiment of an obround electrochemical cell.
Figure 28B:
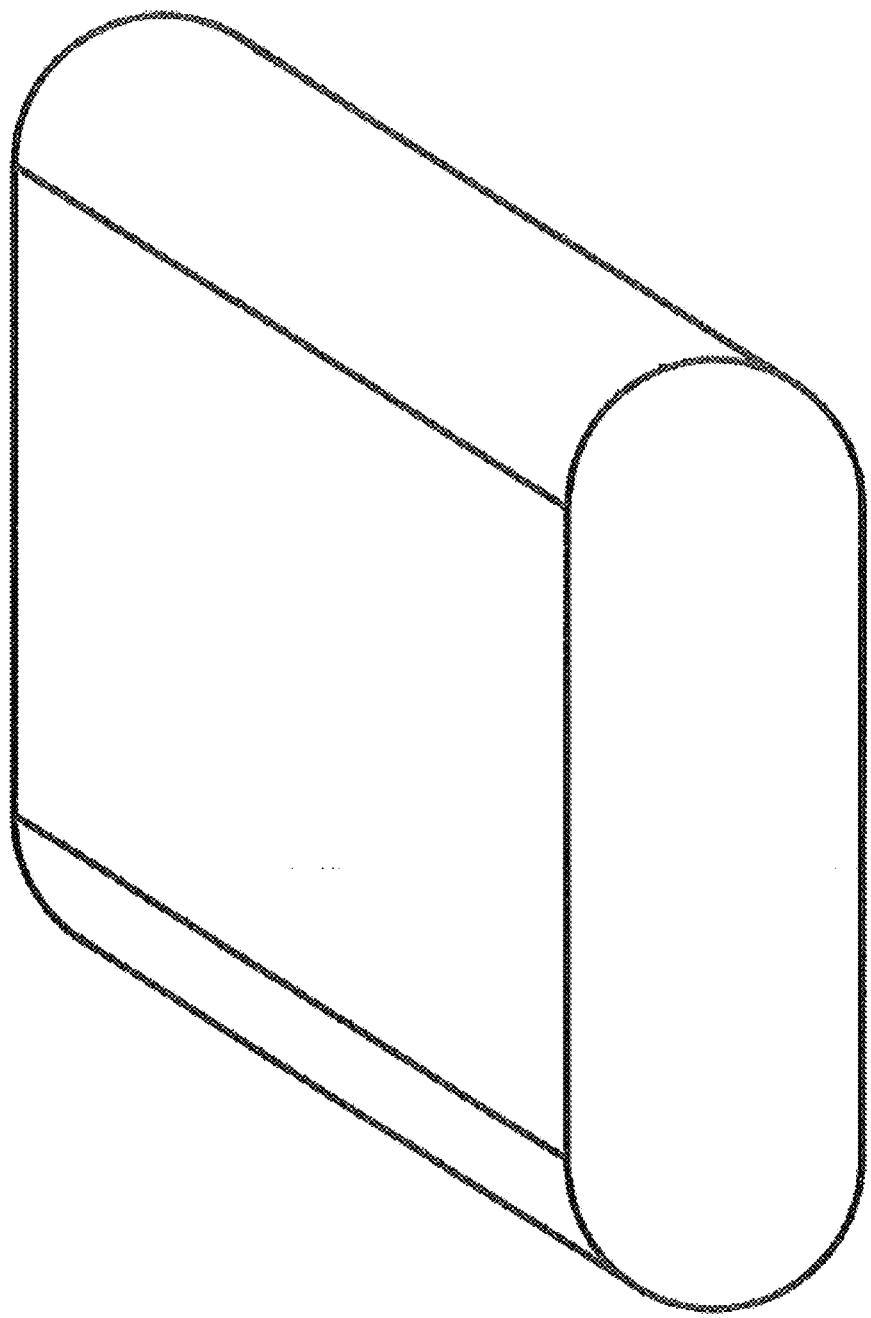
FIG. 28B is an isometric view of the obround electrochemical cell of FIG. 28A.

In accordance with another aspect, there is provided an obround, or non-axially wound, electrochemical cell. An obround is a two dimensional shape, comprised of two semicircles connected by parallel lines tangent to their endpoints (FIG. 28A), which can then be projected into a third dimension (FIG. 28B).

The obround architecture has distinct advantages over axially wound or cylindrical electrochemical cells, since it allows for myriad configurations for plumbing and electrical routing. Embodiments of an obround electrochemical cell may include one or more channels, bounded by two or more electrodes, wound around the perimeter of a central obround core. The channels may be defined using any of a number of means, whether through electrodes, membranes, spacers, conduits, or other features. The electrodes could also vary in form, including, but not limited to dimensionally stable conductive sheets or gas diffusion electrodes. Once defined, the referenced channels would be used to deliver one or more reactants, whether through fluid or gas flow. A voltage may be applied across the electrodes, causing the electrochemical cell to generate one or more products.

Figure 29A:
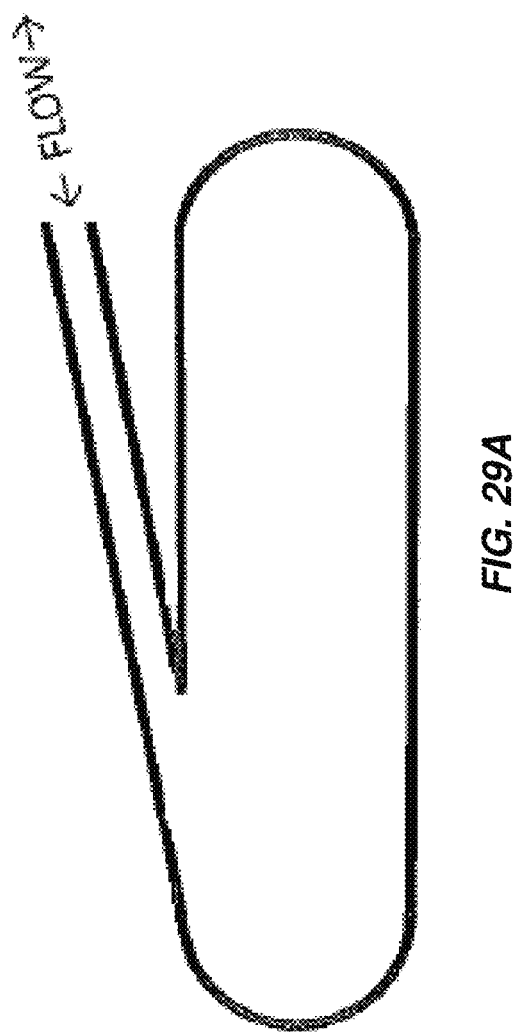
FIG. 29A is a schematic cross-sectional view of another embodiment of an obround electrochemical cell.
Figure 29B:
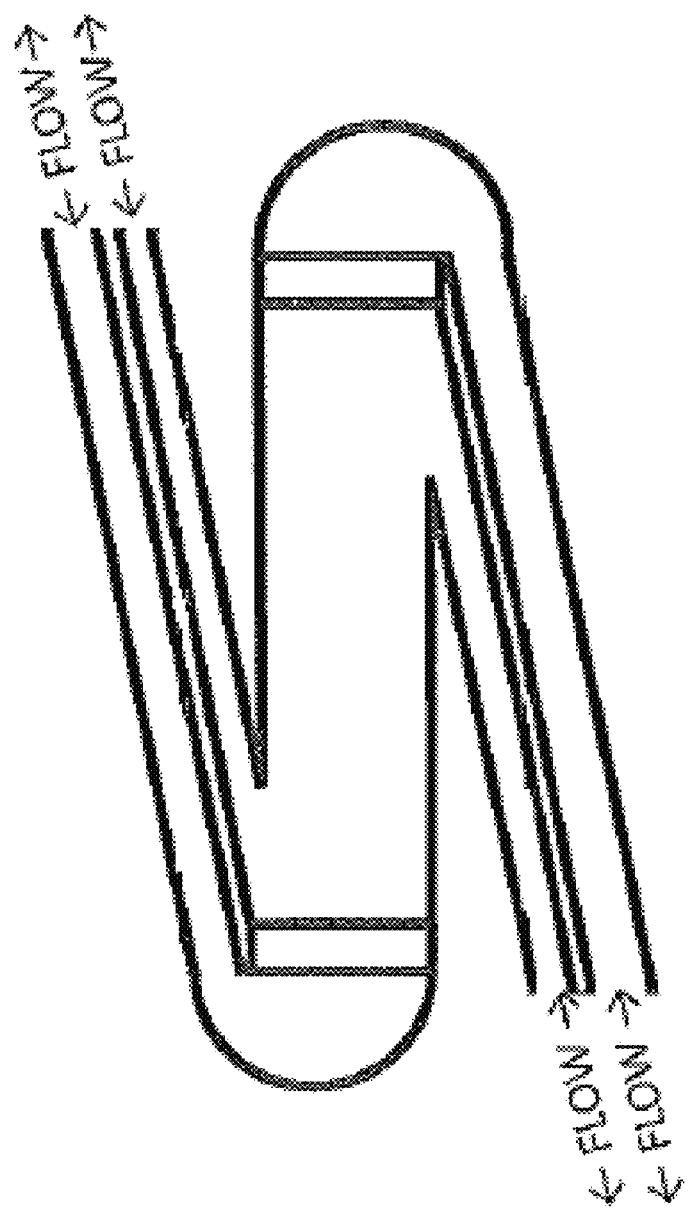
FIG. 29B is a schematic cross-sectional view of another embodiment of an obround electrochemical cell.
Figure 29C:
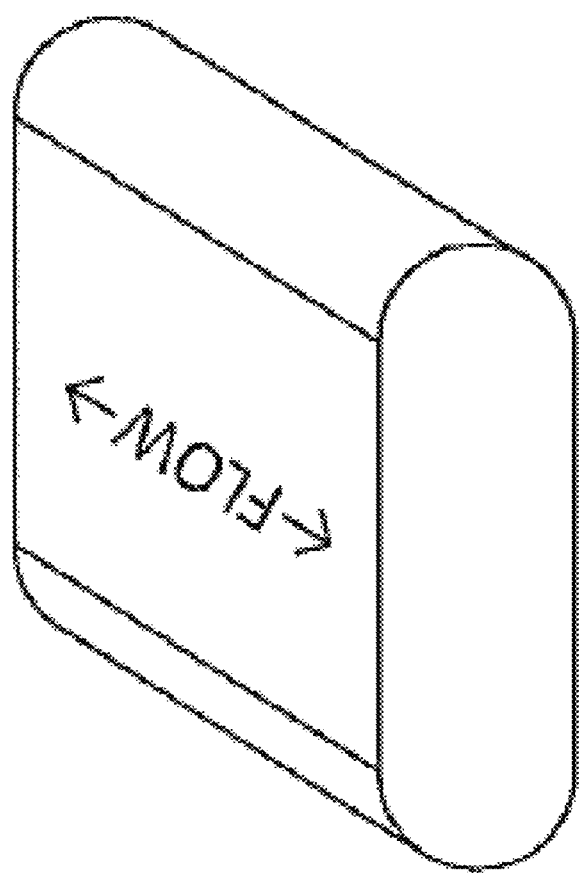
FIG. 29C illustrates a direction of flow of fluid through an embodiment of an obround electrochemical cell.
Figure 29D:
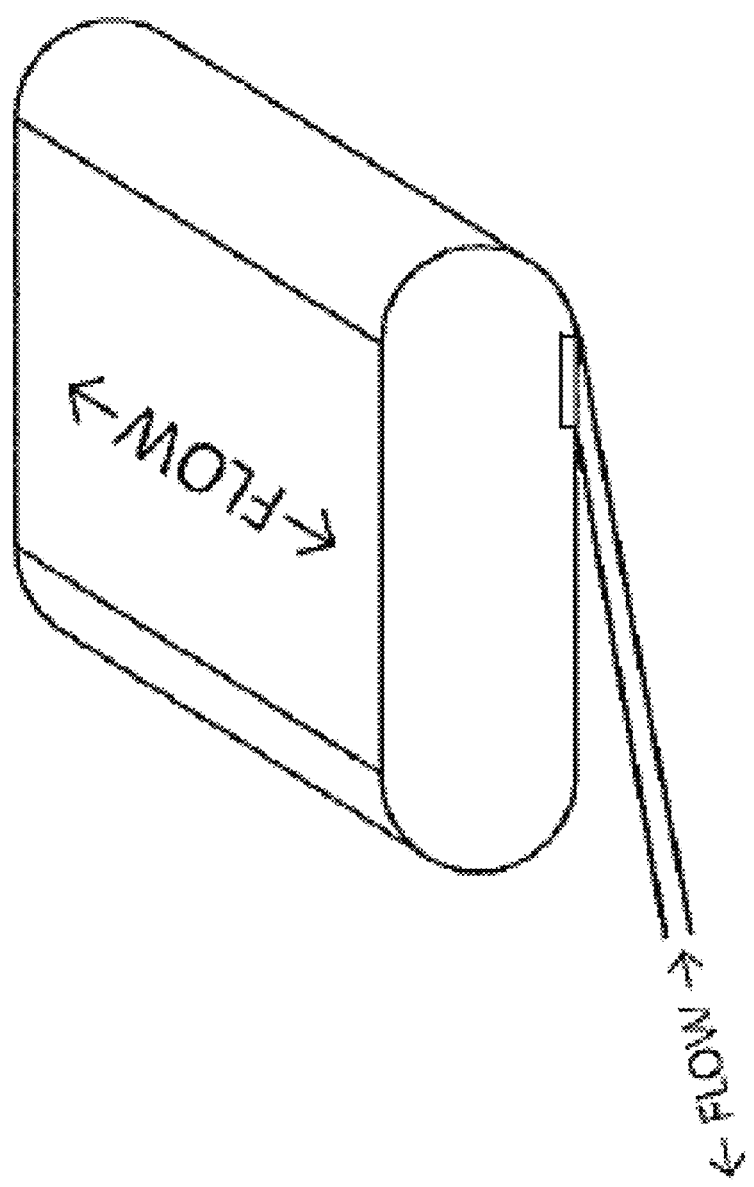
FIG. 29D illustrates a direction of flow of fluid through an embodiment of an obround electrochemical cell.

FIGS. 29A-29D illustrate several different flow configuration embodiments. For example, as illustrated in FIG. 29A a single channel may be wound around an obround core, with a single flow stream directed either inward-out or outward-in. Other embodiments, for example, as illustrated in FIG. 29B include geometries with more than channel through which fluid and/or gas may travel in multiple directions. Such geometries would be especially advantageous for embodiments making use of gas diffusion electrodes in which fluid undergoing treatment flows through one channel and oxygen flows to the gas diffusion electrodes through another channel. In another embodiment, as illustrated in FIG. 29C, reactants could travel in a "flow-through" fashion, along the extrusion axis of the central core. Further embodiments, as illustrated in FIG. 29D, include combinations of the flow configurations depicted in FIGS. 29A and 29C, where fluid travels along the core extrusion in some cells, while following the wound perimeter in others.

Figure 30B:
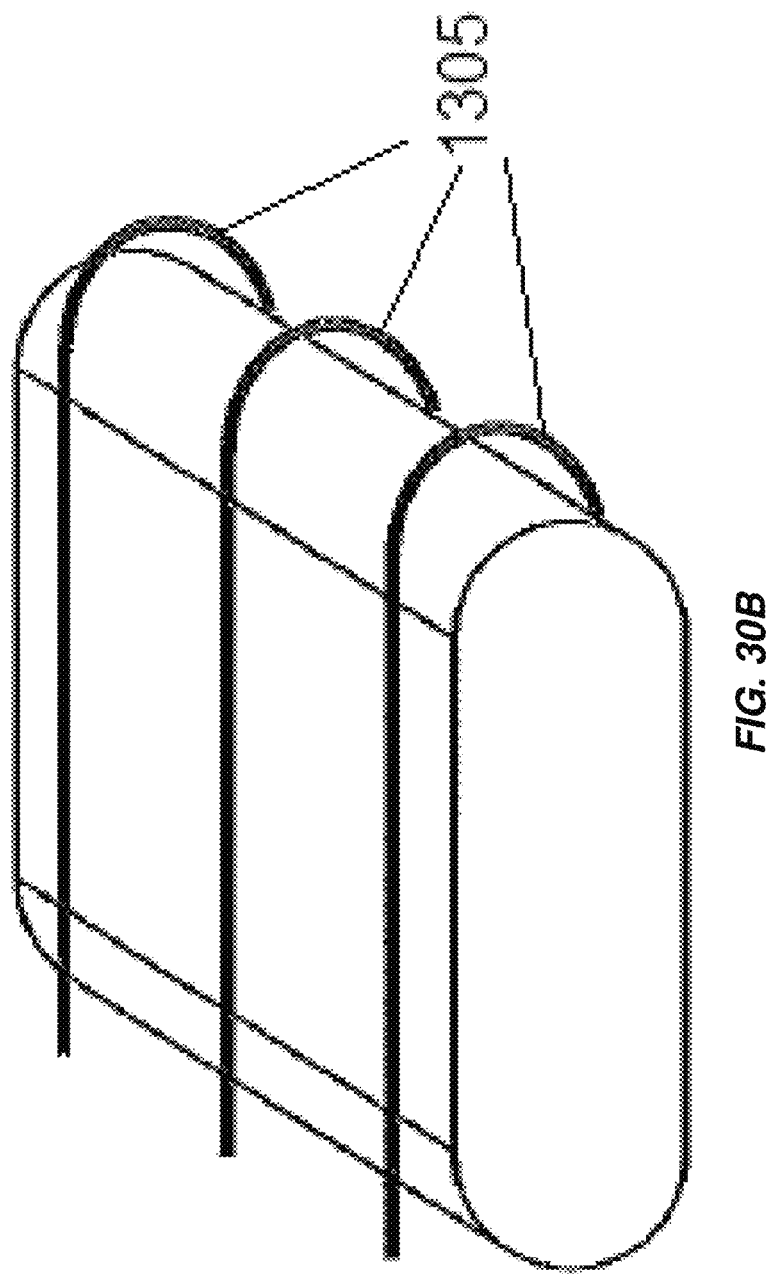
FIG. 30B schematically illustrates an alternate arrangement of busbar electrodes in an embodiment of an obround electrochemical cell.
Figure 30C:
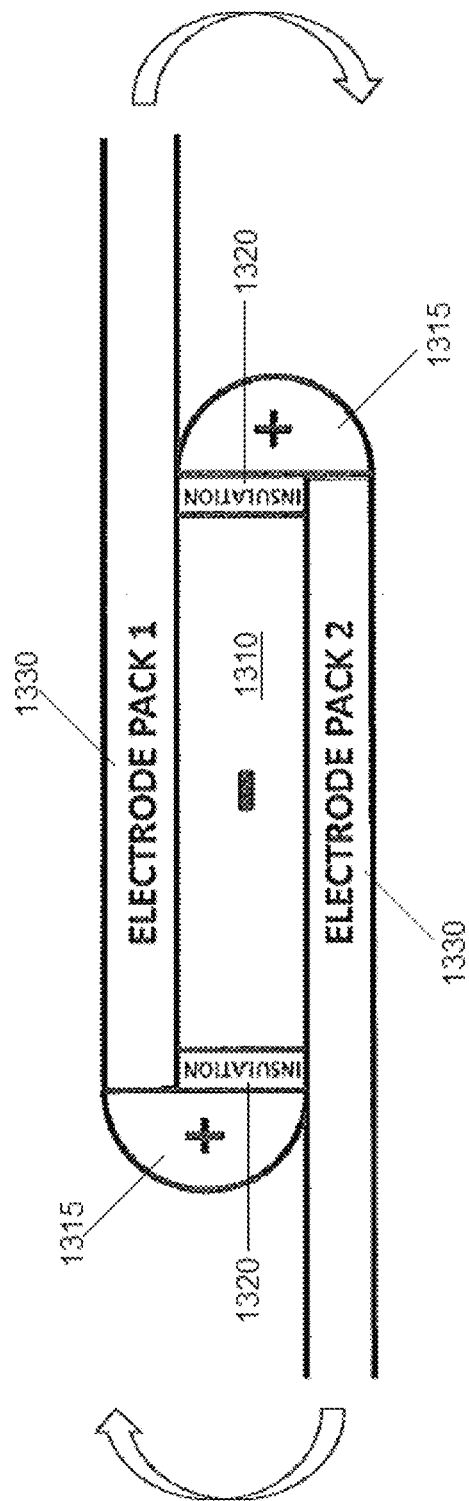
FIG. 30C is a schematic representation of a cross section of an embodiment of an obround electrochemical cell.

FIGS. 30A-30C portray potential configurations for the electrical routing in embodiments of obround electrochemical cells. In some embodiments orientation of the electrical routing mimics that of the plumbing. In some embodiments, electrical busbars 1305 could be used to supply voltage between cells, and either traverse along the core extrusion length (FIG. 30A), or be wound around the perimeter (FIG. 30B).

Figure 31A:
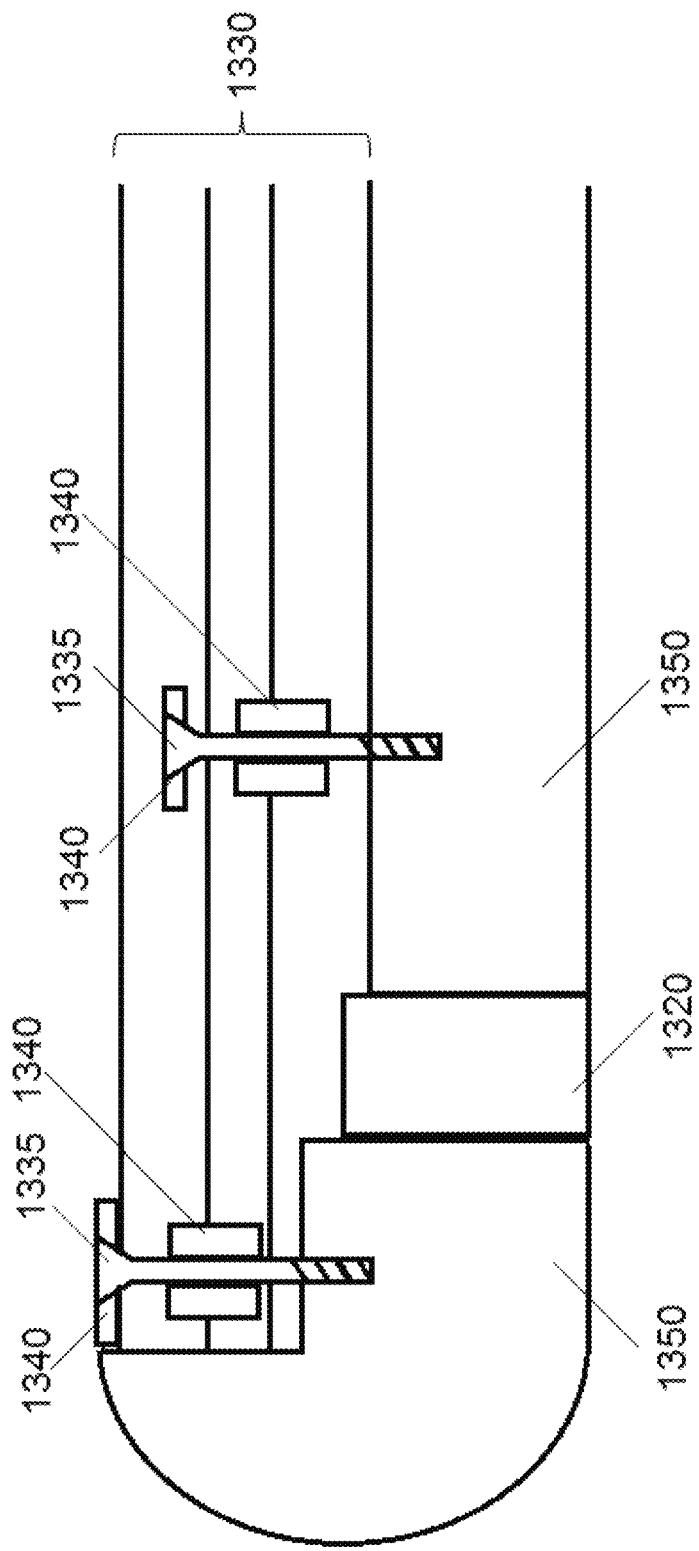
FIG. 31A is a schematic illustration of connection and retaining elements for electrodes in an embodiment of an obround electrochemical cell.

FIG. 30C depicts a non-limiting embodiment of an extruded electrical connection, where the core element is comprised of an anode 1310 isolated from the cathodes 1315 by insulation 1320. In this configuration, the semicircular end sections 1325 could be offset, to allow for the thickness of the electrode pack(s) 1330, and permit a smooth transition as the packs 1330 ride over each other. Simple and safe electrical connections could also be utilized (FIGS. 31A and 31B), with screws or bolts 1335 and conductive spacers 1340 used to electrically connect the electrodes 1345 to busbars 1350 and in place to one another and to spacers 1350.

In accordance with another aspect, there is provided apparatus and a method for providing a superior electrical connection to electrodes in an electrochemical or electrochlorination device or cell. Embodiments of this superior electrical connection are applicable to any and all of the electrochemical and electrochlorination devices or cells disclosed herein.

During operation of an electrochemical cell, it is often desirable to keep the operating temperature low even when a higher flow of electrical current is passed to the electrochemical cell. Conventional electrochemical cells typically include titanium only electrical connectors 101A, 101B welded to a titanium outer shell (see FIG. 1A). The titanium electrical connectors 101A, 101B provide for a high degree of chemical resistance but may not be optimal for providing current to the electrochemical cell without generating undesirable amounts of heat (and wasted energy). Due to the high resistivity of titanium connectors, the current supplied to the traditional titanium connector may have to be limited, so the temperature rise of the connectors in air does not rise excessively. However this limits the output of chlorine or sodium hypochlorite produced by an electrochlorination cell, as sodium hypochlorite cell output is directly proportional to current input. Because of the heat generation in traditional titanium connectors, the connectors cannot be totally enclosed in an electrically insulating material with a high Ingress Protection Level of IP54 or greater. This results in the requirement for expensive electrical enclosures that do not trap heat as much as an encapsulated electrical connector. To overcome these problems, traditional titanium connectors are often made of larger cross-section material which substantially increases the cost of electrical connector and electrochemical cell.

The resistivity of copper is $1.707 \times 10^{-8}$ ohm per m while the resistivity of titanium is $7.837 \times 10^{-7}$ ohm per m. Copper has nearly 46 times less electrical resistivity than titanium. Accordingly, it may be desired to provide an electrical connector to electrodes of an electrochemical cell that is at least partially made of low-resistivity copper. Copper, however, is more susceptible to chemical corrosion than titanium and thus should be kept out of contact with electrolyte running through an electrochemical cell.

In some embodiments of an improved electrical connector, the electrical connector part in contact with the process fluid or electrolyte (for example, seawater containing corrosive traces of equivalent chlorine), is titanium. The heat generated by electrical currents flowing through this material is efficiently removed by the flowing process fluid. As the flowrate of process fluid is often considerable with a flow velocity in excess of 2 m/s for a self-cleaning cells and 0.2 to 0.4 m/s for a flat plate cell, the temperature rise in the titanium part of the electrical connector is kept to a negligible value. The electrical connector part in contact with air is copper (or another metal or alloy having a lower resistivity than titanium).

Air-liquid cooled electrical connectors including portions formed of different metals, for example, titanium and copper (or another metal or alloy having a lower resistivity than titanium) may overcome problems exhibited by traditional titanium connectors. A lower electrically resistant metal (e.g. copper) may form or be included in a portion of the electrical connector exposed to air. Due to the superior low electrical resistance, the temperature rise is limited to a small and acceptable value. This outer conductor is joined to the inner higher chemical resistant (for example, titanium) part of the connector which is in contact with process liquid (for example, seawater). Due to the water-cooling effect of the process liquid, temperature rise of the inner higher chemical resistant part of the connector is limited to a small and acceptable value.

The overall dual metal electrical connector may be more cost efficient than a traditional titanium-only connector for a comparable current rating. The outer conductor of the dual metal electrical connector exhibits a low temperature rise and can be encapsulated in electrically insulating materials, thus removing the need for expensive electrical enclosures. Also, embodiments of the air-liquid cooled dual metal electrical connector provide for the supply of much higher current to electrochemical cells being developed than would otherwise be the case with traditional titanium only electrical cell connectors.

Figure 32:
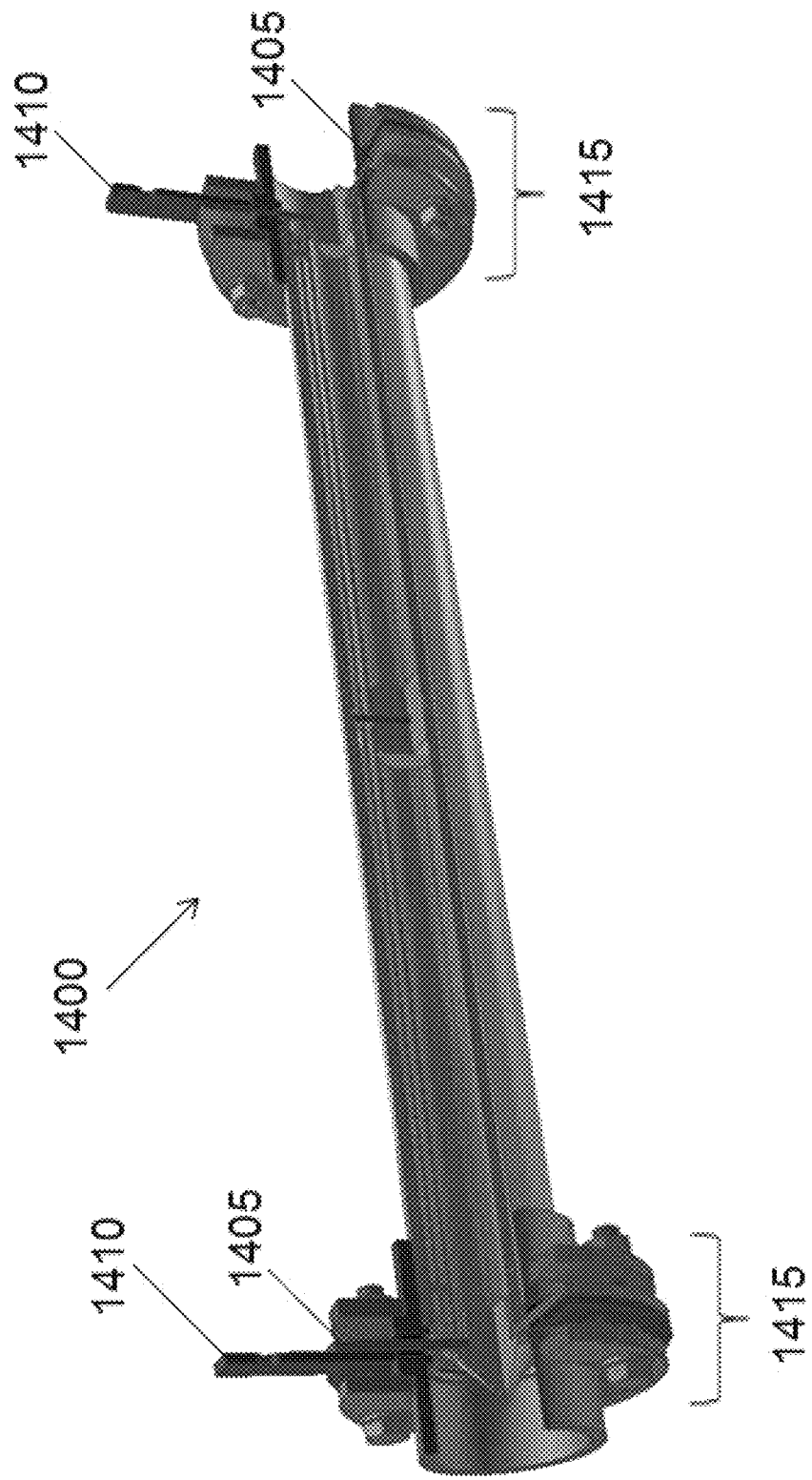
FIG. 32 is a partial cross-section of an embodiment of an electrochemical cell illustrating an embodiment of an electrical connector for electrodes of the electrochemical cell.

An embodiment of an electrochemical cell 1400 including an electrical connector include a titanium portion 1405 that would be in contact with process fluid or electrolyte during use, and a copper portion 1410 that would be in contact with air during use is illustrated in FIG. 32. The titanium portion 1405 and the copper portion 1410 may be physically and electrically connected within a flange 1415 of the electrochemical cell that provides a hermetic seal about the connector portions and seals the interior of the electrochemical cell from the external environment using, for example, gaskets (omitted from FIG. 32 for clarity) as described with reference to FIGS. 13A-13C and/or 21A and 21B above. It is to be understood that copper is an example of a high conductivity material, and the electrical connections disclosed herein may substitute another high conductivity material or alloy for copper. The term "copper portion" or "copper" is used for convenience but it is understood that these terms do not limit these elements to being formed of copper.

Figure 33A:
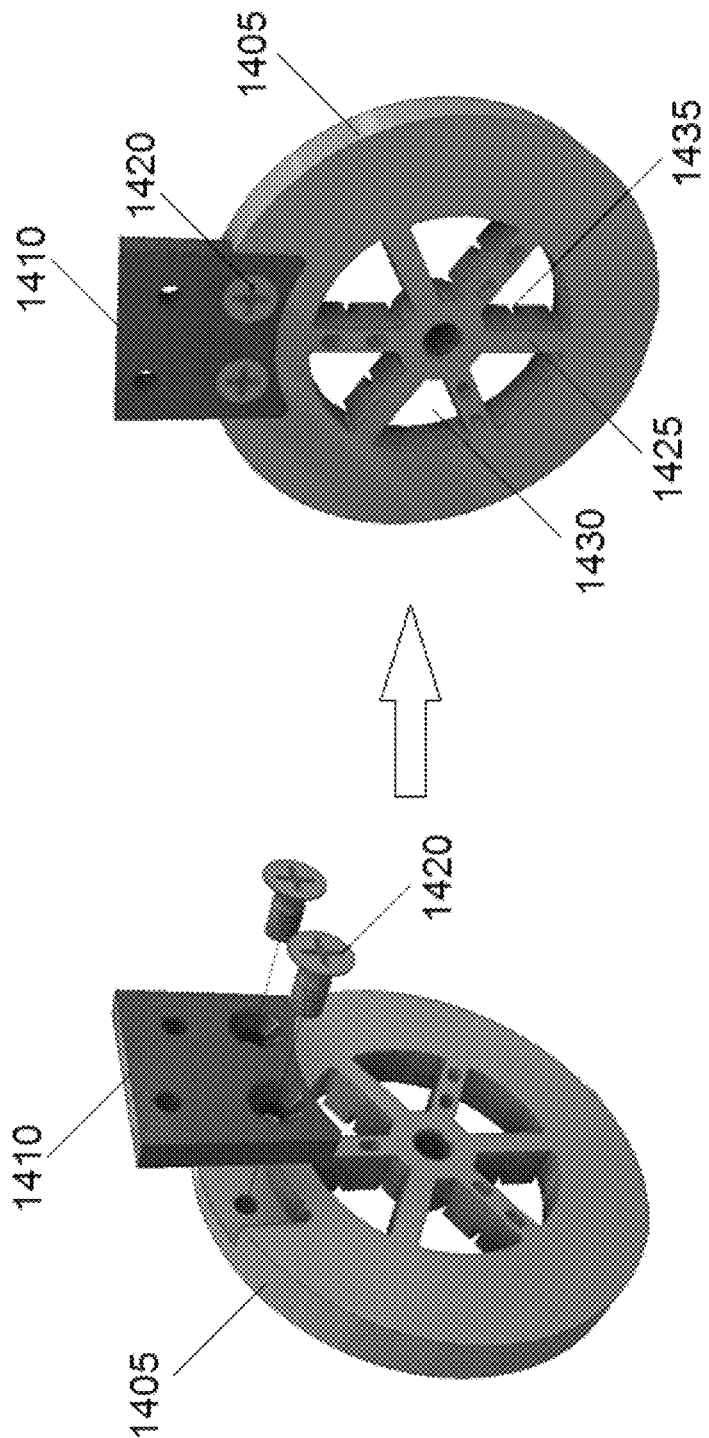
FIG. 33A illustrates an embodiment of an electrical connector for electrodes of an electrochemical cell.

Various ways of fabricating an air-liquid cooled dual metal electrical connector for use in electrochemical cells as disclosed herein are exhibited in FIGS. 33A-33F. For example, FIG. 33A illustrates a method in which the titanium portion 1405 is coupled to the copper portion 1410 by mechanical fasteners, for example, bolts 1420. The bolts 1420 may be formed from the same material as the titanium portion 1405 or the copper portion 1410. The titanium portion 1405 in the embodiment shown in FIG. 33A, as well as in other embodiments disclosed herein, may include arms or spokes 1425 that make electrical contact with one of anodes or cathodes in an electrochemical device and apertures 1430 to allow for process fluid, for example, electrolyte, to flow into or out of the electrochemical device. The arms or spokes 1425 may include slots 1430 to facilitate engagement with electrodes in the electrochemical device.

FIG. 33B illustrates a method in which the titanium portion 1405 is coupled to the copper portion 1410 by an interference fit. By comparing FIGS. 33A and 33B, it can be seen that the copper portion 1410 may extend from the titanium portion 1405 or may completely surround the titanium portion 1405.

Figure 33C:
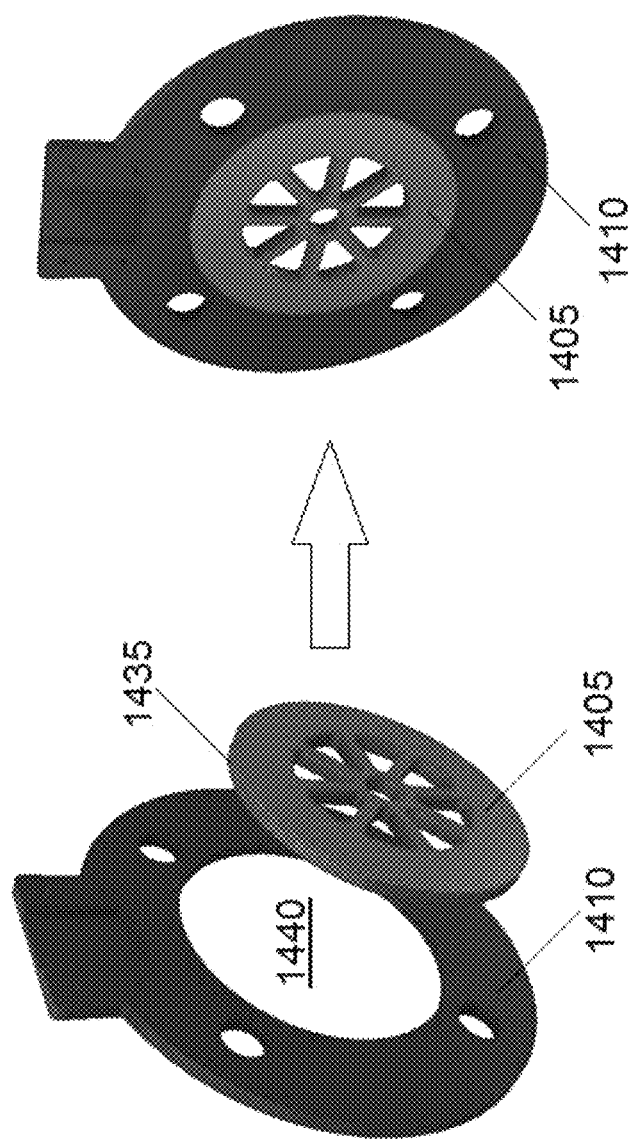
FIG. 33C illustrates another embodiment of an electrical connector for electrodes of an electrochemical cell.

FIG. 33C illustrates an embodiment in which the titanium portion 1405 include a threaded outer rim 1435 that may be screwed into place in the copper portion 1410 by engaging complimentary threads on an inner rim of an aperture 1440 in the copper portion 1410.

Figure 33D:
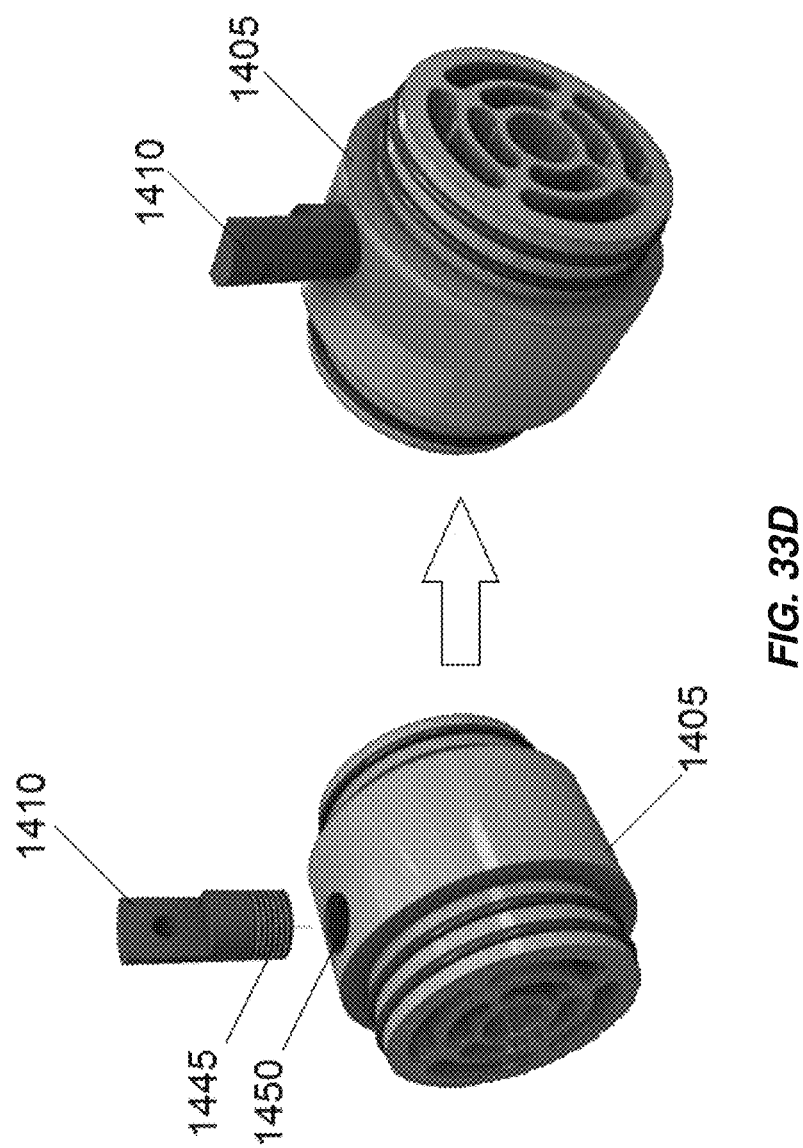
FIG. 33D illustrates another embodiment of an electrical connector for electrodes of an electrochemical cell.

In another embodiment, illustrated in FIG. 33D, the copper portion 1410 includes a lower cylindrical threaded portion 1445 that screws into an aperture 1450 in the titanium portion 1405. In FIGS. 33A-33C, the titanium portion 1405 is substantially plate-like, but in FIG. 33D, the titanium portion 1405 is a three-dimensional cylinder-like element.

Figure 33E:
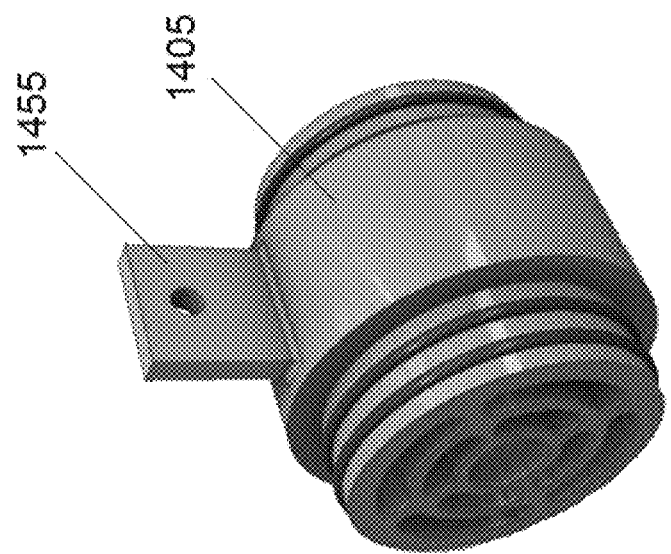
FIG. 33E illustrates another embodiment of an electrical connector for electrodes of an electrochemical cell.

In a further embodiment, illustrated in FIG. 33E, the copper portion 1410 is replaced by a polymetallic electrical connector 1455, for example, an alloy of titanium and copper or one or more other high conductivity metals. The polymetallic electrical connector 1455 has a lower resistivity than titanium. The polymetallic electrical connector 1455 may be welded to the titanium portion 1405 as illustrated in FIG. 33E. In other embodiments, a polymetallic portion having similar dimensions to the copper portions 1410 in any of FIGS. 33A-33D may be substituted for the copper portions 1410 in these embodiments.

Figure 34A:
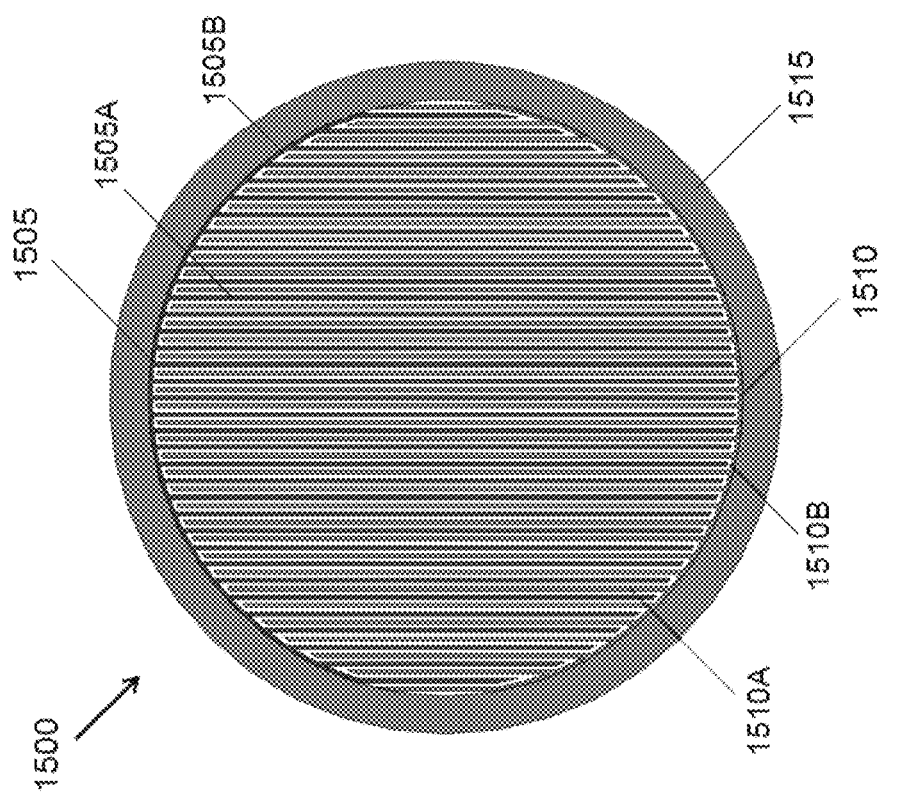
FIG. 34A illustrates a cross section of an embodiment of an electrochemical cell including interleaved electrodes.
Figure 34B:
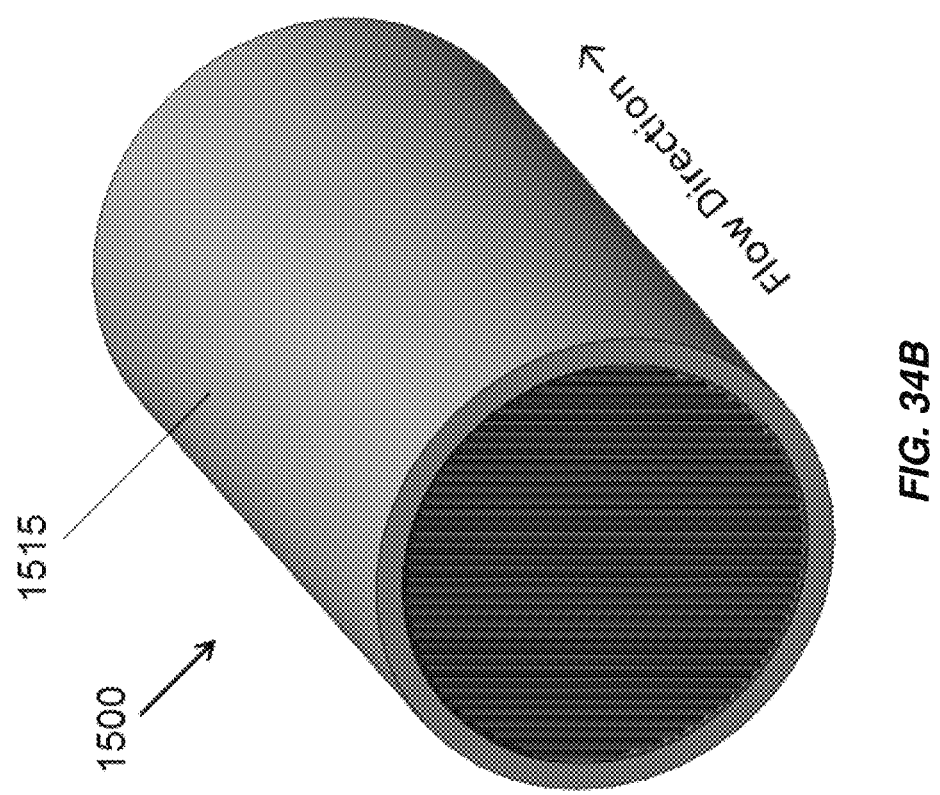
FIG. 34B illustrates a flow direction of fluid through the electrochemical cell of FIG. 34A.

In accordance with another aspect, an electrochlorination cell, indicated generally at 1500 in FIGS. 34A and 34B includes a cathode 1505 with a plurality of parallel plates 1505A electrically and mechanically coupled to an arcuate base 1505B and an anode 1510 with a plurality of parallel plates 1510A electrically and mechanically coupled to an arcuate base 1510B. The parallel plates 1505A of the cathode 1505 are interleaved with the parallel plates 1510A of the anode 1510. As in the other embodiments disclosed herein the anode 1510 and/or cathode 1505 may be titanium and the anode 1510 may be coated with an oxidation resistant coating, for example, platinum or MMO. The anode 1510 and/or cathode 1505 may be formed by extrusion. The cathode 1505 and anode 1510 are disposed in a cylindrical, or substantially cylindrical vessel, 1515, which is some embodiments is formed from non-conductive material. Electrical connections may be made to the anode 1510 and cathode 1505 in accordance with any of the electrical connection mechanisms described above. Spacers may be provided between the plates of the anode 1510 and cathode 1505 in accordance with any of the spacer mechanisms described above. Active areas of the anode 1505 and cathode 1510 include the parallel plates 1505A of the cathode 1505 and the parallel plates 1510A of the anode 1510, as well as, in some embodiments, the arcuate bases 1505B, 1510B of the cathode 1505 and anode 1510. Flow of fluid is through the vessel 1515 in the direction indicated in FIG. 34B, generally normal to the direction of the extension of the plates of the anode 1510 and cathode 1505 from their respective base potions. The active areas of the anode 1505 and cathode 1510 extend across substantially the entirety of the cross section of the vessel 1515 leaving only sufficient spacing from edges of the vessel 1515 such that the anode 1505 and cathode 1510 do not contact and electrically short to one another. The arcuate bases 1505B, 1510B may span arcs of just less than 180°, for example, between about 165° and about 175° to provide a large amount of active electr4ode area. The electrochlorination cell 155 thus includes a greater active electrode area per unit volume than conventional parallel plate electrochlorination devices and may operate to produce an equivalent amount of chlorination with a lower overall volume.

Figure 34C:
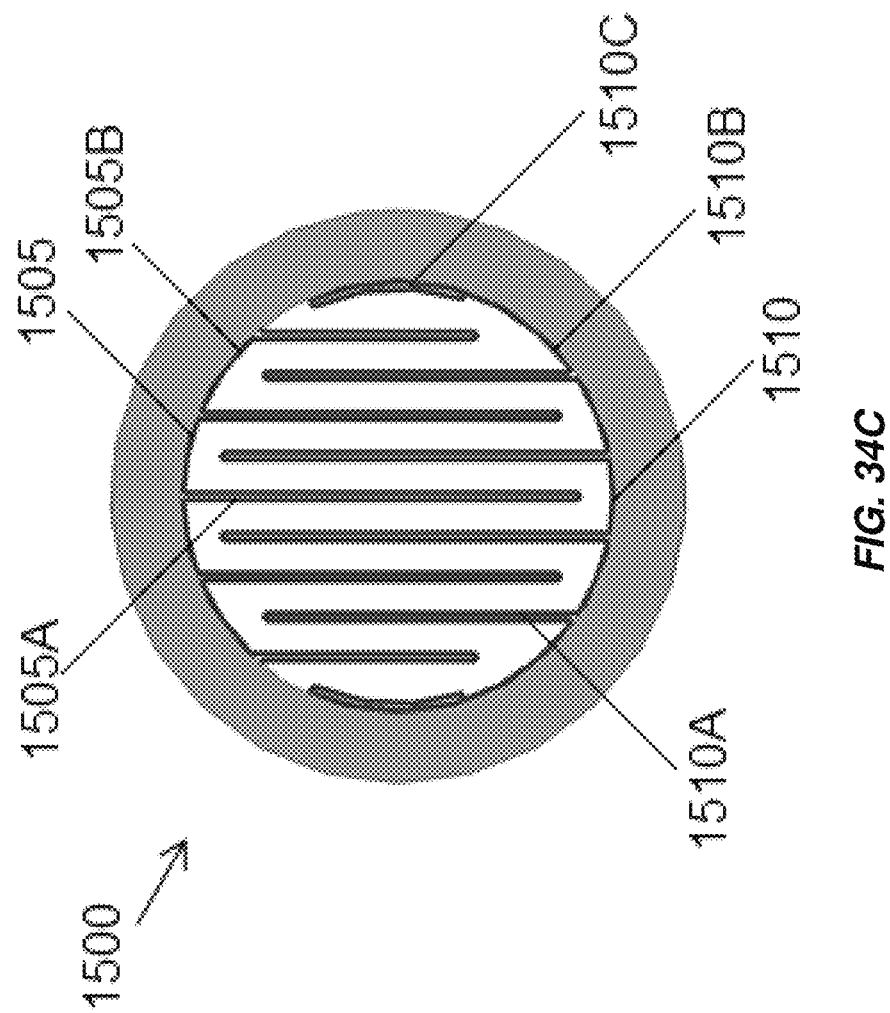
FIG. 34C illustrates an alternate configuration of the electrochemical cell of FIG. 34A.
Figure 34D:
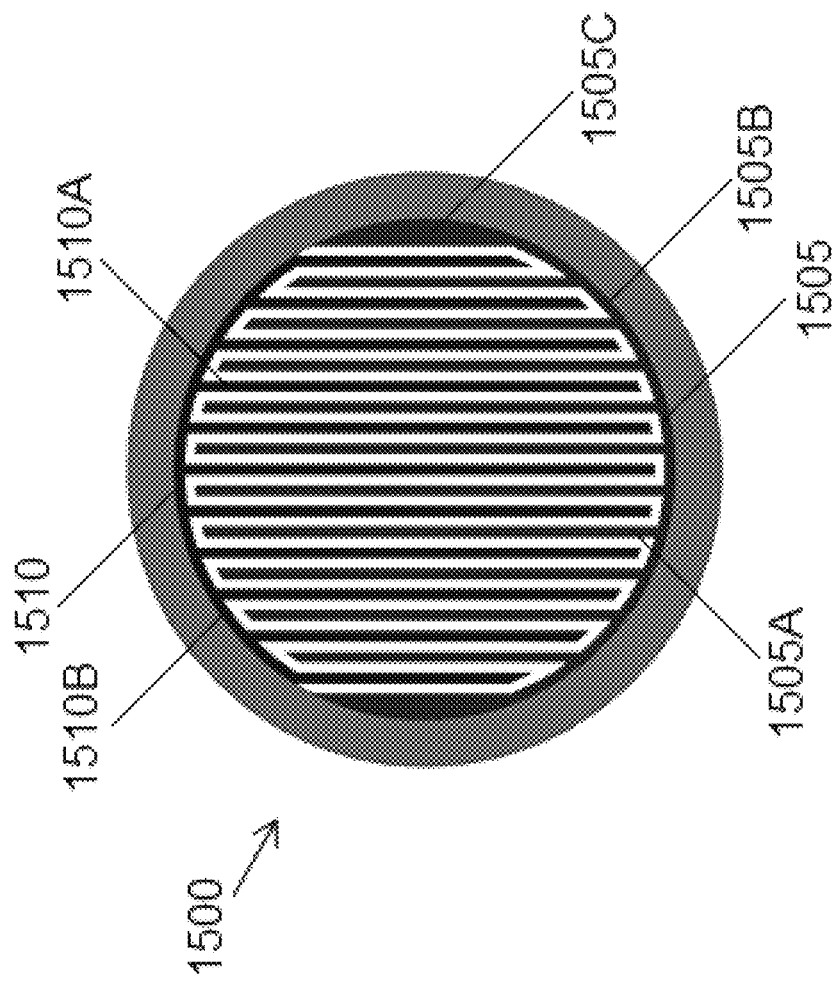
FIG. 34D illustrates another alternate configuration of the electrochemical cell of FIG. 34A.
Figure 34F:
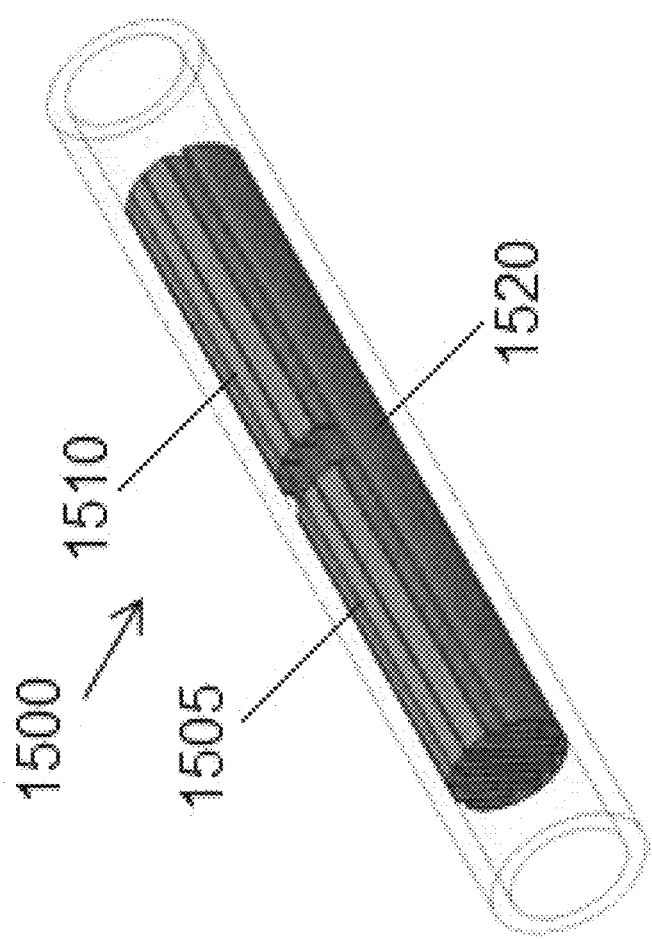
FIG. 34F illustrates an embodiment of an electrochemical cell including interleaved electrodes in a bipolar configuration.

Alternate configurations of the electrochemical cell 1500 with different anode-cathode plate spacings are illustrated in FIGS. 34C and 34D. As illustrated, the most external plates 1510A, 1505A, of the anode 1510 or cathode 1505 may have thickened portions 1510C, 1505C, that are thicker than the bases 1510B, 1505B and that may have thicknesses the same as or greater than the other plates 1510A, 1505A. In some embodiments, the thickened portions 1510C, 1505C may be formed by folding sheet metal from which the external plates 1510A, 1505A are formed over onto itself. The anodes 1510 and/or cathodes 1505 may be formed by bending of sheet metal (FIG. 34C) and/or by extrusion (FIG. 34D). An electrochemical cell 1500 including interleaved anodes and cathodes 1510, 1005 may be monopolar, with a single anode 1510 and cathode 1505 (FIG. 34E), or bipolar (FIG. 34F), with a single anode 1510 and cathode 1505 displaced from one another along a length of the electrochemical cell 1500, each having plates interleaved with plates of a bipolar electrode 1520. Additional anodes 11510 and/or cathodes 1505 may be provided to render the electrochemical cell multi-polar.

Figure 35:
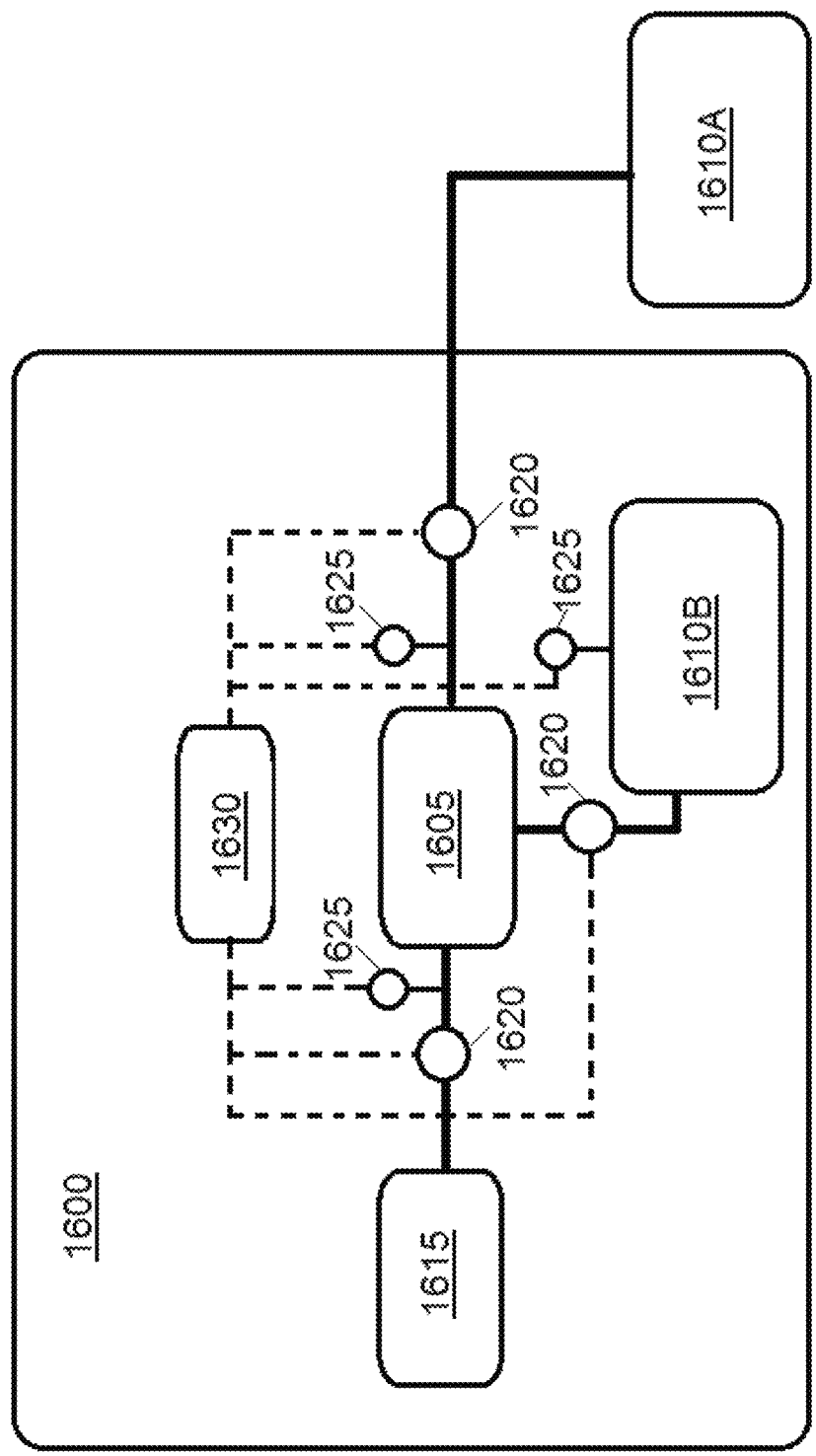
FIG. 35 illustrates a system in which embodiments of electrochemical cells disclosed herein may be utilized.

Electrochemical or electrochlorination cells and devices as disclosed herein may be included as part of a larger system. On example of a system employing one or more electrochemical or electrochlorination cells or devices is illustrated generally at 1600 in FIG. 35. The system 1600 is in some embodiments a sea-based system, for example, a ship or an oil rig, and in other embodiments is a land based building, for example, a power plant, an oil drilling facility or system or other industrial facility. In other embodiments, the system 1600 is or may include a swimming pool, or a treatment system for drinking water, wastewater, or industrial water treatment processes, that uses one or more products of electrochemical devices in the system 1600, for example, a disinfectant to treat or disinfect water.

The system 1600 includes one or more electrochlorination systems 1605 that may include one or more electrochemical or electrochlorination cells or devices as disclosed herein. The system may draw process liquid or electrolyte, which in some embodiments is seawater or brackish water from sources external 1610A and/or internal 1610B to the system. For example, if the system is a sea-based system, external source 1610A may be the ocean and internal source 1610B may be, for example, a ballast tank in a ship. In land based system, external source 1610A may be the ocean and internal source 1610B may be brackish wastewater from an industrial process performed in the system 1600. The one or more electrochlorination systems 1605 produce chlorinated water and/or a solution including sodium hypochlorite from the water from sources 1610A and/or 1610B and distribute it to a point of use 1615. The point of use may be a source of cooling water for the system, a source of disinfection agent for a ballast tank of a ship, a downhole of an oil drilling system, or any other system in which chlorinated water may be useful. Various pumps 1620 may control the flow of fluid through the system 1600. One or more sensors 1625 may monitor one or more parameters of fluid flowing through the system, for example, ionic concentration, chlorine concentration, temperature, or any other parameter of interest. The pumps 1620 and sensors 1625 are in communication with a control system or controller 1630 which communicates with the sensors 1625 and pumps 1620 and controls operation of the pumps 1620 and other elements of the system 1600 to achieve desired operating parameters.

The controller 1630 used for monitoring and controlling operation of the various elements of system 1600 may include a computerized control system. Various aspects of the controller 1630 may be implemented as specialized software executing in a general-purpose computer system 1700 such as that shown in FIG. 36. The computer system 1700 may include a processor 1702 connected to one or more memory devices 1704, such as a disk drive, solid state memory, or other device for storing data. Memory 1704 is typically used for storing programs and data during operation of the computer system 1700. Components of computer system 1700 may be coupled by an interconnection mechanism 1706, which may include one or more busses (e.g., between components that are integrated within a same machine) and/or a network (e.g., between components that reside on separate discrete machines). The interconnection mechanism 1706 enables communications (e.g., data, instructions) to be exchanged between system components of system 1700. Computer system 1700 also includes one or more input devices 1708, for example, a keyboard, mouse, trackball, microphone, touch screen, and one or more output devices 1710, for example, a printing device, display screen, and/or speaker.

The output devices 1710 may also comprise valves, pumps, or switches which may be utilized to introduce product water (e.g. brackish water or seawater) the source 1610A and/or 1610B into the electrochlorination system 1605 or point of use 1615 and/or to control the speed of pumps 1620. One or more sensors 1714 may also provide input to the computer system 1700. These sensors may include, for example, sensors 1625 which may be, for example pressure sensors, chemical concentration sensors, temperature sensors, or sensors for any other parameters of interest to system 1600. These sensors may be located in any portion of the system 1600 where they would be useful, for example, upstream of point of use 1615 and/or electrochlorination system 1605 or in fluid communication with source 1601A and/or 1601B. In addition, computer system 1700 may contain one or more interfaces (not shown) that connect computer system 1700 to a communication network in addition or as an alternative to the interconnection mechanism 1706.

Figure 37:
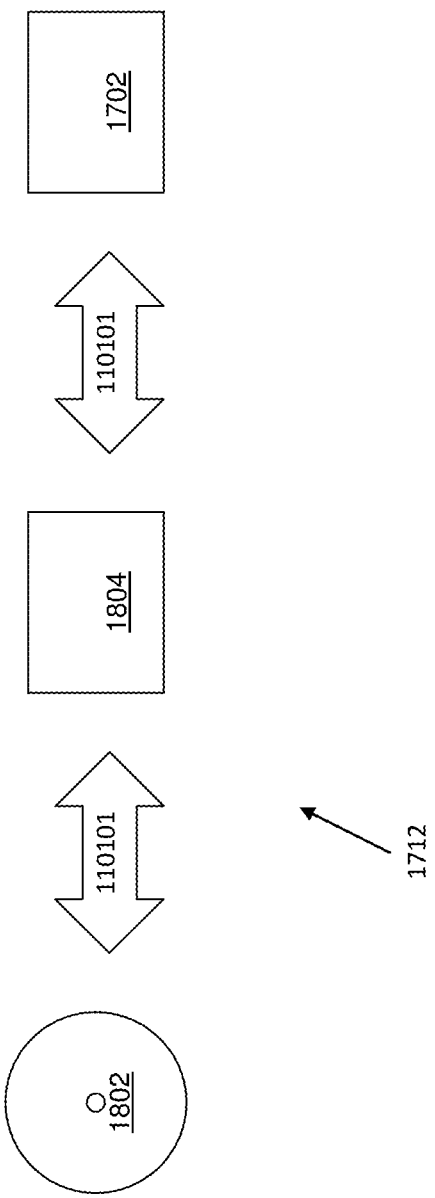
FIG. 37 illustrates a memory system for the control system of FIG. 36.

The storage system 1712, shown in greater detail in FIG. 37, typically includes a computer readable and writeable nonvolatile recording medium 1802 in which signals are stored that define a program to be executed by the processor 1702 or information to be processed by the program. The medium may include, for example, a disk or flash memory. Typically, in operation, the processor causes data to be read from the nonvolatile recording medium 1802 into another memory 1804 that allows for faster access to the information by the processor than does the medium 1802. This memory 1804 is typically a volatile, random access memory such as a dynamic random access memory (DRAM) or static memory (SRAM). It may be located in storage system 1712, as shown, or in memory system 1704. The processor 1702 generally manipulates the data within the integrated circuit memory 1804 and then copies the data to the medium 1802 after processing is completed. A variety of mechanisms are known for managing data movement between the medium 1802 and the integrated circuit memory element 1804, and aspects and embodiments disclosed herein are not limited thereto. Aspects and embodiments disclosed herein are not limited to a particular memory system 1704 or storage system 1712.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 36:
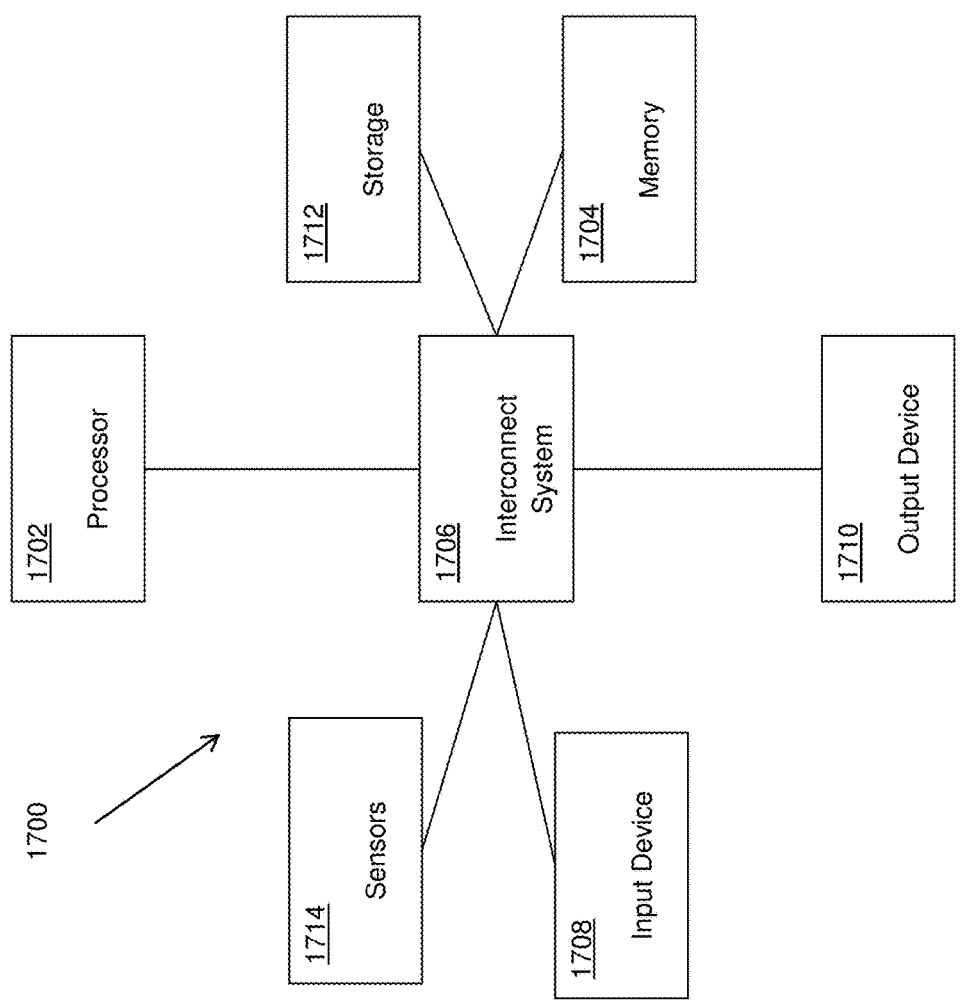
FIG. 36 illustrates a control system for embodiments of electrochemical cells disclosed herein.

Although computer system 1700 is shown by way of example as one type of computer system upon which various aspects and embodiments disclosed herein may be practiced, it should be appreciated that aspects and embodiments disclosed herein are not limited to being implemented on the computer system as shown in FIG. 36. Various aspects and embodiments disclosed herein may be practiced on one or more computers having a different architecture or components that that shown in FIG. 36.

Computer system 1700 may be a general-purpose computer system that is programmable using a high-level computer programming language. Computer system 1700 may be also implemented using specially programmed, special purpose hardware. In computer system 1700, processor 1702 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

EXAMPLE

Testing was performed to compare the operation of concentric tube electrochlorination cells, including a three tube cell as described above with reference to FIG. 14A and a five tube cell as described above with reference to FIG. 16, to a conventional CTE as described with reference to FIGS. 1A and 1B above.

The three tube and five tube electrochlorination cells were enclosed in a non-conductive 12 BarG rated u-PVC shell. The encapsulated cell was hydraulically pressure tested to 12 BarG for 30 minutes without any leaks or drop in hydraulic pressure. The three tube and five tube anode electrodes were coated with MMO comprising of mainly $RuO_2$ but with $IrO_2$ and some $TiO_2$. Hypochlorite output was tested. Hypochlorite output increased proportionally to increased anode surface area.

With reference to Table 1, by comparing anode electrode surface area with cell volume, the three tube electrochlorination cell has 1.73 times (or 173%) the anode area of the conventional CTE electrochlorination cell for the same unit volume.

Calculation: $0.97\ m^3/0.56\ m^3=1.73$ or 178%

Alternatively, this can be viewed as the three tube multi-tube requiring only 0.58 times (58%), the volume of the conventional CTE electrochlorination cell to have equivalent active anode surface area.

Calculation: $0.56\ m^3/0.97\ m^3=0.58$ or 58%

With reference to Table 2, by comparing anode electrode surface area with cell volume, the five tube electrode has 2.77 times (or 277%), the anode area of the conventional CTE electrode for the same unit volume.

Calculation: $0.97\ m^3/0.33\ m^3=2.93$ or 293%

Alternatively, this can be viewed as the five tube multi-tube electrochlorination cell requiring only 0.36 times (36%) the volume of the conventional CTE electrochlorination cell to have equivalent active anode surface area.

Calculation $0.33\ m^3/0.97\ m^3=0.34$ or 34%

With reference to Table 1, on equivalent unit volume basis, the three tube multi-tube electrochlorination cell produced between 165% and 174% more sodium hypochlorite than the conventional CTE electrochlorination cell.

With reference to Table 2, on equivalent unit volume basis, the five tube multi-tube electrochlorination cell produced between 327% and 387% more sodium hypochlorite than the conventional CTE electrochlorination cell.

TABLE 1

Existing CTE Electrode with 2 tubes with 1 electrolyte gap compared with Multi-Tube Electrode with 3 tubes with 2 electrolyte gaps
Electrolyte: Brine with a Chloride content of 20.3 g/l/3.6% NaCl at 16 to 21° C.

| Coating RUA-SW | Existing CTE Electrode | Multi Electrode | ratio | Ratio adjusted for Anode area difference | Existing CTE Electrode | Multi Electrode | Ratio | Ratio adjusted for Anode area difference |
|---|---|---|---|---|---|---|---|---|
| Anode area m$^2$ | 0.28 | 0.30 | 0.93 | 0.3 m2 × 0.93 = 0.28 m2 | 0.28 | 0.30 | 0.93 | 0.3 m2 × 0.93 = 0.28 m2 |
| Anode length m | 1.36 | 0.79 | | | 1.36 | 0.79 | | |
| Outer tube dia m | 0.071 | 0.077 | | | 0.071 | 0.077 | | |
| Cell Volume m$^3$ | 0.097 | 0.060 | | Multi-Tube(3) 0.06 m3 × 0.93 = 0.0 56 m$^3$ | 0.097 | 0.060 | | Multi-Tube(3) 0.06 m3 × 0.93 = 0.0 56 m3 |
| Brine temp ° C. | 16 | 20 | | | | 21 | | |
| Cell DC amps | 210 | 450 | | | 280 | 600 | | |
| Total amps | 420 | 450 | | | 560 | 600 | | |
| Cell CD in A/m$^2$ | 1500 | 1500 | | | 2000 | 2000 | | |
| Actual Cell V | 10.1 | 5.47 | | | 11.5 | 6.2 | | |
| Voltage per current pass | 5.05 | 5.47 | | | 5.75 | 6.2 | | |
| Actual Kg/h | 0.53 | 0.54 | | | 0.68 | 0.73 | | |
| Actual Kg/h per 1 m length | 0.39 | 0.69 | 1.77 | | 0.50 | 0.93 | 1.86 | |
| Actual Kg/h/ Volume (1 m$^3$) | 5.46 | 9 | 1.65 | | 7.01 | 12.16 | 1.74 | |

TABLE 2

Electrode with 2 tubes with 1 electrolyte gap, compared with Multi-Tube Electrode with 5 tubes with 4 electrolyte gaps with a Chloride content of 20.3 g/l/3.6% NaCl at 15 to 17° C.

| Coating RUA-SW | Existing CTE Electrode | Multi Electrode | ratio | Ratio adjusted for Anode area difference | Multi Electrode | Adjust 2400 A/m2 for current density back to 1875 A/m$^2$ | ratio |
|---|---|---|---|---|---|---|---|
| Anode area m2 | 0.28 | 0.5 | 0.58 | | 0.5 | | |
| Anode length m | 1.36 | 0.79 | | | 0.79 | | |
| Outer tube dia m | 0.071 | 0.077 | | | 0.077 | | |
| Cell Volume m$^3$ | 0.097 | 0.060 | | Multi-Tube(5) 0.6 m3 × 0.56 = 0..33 m3 | 0.060 | | |
| Brine temp ° C. | 16.6 | 15 | | | 15 | | |
| Cell DC amps | 260 | 450 | | | 576 | | |
| Total amps | 520 | 900 | | | 1152 | | |
| Cell CD in A/m$^2$ | 1857 | 1875 | | | 2400 | 1875/2400 = 0.781 | |
| Actual Cell V | 11 | 11.7 | | | 12.8 | | |
| Voltage per current pass | 5.5 | 5.6 | | | 6.4 | | |
| Actual Kg/h | 0.64 | 1.55 | | | 1.66 | 0.781 × 1.66 = 1.297 | |
| Actual Kg/h per 1 m length | 0.47 | 1.97 | 4.20 | | 2.11 | 1.64 | |
| Actual Kg/h/ 1 m$^3$ Volume | 6.6 | 25.6 | 3.87 | | 27.6 | 21.6 | 3.27 |

The above results show that:

1. A much higher active anode surface area per unit volume may be achieved with the multi-tube electrochlorination cell when compared with the conventional CTE design. In other words, a much higher packing density has been achieved.

2. In line with a much higher active anode surface area achieved with the multi-tube design, when current is applied to the electrodes, a proportional higher output of sodium hypochlorite was measured.

3. The higher packing density/higher sodium hypochlorite outputs from the multi-tube electrochlorination cells will make this design more competitive with PPE electrochlorination cell but without the disadvantage of acid cleaning.

An additional advantage that was confirmed was that considerably fewer parts are required for multi-tube electrochlorination cells as compared to a conventional PPE electrochlorination cell, resulting in lower weight and less assembly time. The five tube multi-tube electrode weighs approximately 15 kg but a typical PPE electrochlorination cell weighs 10 times or more than this. The multi-tube electrode was found to be easier and less time consuming to assemble with about 1.5 hours for concept multi-tube electrode vs 15 hours for a conventional PPE electrochlorination cell.

The table of FIG. 38 illustrates various functional parameters of different embodiments of electrochemical cells as disclosed herein. The "MK2M" design entry corresponds to the embodiment illustrated in FIGS. 1A and 1B. As can be seen from the table, some designs have available flow percentages, corresponding to the "active density" parameter discussed above of over 85%. As also can be seen from the table, some designs have electrode ratios, corresponding to the "overall electrode packing density" parameter discussed above of up to about 1.7 mm$^{-1}$.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. An electrochemical cell comprising:
    a housing having an inlet, an outlet, and a central axis;
    at least one anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the at least one anode-cathode pair configured and arranged to direct all fluid passing through the electrochemical cell axially through the active area, a non-conductive central core element disposed within an innermost anode-cathode pair in the electrochemical cell and configured to block fluid flow through the central axis, the central core element unconnected from at least one electrode of the anode-cathode pair.

2. The electrochemical cell of claim 1, having an overall electrode packing density of at least about 2 mm$^{-1}$.

3. The electrochemical cell of claim 1, wherein the anode-cathode pair is spiral-wound about the central axis.

4. The electrochemical cell of claim 3, further comprising one or more spiral-wound bipolar electrodes.

5. The electrochemical cell of claim 4, wherein the anode is laterally displaced from the cathode along a length of the electrochemical cell.

6. The electrochemical cell of claim 3, wherein at least one of the anode and the cathode is a rigid electrode.

7. The electrochemical cell of claim 6, wherein the anode and the cathode each comprise one or more of titanium, nickel and aluminum.

8. The electrochemical cell of claim 6, wherein surfaces of the anode are coated with an oxidation resistant coating selected from the group consisting of platinum, a mixed metal oxide, magnetite, ferrite, cobalt spinel, tantalum, palladium, iridium, gold, and silver.

9. The electrochemical cell of claim 3, further comprising a separator configured to maintain a gap distance between the anode and the cathode, the separator being open to flow of an electrolyte solution through the active area.

10. The electrochemical cell of claim 9, wherein the separator includes a hub having spokes with slots that engage edges of at least one of the anode and the cathode.

11. The electrochemical cell of claim 10, wherein the hub further includes an electrical connector configured to electrically connect the one of the anode and the cathode to a source of current.

12. The electrochemical cell of claim 3, further comprising a hub including spokes in electrical contact with one of the anode and the cathode.

13. The electrochemical cell of claim 12, wherein the spokes include slots that engage edges of the one of the anode and the cathode and maintain a gap between turns of the spiral wound anode-cathode pair.

14. The electrochemical cell of claim 3, wherein the central core element comprises a non-conductive core disposed within an innermost winding of the anode-cathode pair.

15. The electrochemical cell of claim 1, wherein the anode-cathode pair includes a plurality of concentric electrode tubes and gaps defined between adjacent electrode tubes.

16. The electrochemical cell of claim 15, wherein the plurality of concentric electrode tubes includes one of a plurality of anode electrode tubes and a plurality of cathode electrode tubes.

17. The electrochemical cell of claim 16, wherein one of the plurality of anode electrode tubes and the plurality of cathode electrode tubes are rigid electrodes.

18. The electrochemical cell of claim 16, wherein the plurality of concentric tube electrodes includes a plurality of anode electrode tubes and a plurality of cathode electrode tubes.

19. The electrochemical cell of claim 16, configured to enable current to flow through an electrolyte solution from an anode electrode tube to a cathode electrode tube in a single pass.

20. The electrochemical cell of claim 16, further comprising a bipolar electrode tube disposed between an anode electrode tube and a cathode electrode tube.

21. The electrochemical cell of claim 20, further comprising an electrode tube including an anodic half and a cathodic half.

22. The electrochemical cell of claim 20, further comprising a plurality of bipolar electrode tubes disposed between respective concentrically arranged adjacent pairs of electrode tubes having anodic halves and cathodic halves.

23. The electrochemical cell of claim 20, wherein at least one of the plurality of anode electrode tubes and the plurality of cathode electrode tubes is fluid permeable.

24. The electrochemical cell of claim 15, further comprising at least one separator positioned between adjacent electrode tubes, the at least one separator configured to define and maintain a gap between the adjacent electrode tubes.

25. The electrochemical cell of claim 24, wherein the separator is open to flow of an electrolyte solution through the gap defined between the adjacent electrode tubes.

26. The electrochemical cell of claim 15, further comprising a metallic hub including spokes electrically coupled to edges of a plurality of the concentric electrode tubes.

27. The electrochemical cell of claim 26, wherein each spoke include slots that engage the edges of the plurality of the concentric electrode tubes maintain gaps between adjacent electrode tubes in the plurality of the concentric electrode tubes.

28. The electrochemical cell of claim 15, wherein the central core element includes an end cap disposed within an end of an innermost concentric tube electrode of the electrochemical cell.

29. The electrochemical cell of claim 1, further comprising an electrical connector including first portion disposed to contact process fluid passing through the electrochemical cell and electrically connected to a second portion disposed to contact air external to the housing but not the process fluid, the first portion formed of a material that is more chemically resistant and less electrically conductive than the second portion.

30. The electrochemical cell of claim 29, wherein the first portion is comprised of titanium.

31. The electrochemical cell of claim 29, wherein the second portion is comprised of copper.

32. The electrochemical cell of claim 1, further comprising non-conductive bumpers having portions passing through apertures defined in the electrodes, the non-conductive bumpers maintaining gaps between adjacent electrodes.

33. The electrochemical cell of claim 32, wherein the bumpers comprise male portions disposed on first surfaces of the electrodes that snap into female portions disposed on second surfaces of the electrodes opposite the first surfaces.

* * * * *